US012691811B2

(12) United States Patent
Niemeyer et al.

(10) Patent No.: US 12,691,811 B2
(45) Date of Patent: Jul. 28, 2026

(54) SIDE-RAIL MODULAR, LIGHTWEIGHT LOAD-CARRYING PANELS AND RACKS

(71) Applicant: Putco, Inc., Des Moines, IA (US)

(72) Inventors: Nicholas Niemeyer, Des Moines, IA (US); James P. Elwell, II, Grimes, IA (US); Reid Sears, Des Moines, IA (US); Justin Black, Des Moines, IA (US)

(73) Assignee: Putco, Inc., Des Moines (LA)

(*) Notice: Subject to any disclaimer, the term of this patent is extended or adjusted under 35 U.S.C. 154(b) by 172 days.

(21) Appl. No.: 18/744,380

(22) Filed: Jun. 14, 2024

(65) Prior Publication Data

US 2024/0336187 A1    Oct. 10, 2024

Related U.S. Application Data

(63) Continuation-in-part of application No. 17/651,259, filed on Feb. 16, 2022, now Pat. No. 12,049,197, which is a continuation-in-part of application No. 17/390,434, filed on Jul. 30, 2021, now Pat. No. 11,279,421.

(51) Int. Cl.
*B60P 7/08* (2006.01)
*B62D 33/027* (2006.01)

(52) U.S. Cl.
CPC .......... *B60P 7/0815* (2013.01); *B60P 7/0823* (2013.01); *B62D 33/0273* (2013.01)

(58) Field of Classification Search
CPC ......... B60P 7/0815; B60P 7/0807; B60P 7/15; B60R 9/06; B60R 9/00; B60R 9/02; B60R 2011/004; B62D 33/023; B62D 33/0207; B62D 33/0273
See application file for complete search history.

(56) References Cited

U.S. PATENT DOCUMENTS

| 5,724,707 A | 3/1998 | Kirk et al. |
|---|---|---|
| 5,897,154 A | 4/1999 | Albertini et al. |
| 6,481,604 B1 | 11/2002 | Beene et al. |
| 6,502,885 B1 | 1/2003 | Gammon et al. |
| 6,672,640 B2 | 1/2004 | Gehring et al. |
| 6,948,732 B2 | 9/2005 | Amacker |
| 7,413,231 B1 | 8/2008 | Wood et al. |
| 7,819,295 B2 | 10/2010 | Plavetich |
| 7,854,460 B2 | 12/2010 | Tweet et al. |
| 8,052,019 B2 | 11/2011 | Plavetich |
| 8,496,146 B2 | 7/2013 | Badillo |
| 8,657,542 B2 | 2/2014 | Liu et al. |
| 8,998,253 B2 | 4/2015 | Novotny |
| 9,586,629 B2 | 3/2017 | Leitner |
| 9,676,343 B2 | 6/2017 | Badillo |
| D793,946 S | 8/2017 | Badillo |
| 9,834,151 B2 | 12/2017 | Henry |
| D840,916 S | 2/2019 | Badillo |
| 10,351,070 B2 | 7/2019 | Badillo |

(Continued)

*Primary Examiner* — Corey N Skurdal
(74) *Attorney, Agent, or Firm* — McKee, Voorhees & Sease, PLC

(57) ABSTRACT

A pickup full of gear doesn't have to be a jumbled mess. A modular, lightweight load-carrying system is custom engineered to fit directly onto a tailgate using the existing OEM mounting points of the vehicle. The rack systems allow drivers of the vehicle to keep gear organized, easily accessible, and secure.

16 Claims, 49 Drawing Sheets

(56)  References Cited

U.S. PATENT DOCUMENTS

| | | |
|---|---|---|
| 10,358,095 B1 | 7/2019 | Badillo |
| 10,435,082 B1 | 10/2019 | Kupina et al. |
| 10,625,687 B1 | 4/2020 | Todd et al. |
| 10,780,836 B1 | 9/2020 | Fisher |
| 10,857,950 B2 | 12/2020 | Cox |
| 10,875,459 B2 | 12/2020 | Besley |
| 10,933,796 B2 | 3/2021 | Beenen |
| D924,122 S | 7/2021 | Fisher |
| 11,279,421 B1 | 3/2022 | Hoogendoorn et al. |
| 12,319,239 B2 * | 6/2025 | Hoch ...................... B60R 9/02 |
| 2004/0145206 A1 | 7/2004 | Hicks et al. |
| 2005/0249567 A1 | 11/2005 | Cucknell et al. |
| 2006/0289577 A1 | 12/2006 | Malone |
| 2009/0014602 A1 | 1/2009 | Frost |
| 2010/0043186 A1 | 2/2010 | Lesley |
| 2012/0132684 A1 | 5/2012 | Ardigo |
| 2013/0037665 A1 | 2/2013 | Brasell et al. |
| 2013/0256352 A1 | 10/2013 | Barnett |
| 2016/0347342 A1 | 12/2016 | McCaldon |
| 2017/0227141 A1 | 8/2017 | Toll et al. |
| 2017/0274745 A1 | 9/2017 | Lewis et al. |
| 2018/0264988 A1 | 9/2018 | Johnson |
| 2019/0092213 A1 | 3/2019 | Beenen |
| 2019/0219081 A1 | 7/2019 | Hagedorn et al. |
| 2019/0225166 A1 | 7/2019 | Williams et al. |
| 2019/0315519 A1 | 10/2019 | Brennan |
| 2019/0329714 A1 | 10/2019 | Masanek, Jr. |
| 2019/0337464 A1 | 11/2019 | Cox |
| 2019/0367101 A1 | 12/2019 | McFadden et al. |
| 2020/0198545 A1 | 6/2020 | Townson et al. |
| 2021/0031841 A1 | 2/2021 | Kananda |
| 2021/0114529 A1 | 4/2021 | Chambers |
| 2021/0138968 A1 | 5/2021 | Cox |
| 2021/0221276 A1 | 7/2021 | Bossenbroek et al. |
| 2022/0388451 A1 | 12/2022 | Beenen |
| 2023/0049944 A1 * | 2/2023 | Hoch ...................... B60R 9/02 |
| 2023/0062166 A1 | 3/2023 | Beenen |
| 2023/0110428 A1 | 4/2023 | Rutman et al. |
| 2023/0257032 A1 | 8/2023 | Harmon |

* cited by examiner

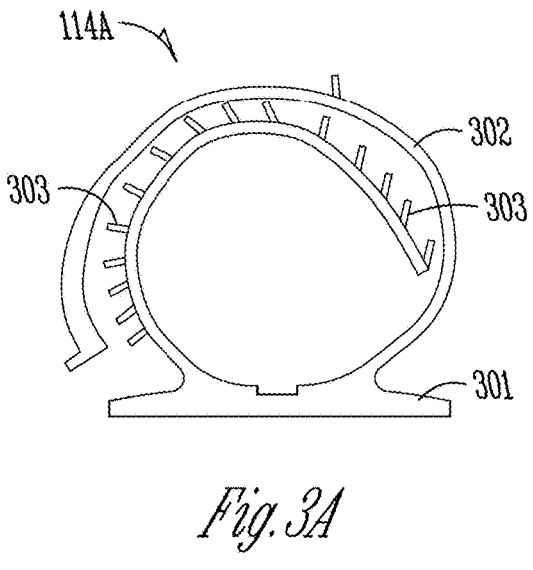
*Fig.3A*
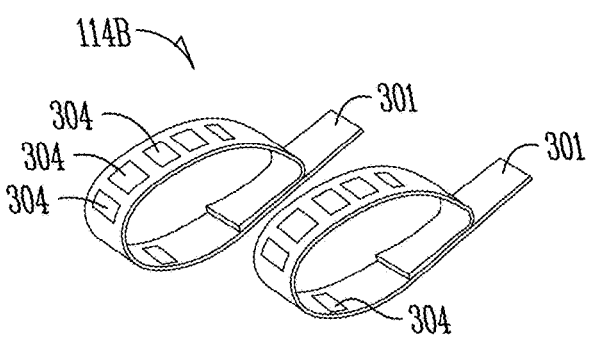
*Fig.3B*
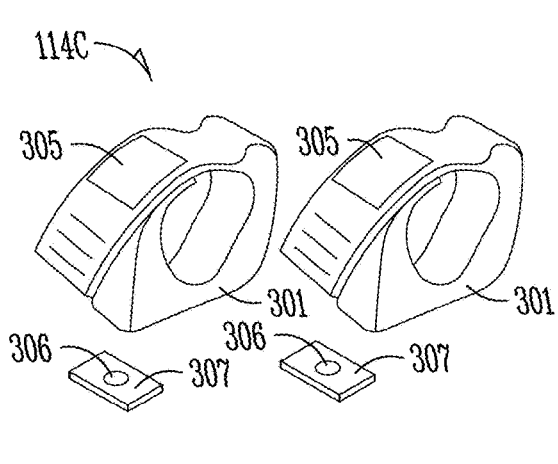
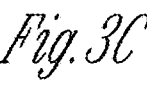
*Fig.3C*
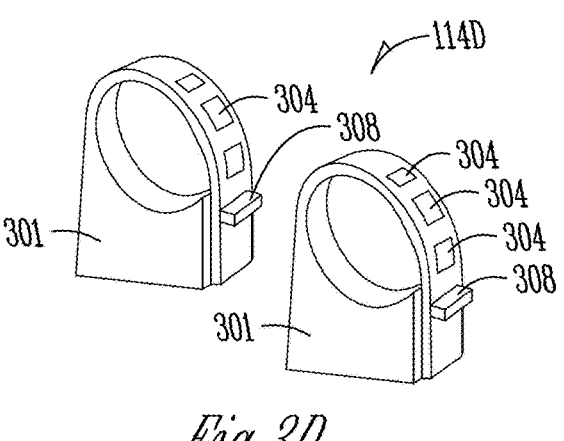
*Fig.3D*

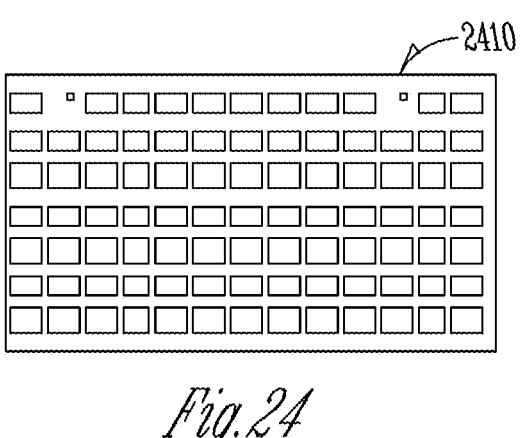
*Fig.24*
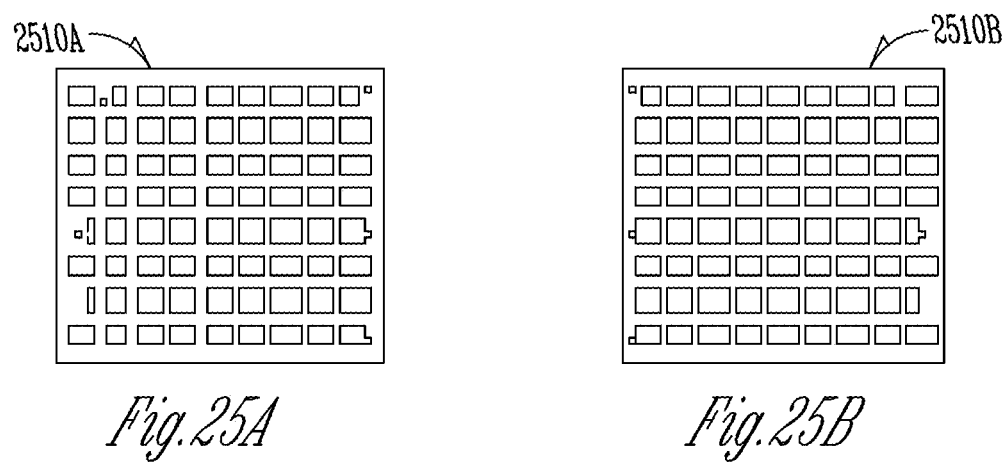
*Fig.25A*                    *Fig.25B*
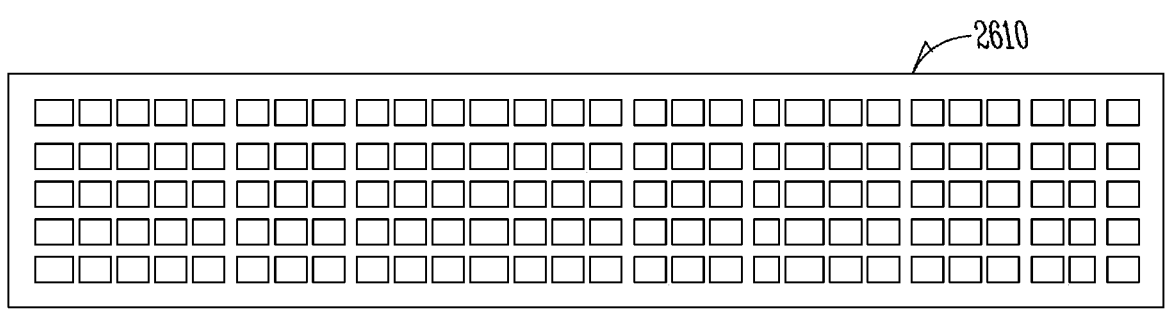
*Fig.26*

3410

3510

SIDE-RAIL MODULAR, LIGHTWEIGHT LOAD-CARRYING PANELS AND RACKS

CROSS REFERENCE TO RELATED APPLICATIONS

This is a continuation-in-part patent application which claims priority under 35 U.S.C. § 120 to U.S. Ser. No. 17/651,259, filed Feb. 16, 2022, now U.S. Pat. No. 12,049, 197, issued Jul. 30, 2024, which is a continuation-in-part patent application which claims priority under 35 U.S.C. § 120 to U.S. Ser. No. 17/390,434, filed Jul. 30, 2021, now U.S. Pat. No. 11,279,421, issued Mar. 22, 2022. These patent applications are hereby incorporated by reference in their entireties herein, including without limitation, the specification, claims, and abstract, as well as any figures, tables, appendices, or drawings thereof.

FIELD OF THE INVENTION

The present invention relates generally to an apparatus and/or corresponding method of use in at least the aftermarket, automotive accessories industry. More particularly, but not exclusively, the present invention relates to brackets and methods for installing modular, lightweight load-carrying panels and racks on automobiles, which, for example, can allow for the more secure mounting of cargo to the sidewall(s) of a truck bed.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Pickups are historically well suited for towing and hauling. The cargo bed can vary in size according to whether the vehicle is optimized for cargo utility or passenger comfort. Most have fixed side walls and a hinged tailgate. Cargo beds are normally found in two styles: step-side or fleet-side. A step-side bed has fenders which extend on the outside of the cargo area. A fleet-side bed has wheel-wells inside the bed. The exact placement of the wheel well thus vastly vary depending on the make and model of the pickup.

Construction and landscaping crews rely heavily on the use of pickups for everyday work. Pickups are the preferred vehicle because the separation of the bed from the crew can help keep dirt and other unwanted debris from entering the cab of the vehicle. Many of these pickup have beds that are full of gear at all times. As a result, the pickup bed looks like a jumbled mess. This is not usually the fault of the crew, as crews are unfathomably busy during the summer months.

In recent history, pickups have been used as light improvised fighting vehicles in military applications. Pickups are well-suited for such applications because of their versality, four wheel drive, and open-backs. The open-back in particular allows for the mounting of a machine gun, anti-aircraft gun, rotary cannon, anti-tank weapon, anti-tank gun, ATGM, mortar, multiple rocket launcher, recoilless rifle or other support weapon, somewhat like a light military gun truck or potentially even a self-propelled gun. In such situations, the pickup is colloquially referred to as a "technical". In more professional terms, the pickup is referred to as a non-standard tactical vehicle ("NSTV").

Because the United States Department of Army ("the U.S. Army") has derived technological advances in military applications with inspiration from the automobile industry, it stands to reason that the automobile industry can advance technology by taking inspiration from military technology and, for example, applying said technology to advance the construction and landscaping industries. One such technology that has not be thoroughly explored is modular lightweight load-carrying equipment ("MOLLE") technology, first patented by the U.S. Army by way of U.S. Pat. No. 5,724,707. Such technology entered the public domain in 2016 and is thus ripe for improvement by private industry.

Modular ("MOLLE") is an item that replaced the aging all-purpose, lightweight, individual carrying equipment ("ALICE") pack. United States Marines report the modular load carriage system is more comfortable and durable. Specifically, MOLLE technology improved over ALICE by including a more robust frame. Instead of the tubular aluminum used with the ALICE, a new anatomically-contoured frame made with plastic originally used in automobile bumpers has dramatically increased durability, functioning in temperatures ranging from negative forty ($-40$) to one hundred twenty (120) degrees Fahrenheit (° F.). ALICE frames were known to break in airborne operations. This is because ALICE frames were known to crack after a single drop at thirty three feet per second (33 ft/s). MOLLE frames are capable of withstanding the same abuse fivefold without taking any damage.

Components of the MOLLE system developed by the United States Army are described as follows.

MOLLE advanced load-carrying abilities by introducing a new suspension system. Heavily-padded shoulder straps and a waist belt are adjustable for varying torso lengths, eliminating the two sizes of ALICE. The U.S. Army Research Institute of Environmental Medicine, located at Natick, assisted with biomechanical studies to find the most efficient way to carry loads and investigated the interaction between different load-carriage equipment and human performance. More weight is distributed at the shoulders and hips, and during a prolonged road march, soldiers can shift the weight to where it feels more comfortable.

The fighting load carrier ("FLC") of MOLLE replaced the load bearing equipment ("LBE") web belt and suspenders of ALICE, which better distributed weight across soldiers' torsos and significantly increased the amount of ammunition soldiers could carry. The MOLLE vest has no metal clips or hooks that can be awkward and dig into the skin, and has an H-harness in back to minimize heat buildup. The MOLLE vest is adjustable to all sizes, and because the vest sits high, soldiers can fasten the MOLLE frame waist belt underneath the FLC to distribute some of the load to the hips. Three flap pockets on the FLC each hold two 30-round magazines, two grenade pockets, and two canteen pouches.

The tactical assault panel ("TAP") later replaced the FLC The TAP is a bib-like chest rig that can be used alone or mounted on the improved outer tactical vest or solider plate carrier system. The TAP is covered with pouch attachment ladder system ("PALS") webbing and storage for up to eight rifle magazines (six 5.56 magazines+two 7.62 North Atlantic Treaty Organization ("NATO") magazines or eight 5.56 magazines).

Based on user feedback on the original system, the MOLLE requirements were modified to eliminate the need for a quick-release frame that integrates into the load-bearing vest. Spare buckles come with each MOLLE and are simple to replace.

The U.S. Army MOLLE also includes a rucksack with a front pocket to hold a claymore antipersonnel mine. A rucksack having two thousand cubic inches (2000 in$^3$) is referred to as an assault pack; a rucksack having three thousand cubic inches (3000 in³) is referred to as a medium rucksack, is designed to be worn over body armor, supports loads up to sixty pounds (60 lbs), and features a large main compartment with internal dividers for items like the hydration system, 60 mm mortar rounds, along with a harness for ASIP radios; and a rucksack having four thousand cubic inches (4000 in³) features a large main compartment with an internal divider between the upper and lower half for organizing loads, and includes some ALICE technology on the side to support legacy items such as the 2 quart canteen pouch. It is highly adjustable for comfort and load distribution. Two smaller compartments are located outside the main compartment. All packs are adorned in PALS webbing. Pouches of various utility that can be attached wherever PALS webbing exists. One type is a sustainment pouch. Other types of MOLLE pouches are commonly used to carry ammunition, gas masks, batons, flares, grenades, handcuffs and pepper spray, and custom pouches can include PALS-compatible pistol holders, hydration pouches and utility pouches. These pouches are normally secured through the use of straps, ALICE clips or speed clips. Inside the rucksack is a bandolier with a capacity for six (6) thirty (30) round magazines and a removable tactical radio pocket. A detachable sustainment pouch on each side is big enough to hold a ready to eat meal with room to spare. Underneath the rucksack, a sleeping bag compartment was designed to hold the Army's modular sleeping bag. Every U.S. Army MOLLE comes with a tube-delivered water pouch for on-the-move hydration to supplement the one-quart canteen.

All of the larger pouches of MOLLE, such as the outside rucksack pouches, have D-rings for carrying with a sling and use plastic see-through identification windows so soldiers don't have to marker or tape their name onto the MOLLE's camouflaged, urethane-coated nylon fabric. Each system comes with two 6-foot lashing straps for carrying large objects, such as a mortar plate or five-gallon containers. If one of the plastic buckles breaks, a repair kit carries a bag of spares for simple replacement.

The nylon mesh vest has removable pockets to accommodate different carrying needs and is one of the main components of the MOLLE system. Rifleman, grenadier, pistol, squad assault weapon gunner, and medic configurations of the fighting load carrier are examples of the versatility of the MOLLE.

Thus, there exists a need to advance the state of the art by implementing a secure, lightweight modular rack capable of carrying loads caused by cargo and other equipment for automobile applications, similar to how the military advanced the state of the art with respect to how soldiers carry gear on foot.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to provide custom engineered rack systems that fit directly to each make and model using existing OEM mounting points in the bed.

It is still yet a further object, feature, and/or advantage of the present invention to organize, easily access, and secure gear.

It is still yet a further object, feature, and/or advantage of the present invention to utilize said modular lightweight racks with (1) other like modular lightweight racks, (2) other PALS components, (3) universal vehicle mounts for rifles and shotguns, and/or (4) other gear strapping systems to hold cargo in place on the roughest roads.

The modular, lightweight load-carrying panels and racks disclosed herein can be used in a wide variety of applications. For example, the modular, lightweight load-carrying panels and racks can be used for secure transportation, tactical applications, and/or to enhance the functional capabilities of the sidewall(s) of the truck bed.

It is preferred the apparatus be safe, cost effective, and durable. For example, the modular, lightweight load-carrying panels and racks can be adapted to resist thermal transfer and electric conductivity. Furthermore, the modular, lightweight load-carrying panels and racks can be adapted so as to more easily prevent failure (e.g., cracking, crumbling, shearing, creeping) due to being exposed to excessive and/or prolonged forces (e.g., tensile, compressive, and/or balanced forces).

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention. Ornamental aspects of the embodiments provided herein can be specifically selected such that they best complement the make, model, year, and/or color of the vehicle. Such makes and models can, in non-limiting examples, comprise: Jeep Gladiator, Toyota Tacoma, Toyota Tundra, Ford Ranger, Ford F-150, Ford Super Duty, Nissan Frontier, Nissan Titan, Chevrolet Colorado, Chevrolet Silverado Light Duty ("LD"), Chevrolet Silverado Heavy Duty ("HD"), Dodge Ram LD, and Dodge Ram HD.

Methods can be practiced which facilitate use, manufacture, assembly, maintenance, and repair of the modular, lightweight load-carrying panels and racks which accomplish some or all of the previously stated objectives.

The modular, lightweight load-carrying panels and racks described herein can be incorporated into systems or kits which accomplish some or all of the previously stated objectives.

According to some aspects of the present disclosure, a load carrying panel for mounting objects to, said load carrying panel comprises a mounting panel comprising mounting slits, an angled panel attached to the mounting panel via a connecting portion, a plurality of apertures disposed on the angled panel such that a plurality of intervals and a median are disposed between the plurality of apertures, and a top portion.

According to some additional aspects of the present disclosure, the load carrying panel further comprises a fillet between the top portion and the angled panel.

According to some additional aspects of the present disclosure, the load carrying panel further comprises two rows of the plurality of apertures.

According to some additional aspects of the present disclosure, the load carrying panel further comprises three rows of the plurality of apertures.

According to some additional aspects of the present disclosure, the load carrying panel forms an angle between the angled panel and the mounting panel is an acute angle. The acute angle can be between forty-five degrees and seventy-five degrees; the acute angle preferably being between fifty degrees and seventy degrees; the acute angle more preferably being between fifty-five and sixty-five degrees; and the acute angle most preferably being approximately sixty degrees.

According to some additional aspects of the present disclosure, the load carrying panel the plurality of apertures includes rectangular-shaped or stadium-shaped apertures.

According to some additional aspects of the present disclosure, the load carrying panel the mounting slits extend along the mounting panel from the connecting portion to a distance of not less than 0.2 inches from an end of the mounting panel.

According to some additional aspects of the present disclosure, the load carrying panel the mounting slits comprises six mounting slits.

According to some other aspects of the present disclosure, a system for a modular load carrying panel assembly that comprises a load carrying panel which comprises a mounting panel comprising mounting slits, an angled panel attached to the mounting panel via a connecting portion, a PALS grid disposed on the angled panel; and a railing which comprises a pair of first mounting apertures that extend through the railing from a top of the railing to a bottom of the railing, a pair of T-shaped channels positioned on a top of the railing, and a channel extending through the railing from a first distal end to a second distal end, wherein the channel comprises a T-shaped channel.

According to some additional aspects of the present disclosure, the system further comprises second mounting apertures that extend into both a first a side of the railing and a second side of the railing.

According to some additional aspects of the present disclosure, the system further comprises a T-shaped channel is positioned on the bottom of the railing.

According to some additional aspects of the present disclosure, the channel comprising a T-shaped channel is disposed in a center of the railing on the bottom, the railing further comprising a pair of through-channels extending through the railing from the first distal end to the second distal end.

According to some additional aspects of the present disclosure, the second mounting apertures extend into the pair of through-channels.

According to some additional aspects of the present disclosure, the system further comprises a top portion comprising a fillet on the load carrying panel.

According to some additional aspects of the present disclosure, an angle formed between the angled panel and the mounting panel is an acute angle. The acute angle can be between forty-five degrees and seventy-five degrees; the acute angle preferably being between fifty degrees and seventy degrees; the acute angle more preferably being between fifty-five and sixty-five degrees; and the acute angle most preferably being approximately sixty degrees.

According to some additional aspects of the present disclosure, the load carrying panel is fixedly attached to the railing via screws or nuts and bolts.

According to yet additional aspects of the present disclosure, a method for attaching any of the previously explained system to a vehicle, that comprises connecting the mounting panel to the railing via screws or nuts and bolts through the mounting slits and the pair of T-shaped channels, fastening the modular load carrying assembly to a vehicle via the channel.

According to some additional aspects of the present disclosure, the modular load carrying assembly is fastened to a top of the sidewalls of the vehicle.

According to some additional aspects of the present disclosure, the modular load carrying assembly is fastened to a bed of the vehicle.

According to some additional aspects of the present disclosure, the modular load carrying assembly is fastened to an interior of the sidewalls of the vehicle, wherein a plurality of modular load carrying assemblies are fastened to the interior of the sidewalls of the vehicle so as to create shelving with the system.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

FIG. 2A illustrates a truck bed without any brackets or panels installed; FIG. 2B illustrates brackets installed in the truck bed; FIG. 2C illustrates brackets and panels installed in the truck bed; and FIG. 2D illustrates brackets and panels installed in the truck bed with cargo mounted thereto. FIG. 2E and FIG. 2F detail mounting the brackets to the truck bed.

FIGS. 3A-3D show various accessories that can be used with modular, lightweight load-carrying panels of FIG. 1. More particularly, FIG. 3A illustrates a first embodiment of a one-piece rubber clamp. FIG. 3B illustrates a second embodiment of a one-piece rubber clamp. FIG. 3C illustrates a third embodiment of a one-piece rubber clamp. FIG. 3D illustrates a fourth embodiment of a one-piece rubber clamp.

FIG. 4A shows a driver-side perspective view of the system; FIG. 4B show a rear perspective view of the system; FIG. 4C shows a perspective view of each of the panels within the system; FIG. 4D shows a detailed view of a front panel within the system; FIG. 4E shows a detailed view of a driver-side panel within the system; FIG. 4F shows a detailed view of a passenger-side panel within the system; and FIG. 4G shows a component view of the brackets within the system.

FIG. 5A shows a driver-side perspective view of the system; FIG. 5B show a rear perspective view of the system; FIG. 5C shows a perspective view of each of the panels within the system; FIG. 5D shows a detailed view of a front panel within the system; FIG. 5E shows a detailed view of a driver-side panel within the system; FIG. 5F shows a detailed view of a passenger-side panel within the system; and FIG. 5G shows a component view of the brackets within the system.

FIG. 6A shows a driver-side perspective view of the system; FIG. 6B show a rear perspective view of the system; FIG. 6C shows a perspective view of each of the panels within the system; FIG. 6D shows a detailed view of a front panel within the system; FIG. 6E shows a detailed view of a driver-side panel within the system; FIG. 6F shows a detailed view of a passenger-side panel within the system; and FIG. 6G shows a component view of the brackets within the system.

FIG. 7A shows a driver-side perspective view of the system; FIG. 7B show a detailed view of cargo within the system; FIG. 7C shows a perspective view of each of the panels within the system; FIG. 7D shows a detailed view of a front panel within the system; FIG. 7E shows a detailed view of a first driver-side panel within the system; FIG. 7F shows a detailed view of a first driver-side panel within the system; FIG. 7G shows a detailed view of a first passenger-side panel within the system; FIG. 7H shows a detailed view of a first passenger-side panel within the system; and FIG. 7I shows a component view of the brackets within the system.

FIG. 8A shows a driver-side perspective view of the system; FIG. 8B show a detailed view of cargo within the system; FIG. 8C shows a perspective view of each of the panels within the system; FIG. 8D shows a detailed view of a front panel within the system; FIG. 8E shows a detailed view of a driver-side panel within the system; FIG. 8F shows a detailed view of a passenger-side panel within the system; and FIG. 8G shows a component view of the brackets within the system.

FIG. 9A shows a driver-side perspective view of the system; FIG. 9B show a driver-side perspective view of cargo mounted to panels within the system; FIG. 9C shows a perspective view of each of the panels within the system; FIG. 9D shows a detailed view of a front panel within the system; FIG. 9E shows a detailed view of a driver-side panel within the system; FIG. 9F shows a detailed view of a passenger-side panel within the system; and there exists no view of the brackets within the system, as mounting brackets are not required in this embodiment.

FIG. 10A shows a driver-side perspective view of the system; FIG. 10B show a rear perspective view of the system; FIG. 10C shows a perspective view of each of the panels within the system; FIG. 10D shows a detailed view of a front panel within the system; FIG. 10E shows a detailed view of a driver-side panel within the system; FIG.

10F shows a detailed view of a passenger-side panel within the system; and FIG. 10G shows a component view of the brackets within the system.

FIG. 11A shows a driver-side perspective view of the system; FIG. 11B show a rear perspective view of the system; FIG. 11C shows a perspective view of each of the panels within the system; FIG. 11D shows a detailed view of a front panel within the system; FIG. 11E shows a detailed view of a driver-side panel within the system; FIG. 11F shows a detailed view of a passenger-side panel within the system; and FIG. 11G shows a component view of the brackets within the system.

FIG. 12A shows a driver-side perspective view of the system; FIG. 12B show a rear perspective view of the system; FIG. 12C shows a perspective view of each of the panels within the system; FIG. 12D shows a detailed view of a front panel within the system; FIG. 12E shows a detailed view of a driver-side panel within the system; FIG. 12F shows a detailed view of a passenger-side panel within the system; and FIG. 12G shows a component view of the brackets within the system.

FIG. 15A shows a perspective view, FIG. 15B shows a side elevation view, and FIG. 15C shows a bottom plan view of the well nut.

FIGS. 20A-20C exemplifies one embodiment of the modular, lightweight load-carrying panel system for a tailgate, said embodiment being specifically designed for a Chevy Silverado/Sierra HD-Multi-Pro. FIG. 20A shows a first plate of the system, FIG. 20B shows a second plate of the system, and FIG. 20C shows a third plate of the system.

FIG. 22A shows a first plate of the system, FIG. 22B shows a second plate of the system, and FIG. 22C shows a third plate of the system.

FIG. 24 exemplifies one embodiment of the modular, lightweight load-carrying panel system for a tailgate, said embodiment being specifically designed for a Ford Bronco.

FIGS. 25A-B exemplifies one embodiment of the modular, lightweight load-carrying panel system for a tailgate, said embodiment being specifically designed for a Ford F150 with a work surface. FIG. 25A shows a first plate of the system and FIG. 25B shows a second plate of the system.

FIG. 26 exemplifies one embodiment of the modular, lightweight load-carrying panel system for a tailgate, said embodiment being specifically designed for a Ford F150.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
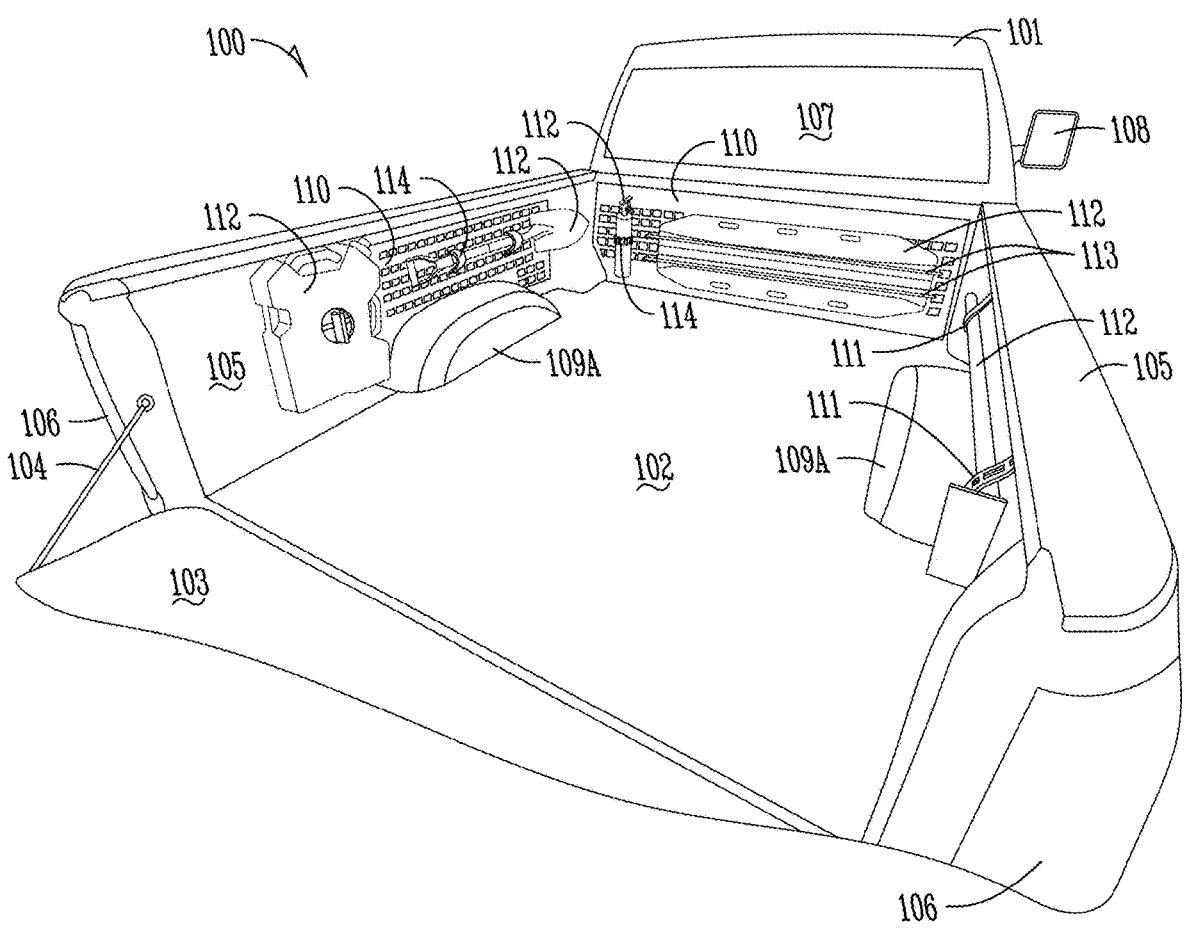
FIG. 1 shows an environmental perspective view of a modular, lightweight load-carrying panel system.

Referring now to the figures, FIG. 1 shows a pickup truck 100 with a cab 101 and a bed 102. The bed 102 can be a short, standard, or long bed of any suitable make or model of pickup 100. Pickups 100 usually sit higher than normal cars so they are often equipped with running boards or side steps below the doors. This can make it much easier to get in and out of a pickup 100.

Just in front of the pickup truck bed 102, is the cabin or cab 101. The cab 101 is the portion of the pickup 100 that carries the driver (in the United States, left-side) of the pickup and any passengers (in the United States: right-side). Pickup cabs 101 can come in single cab (one full size row of seating), extended cab (two rows of seating, front row is full size, back row is not full size), and crew cab (two full size rows of seating) configurations. The cab 101 typically comprises a shell and is enclosed by a roof and side doors (anywhere from 2 to 4 doors), windows on all 4 sides, and typical vehicle interior parts. The vehicle interior parts can include seats, a dashboard, climate controls, driving controls (steering wheel, shifter, pedals, etc.), and the like.

The bed 102 of the pickup 100 typically includes a hauling surface, open-back, and/or box for hauling cargo 112. The bed 102 can be a standard pickup box, flatbed, or utility bed. The floor of the bed 102 is typically flat. The floor extends from a cab end of the bed 102 to a tailgate end of the bed 102 and from a passenger-side sidewall 105 to the driver-side sidewall 105. Most pickup beds 102 have solid round loops for tie down points in the corners to attach rope or ratchet straps to. This allows drivers to tie down and secure some types of cargo 112 being hauled by the pickup 100. The inside the bed 102 often comes from the factory with just a painted surface. When the bed gets used, this paint wears and so many beds 102 will have liner added to them. A bed liner protects the bed from being dinged or scratched up and keeps it looking aesthetically pleasing. Sometimes, the beds 102 will even include lockable storage boxes or other like cargo storing equipment on one or more sides of the bed 102.

To secure the tailgate 103 to the bed 102, some mechanical attachment exists therebetween. Additionally, a cable 104 can be employed to limit tailgate travel. The tailgate cable 104 can comprise a flexible metal. Additionally, one or more latch rods can be employed near the rear bumper under the back of the pickup bed 102 to control and/or resist a rate of lowering the tailgate 103. The latch rod can comprise a tailgate lock, curved bar, hydraulic strut, or the like. Latch rod(s) are typically attached to the pickup frame or chassis near the rear end of the sidewalls 105, though could also be permanently attached to the tailgate 103. When the tailgate 103 is closed, latch rod(s) latch shut and can be locked to keep the bed 102 secure. The front wall next to the cab is often called a bulkhead.

The sidewalls 105 confine the space of the pickup bed 102. The top of the sidewalls 105 have reinforced railing known as bed rails. The bed rails can support weight to install many different accessories like caps & covers to close in the bed 102, racks for hauling larger & longer items, and the like. The sidewalls 105 help contain the cargo 112 within so the cargo 112 does not fall off onto the road during transport.

All pickup beds 102, regardless of the type, will contain a set of tail lights 106 at the rear corners of the sidewalls 105. Each of these lights 106 will contain a brake light, turn signals or blinkers, reverse lights, and tail lights that turn on when the parking lights or headlights are turned on.

Conspicuity for the rear of a vehicle is provided by the tail lights 106. These are required to produce only red light and to be wired such that they are lit whenever the front position lamps are lit, including when the headlamps are on. Tail lights 106 may be combined with the vehicle's other stop lights and/or be separate from them. In combined-function installations, the tail lights 106 produce brighter red light for the stop lamp function and dimmer red light for the rear position lamp function. Regulations worldwide typically stipulate minimum intensity ratios between the bright (stop) and dim (rear position) modes, so that a vehicle displaying rear position lamps will not be mistakenly interpreted as showing stop lamps, and vice versa.

The bulkhead includes back glass 107. The back glass 107 also called rear window glass, rear windshield, or rear glass, is the piece of glass opposite the windshield in the pickup 100. Back glass 106 can be made from tempered glass, also known as safety glass, which when broken will shatter into small, round pieces. This can be different from a front windshield, which is made of laminated glass, glass which consists of two pieces of glass, with vinyl therebetween.

There will also be a set of side view mirrors 108 attached to the front doors. Many pickup trucks 100 will be equipped with over-sized towing mirrors to be able to see around the wide trailers they often tow.

Cargo beds 102 are normally found in two styles: step-side or fleet-side. A step-side bed has fenders which extend on the outside of the cargo area. A fleet-side bed has wheel-wells 109A inside the bed 102, under the wheels 109B that support the pickup 100 are located. The wheel 109B, as a non-limiting example, can comprise an off-road tire and/or all-terrain tires. Off-road tires employ deep tread to provide more traction on unpaved surfaces such as loose dirt, mud, sand, or gravel. Compared to ice or snow tires, off-road tires lack studs but contain deeper and wider grooves meant to help the tread sink into mud or gravel surfaces.

Many embodiments of the aftermarket, modular, lightweight panels 110 and racks are described herein. The panels 110, in connection with mounting brackets 111, are a means through which cargo 112 can be stored, secured, and/or organized within the truck bed 102 during transport. The cargo 112 can include weaponry, a spare battery, a tank for holding liquids, machinery, tools, equipment for construction or landscaping, medical gear, or any other object wished to be transported by the driver and/or passengers of the pickup 100.

The panels 110, in particular are laser cut with laser optics and computer numerical control ("CNC cut"). The panels 110 are preferably cut from heavy gauge $\frac{1}{10}$ inch thick 6000 series aluminum, such that the panels 110 are lightweight and substantially rustproof. In some embodiments, the panels 110 are designed to carry a maximum distributed load of 200 lbs, and are thus not meant to be used as a tie down point for objects having greater weight than this. During use, the panels 110 are recessed completely from a top edge of the sidewalls 105, and are thus compatible with bed cover. Moreover, the panels 110 typically include a black mini-texture powder coat finish, but can also be sprayed with bed liners and/or be adapted so as not to damage existing bed liners. The panels 110 can be provided separately or in groups to allow for maximum customization. The panels 110 can include driver-side, passenger-side, and cab-side (front) panels. Each panel of the panels 110 is custom fit designs engineered for every make and model and makes for the perfect addition for over-landing builds. The panels 110 can also be configured to provide clearance for factory tie downs and access to bedside outlets and lighting. The panels 110 allow for keeping gear organized, easily accessible, and secure while maximizing bed space. The panels 110 can be complemented with other modular lightweight load-carrying panels, pouch attachment ladder systems, aftermarket clamps and fasteners 114, and many other gear strapping systems 113 that hold cargo 112 in place on the roughest roads. The fasteners 114 can comprise clamps, ties, cables, screws, nuts, bolts, pins, rivets, staples, washers, grommets, latches (including pawls), ratchets, clasps, flanges, adhesives, welds, or any combination thereof may be used to facilitate fastening.

The Putco truck bed Molle panels have an easy, no-drill installation that uses the existing OEM mounting points in the existing bed 102. The panels provide clearance for factory tie downs and access to bedside outlets and lighting, so that the driver is not giving up any functionality. To install and use the panels 110, the installation, mounting, and use steps in FIGS. 2A-2D can be followed. For example, installation can be accomplished by the driver in less than an hour.

Figures 2A, 2B, 2C, 2D:
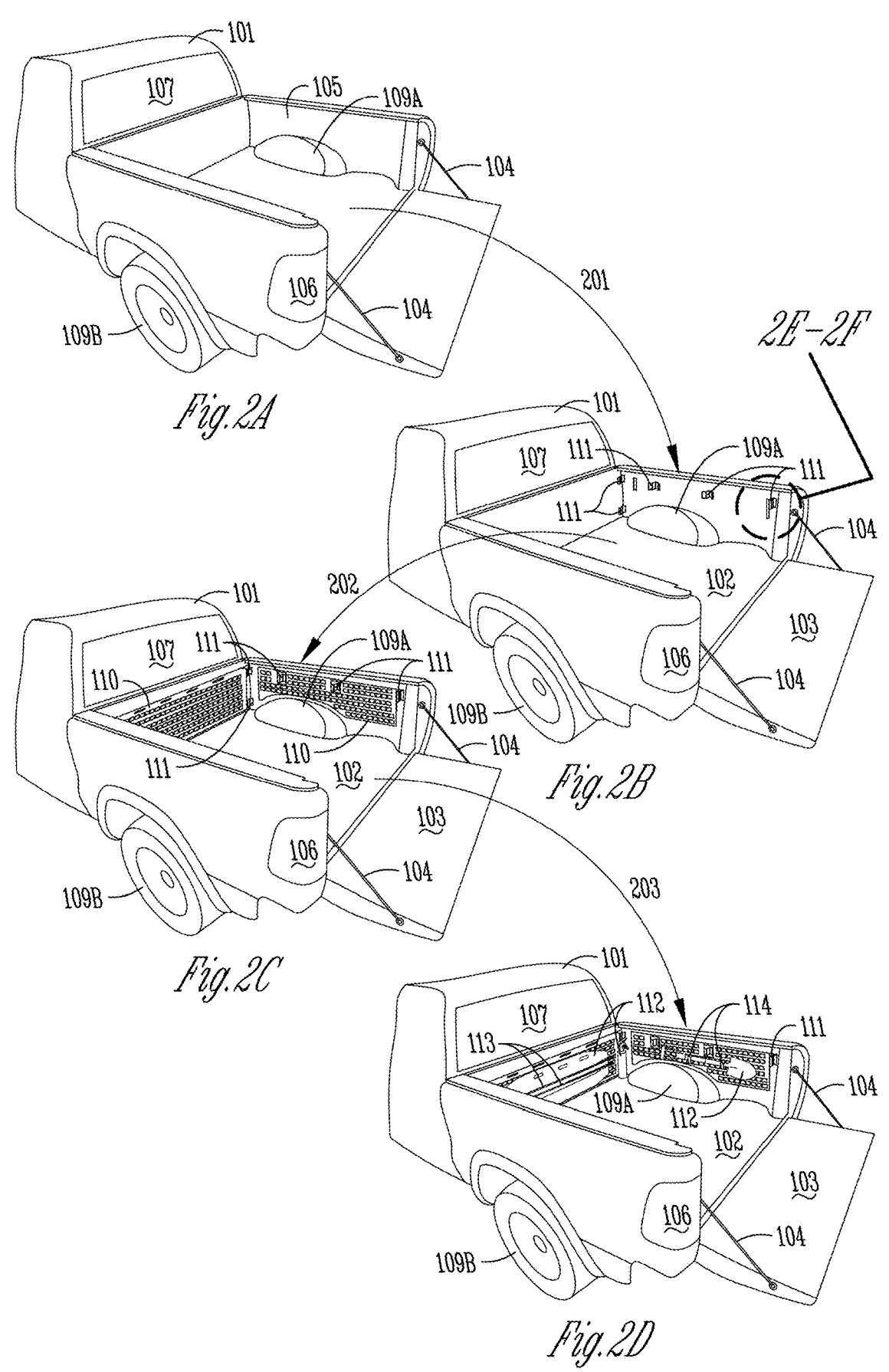
FIGS. 2A-2F demonstrates a step-by-step method for installing brackets used to mount the modular, lightweight load-carrying panel system of FIG. 1 and use of same. More particularly.
Figures 2E, 2F:
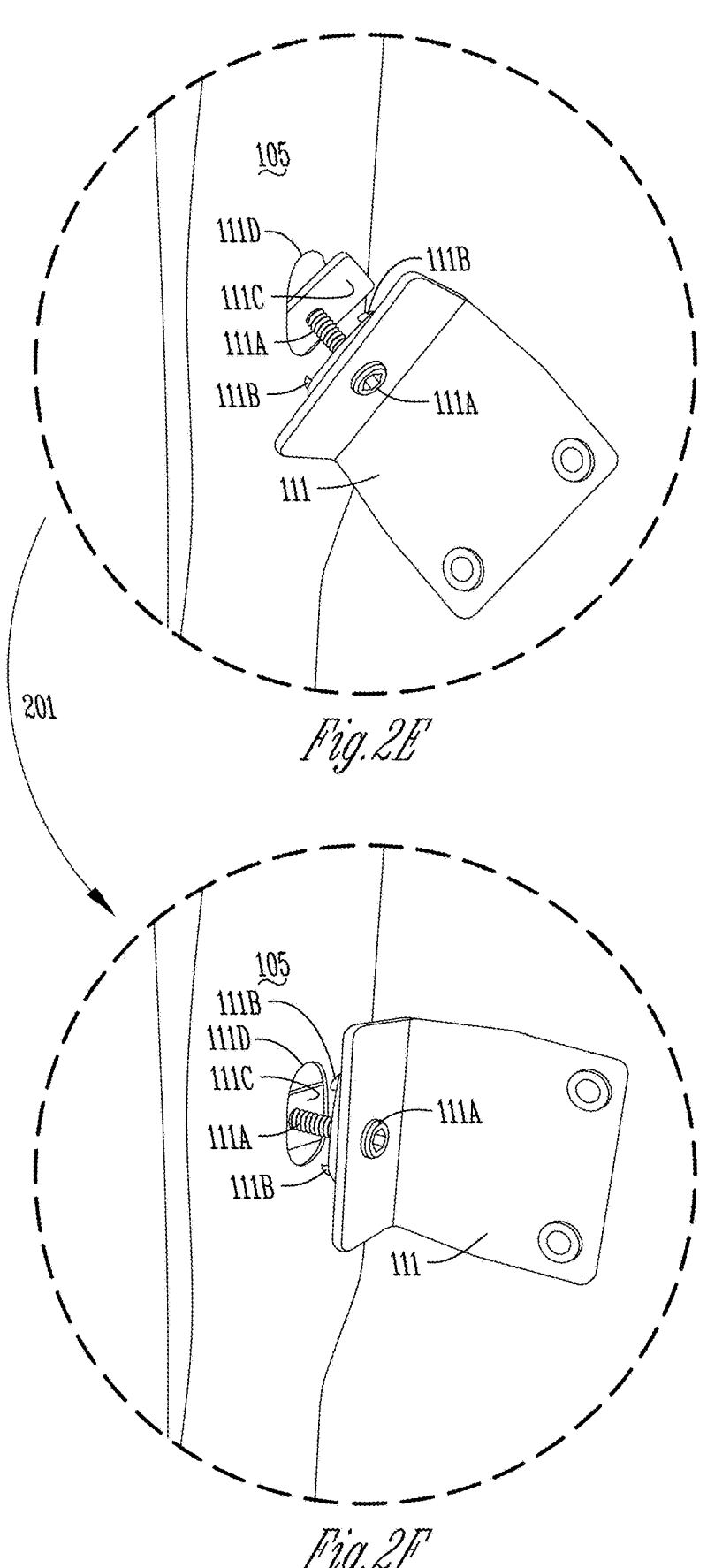

In some embodiments, to mount 201 the brackets 111 to the truck bed 102, the installer starts by loosely assemble the brackets 111 by combining a bolt 111A, tabbed washer 111B, and nut plate 111C. The bolt 111A can be put through the bracket 111 fist, then the tabbed washer 111B, and finally the nut plate 111C, as shown in FIGS. 2E-F. The assembled bracket 111 can then carefully be placed at an angle and inserted into existing OEM mount points (e.g. an oval hole 11D) in the bed 102, provided any plastic covers that come with the vehicle have already been removed, as shown in FIGS. 2E-2F. Once the nut plate 111C is placed perpendicularly within the existing OEM mount point, the installer can use their hands to hold the bracket 111 in place, while using the appropriate screwdriver (such as a hex key) to securely tighten the brackets 111. Usually, where more than one bracket 111 is being employed, the installer should refrain from completely tightening all of the brackets 111 in place until the process of tightening has been started for all brackets 111. Second, to attach 202 the panels 110 to the brackets 111, the panels 110 can simply be screwed on such that the panels 110 are in a properly mounted position. Third, the installer can secure 203 tools, gear, or other objects and equipment can with fasteners 114.

Specific examples 114A-D of said fasteners 114 are shown by way of FIGS. 3A-3D. More particularly, these particular fasteners are made from UV-resistant rubber and are thus very versatile. All include a base portion 301, but differ in terms of how they achieve securement. Choice of the preferred fastener 114A-114D depends on the application of same.

The embodiment 114A of FIG. 3A, for example, utilizes two flexible arms 302 having teeth 302 to facilitate securement. This embodiment 114A can hold objects from 2.5" to 9.5" in diameter. Each clamp 114A supports a safe working load of at least fifty pounds (50 lbs). This fastener 114A can mounts with three #10 bolts or screws and the mounting area of this fastener 114A is 6"×⅞".

In the embodiment 114B of FIG. 3B, several notches 304 are placed uniformly throughout the fastener 114B such that the installer can select a varied width to tightly encompass any cargo 112. This embodiment 114B can hold objects from ½" to 4.5" in diameter. Each clamp 114B supports a safe working load of fifty pounds (50 lbs). The break strength of this fastener 114B Break strength is one hundred twenty pounds (120 lbs). The fastener 114B mounts easily with two ¼" bolts or #14 wood or sheet metal screws, plus washers.

In FIG. 3C, additional washer plates 307 with central holes 306 can be used in connection with a large rectangular aperture 305 to facilitate securement. This embodiment 114C can hold objects from 1" to 2.25" in diameter. Each clamp 114C supports a safe working load of at least twenty five pounds (25 lbs). This fastener 114C can mounts with one #10 bolt or screws and the mounting area of this fastener 114C is 2¾"×⅞".

In FIG. 3D, a locking tab 308 is included to facilitate securement to the notches 304. This embodiment 114D can hold objects from ½" to ⅞" in diameter. Each clamp 114D supports a safe working load of at least twenty thirteen pounds (13 lbs). This fastener 114D can mounts with one #6 flathead screw and the mounting area of this fastener 114D is 1⅜"×1⅛".

Detailed aspects of the panels 110 and brackets 111 can be seen throughout the rest of the figures, with each numeric portion of the alphanumeric string denoting a distinct make and model of the vehicle.

In greater particularity, FIGS. 4A-4G show modular, lightweight load-carrying panels that include a panel flange 401, holes 402 in the panel flange 401, elongated slots 403 in a main body portion of the panel 110, a PALS grid 404, a recessed surface 405 that connects the panel flange 401 and the main body portion of the panel 110, and holes 406 in the main body portion of the panel 110, through which bolts and screws can be inserted. In such an embodiment, the bottom edge of the driver-side panel 400C and passenger-side panel 400B comprises a splined edge 407 that tracks the wheel well 109A of a Jeep Gladiator. At a rear end of the said panels 400B, 400C, a cutout with a substantially orthogonal angle 409 exists to give some clearance for tow hooks and/or a power outlet toward the rear of the bed 102. The front panel 400A is shown as symmetrical about the line of symmetry 408.

Figure 4A:
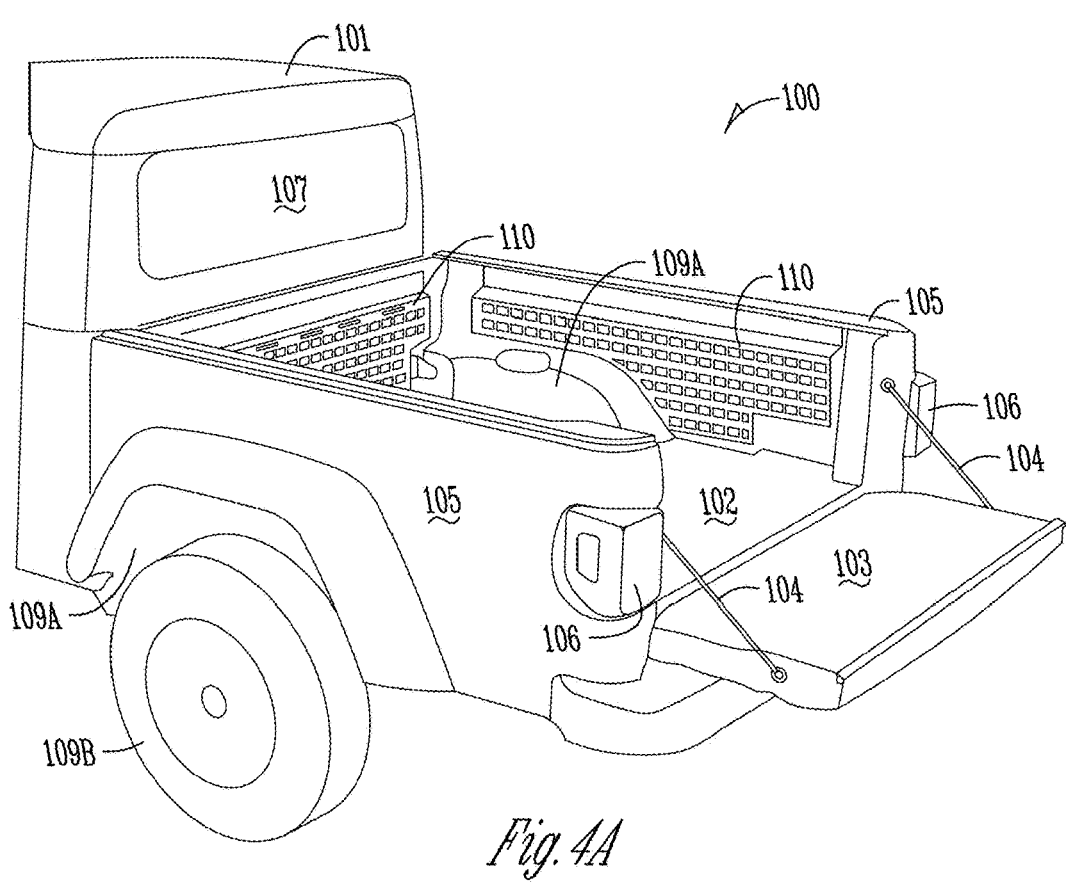
FIGS. 4A-4G exemplify one embodiment of the modular, lightweight load-carrying panel system, said embodiment being specifically designed for a Jeep Gladiator. More particularly.
Figure 4B:
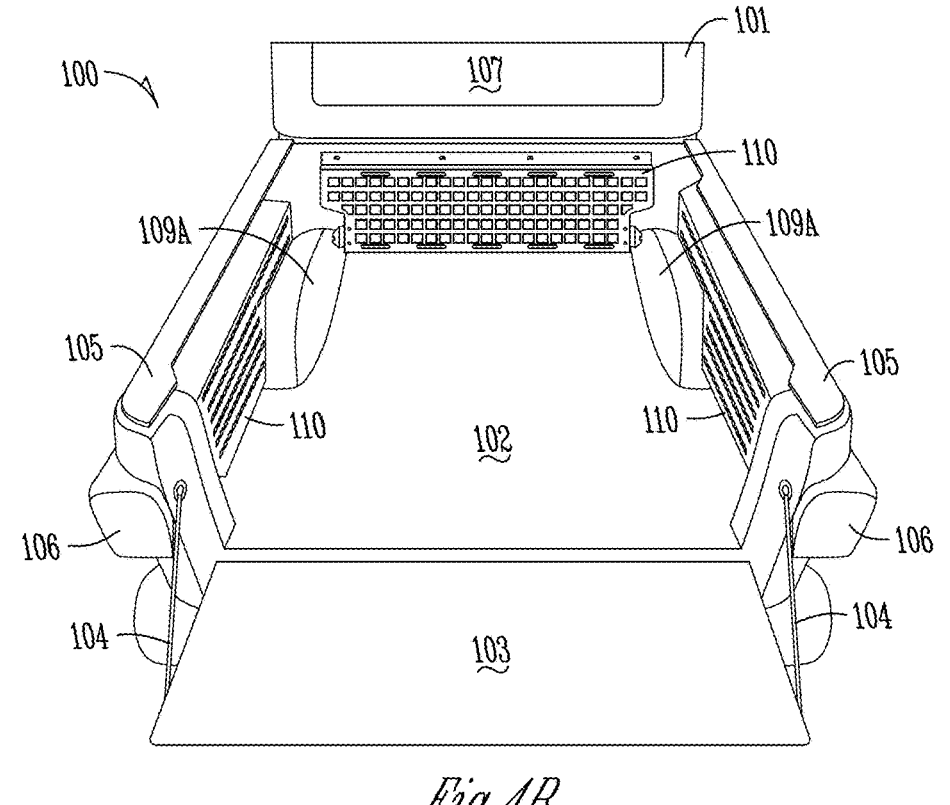
Figure 4C:
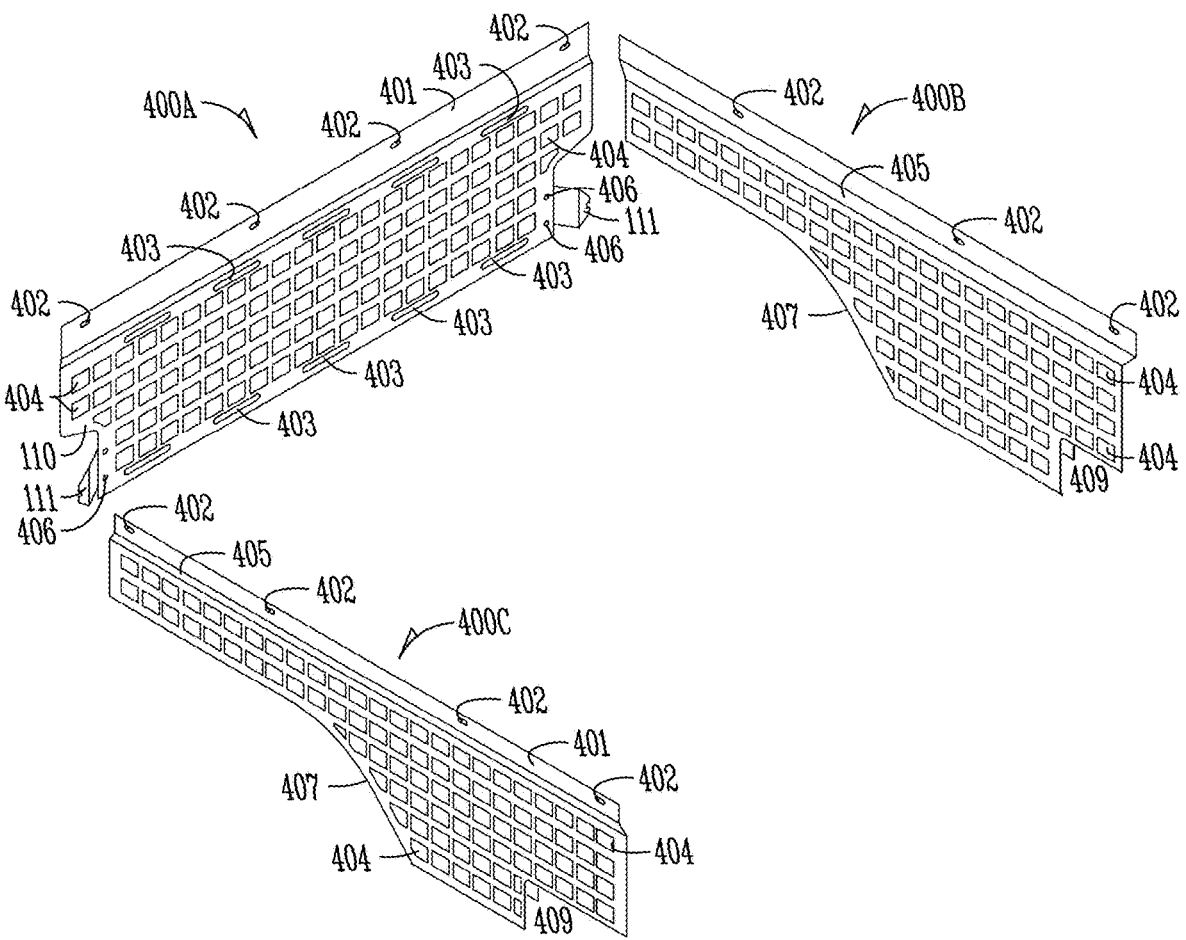
Figures 4D, 4E, 4F, 4G:
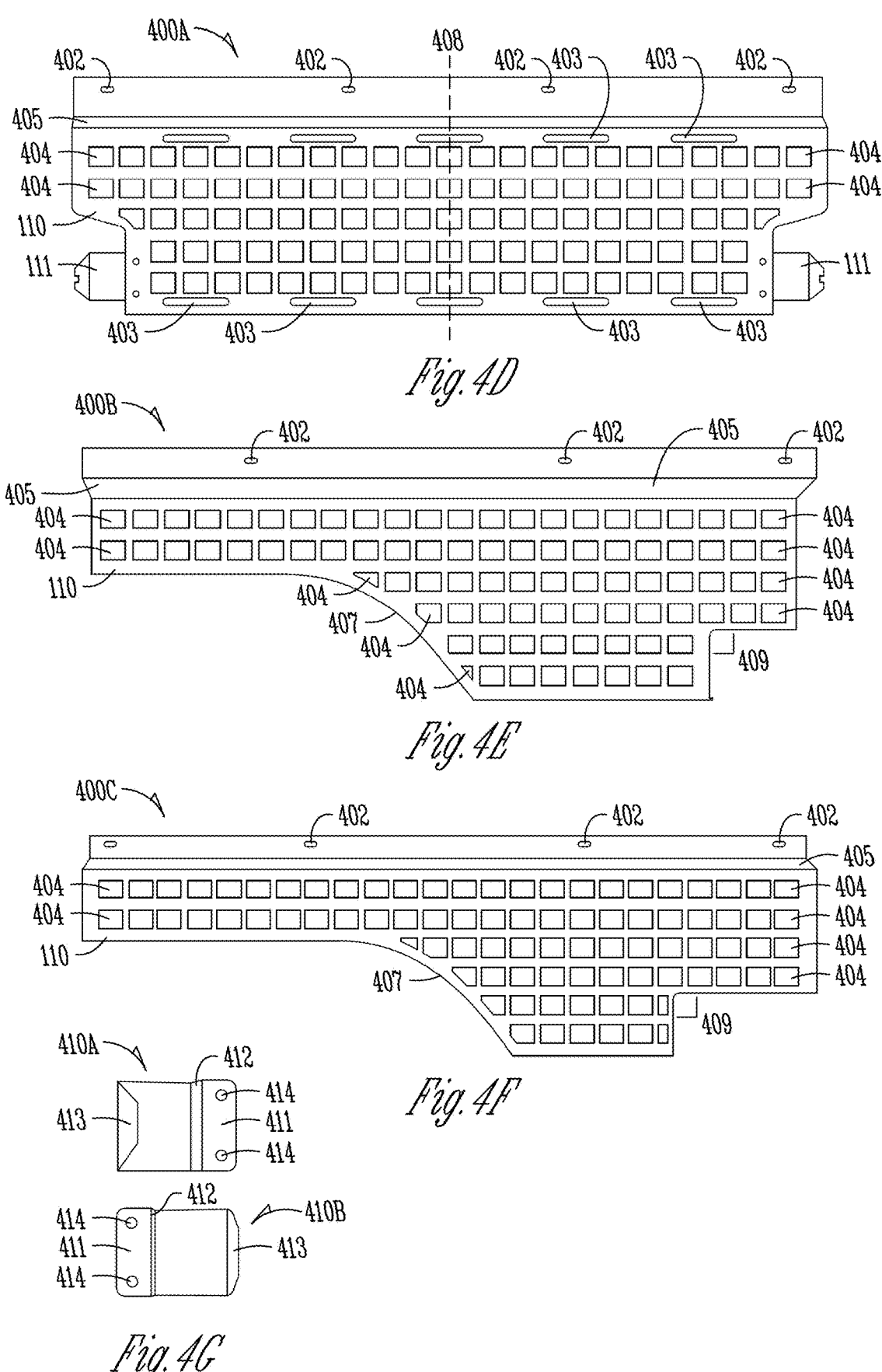

FIG. 4G, in particular, shows a first front bracket 410A, a second front bracket 410B, first bracket flange 411, a protruding surface 412 separating a main body portion of the bracket 111 from the first and second bracket flanges 411, 413, the second bracket flange 413, and bracket hole(s) 414, through which bolts and screws can be inserted.

Regarding a method of installation for the panels 400A, 400B, 400C of this particular embodiment, exemplary and enumerated installation instructions follow:

1. unscrew and remove all in-bed rails (Gladiator rails are attached with T30 Torx-head bolts);
2. unscrew and remove all tie-down hooks using a T40 Torx driver, place the second front brackets 410B behind the tie-down hooks, then fasten to the bed 102 re-using factory hardware;
3. loosely assemble a jam nut onto each of the rubber feet then screw the feet into the nutserts located on the bottom flange of the panels 400B, 400C (rubber feet are not always used);
4. place the panels 400A, 400B, 400C on the backside of the in-bed rails, then fasten to the bed 102 re-using the factory hardware (note: if the Gladiator did not come equipped with in-bed rails, the panels 400A, 400B, 400C can be bolted to the bed rail mounting holes with extra M6 bolts;
5. fasten the panels 400A, 400B, 400C to the corresponding brackets 410A, 410B using the M6 bolts and a T30 Torx driver;
6. adjust rubber feet on the panels 400B, 400C down until they are snug against the floor of the bed 102 then secure the rubber feet in place by tightening the jam nuts against the nutserts using a 10 mm wrench; and
7. once all the panels 400A, 400B, 400C are installed in the vehicle, ensure all fasteners are tightened until snug, but do not overtighten.

FIGS. 5A-5G show modular, lightweight load-carrying panels that include a panel flange 501, holes 502 in the panel flange 501, elongated slots 503 in a main body portion of the panel 110, a PALS grid 504, a recessed surface 505 that connects the panel flange 501 and the main body portion of the panel 110, and holes 506 in the main body portion of the panel 110, through which bolts and screws can be inserted. In such an embodiment, the bottom edge of the driver-side panel 500B and passenger-side panel 500C comprises a splined edge 507 that tracks the wheel well 109A of a Toyota Tacoma. The front panel 500A includes a pair of rectangular panel cutouts 509 that appear as notches along a top edge of the front panel 500A. The front panel 500A is shown as symmetrical about the line of symmetry 508.

Figures 5A, 5B:
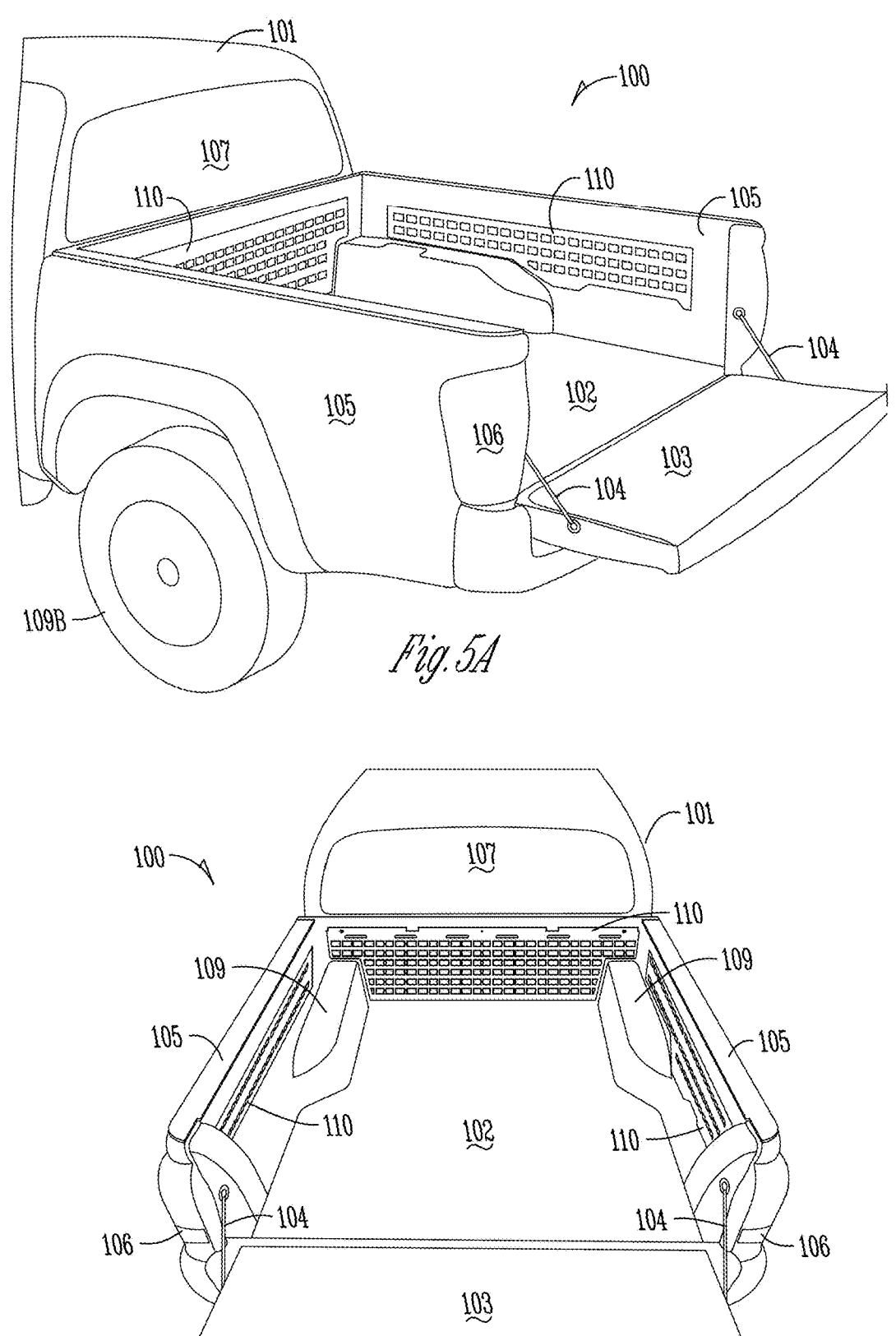
FIGS. 5A-5G exemplify one embodiment of the modular, lightweight load-carrying panel system, said embodiment being specifically designed for a Toyota Tacoma. More particularly.
Figure 5C:
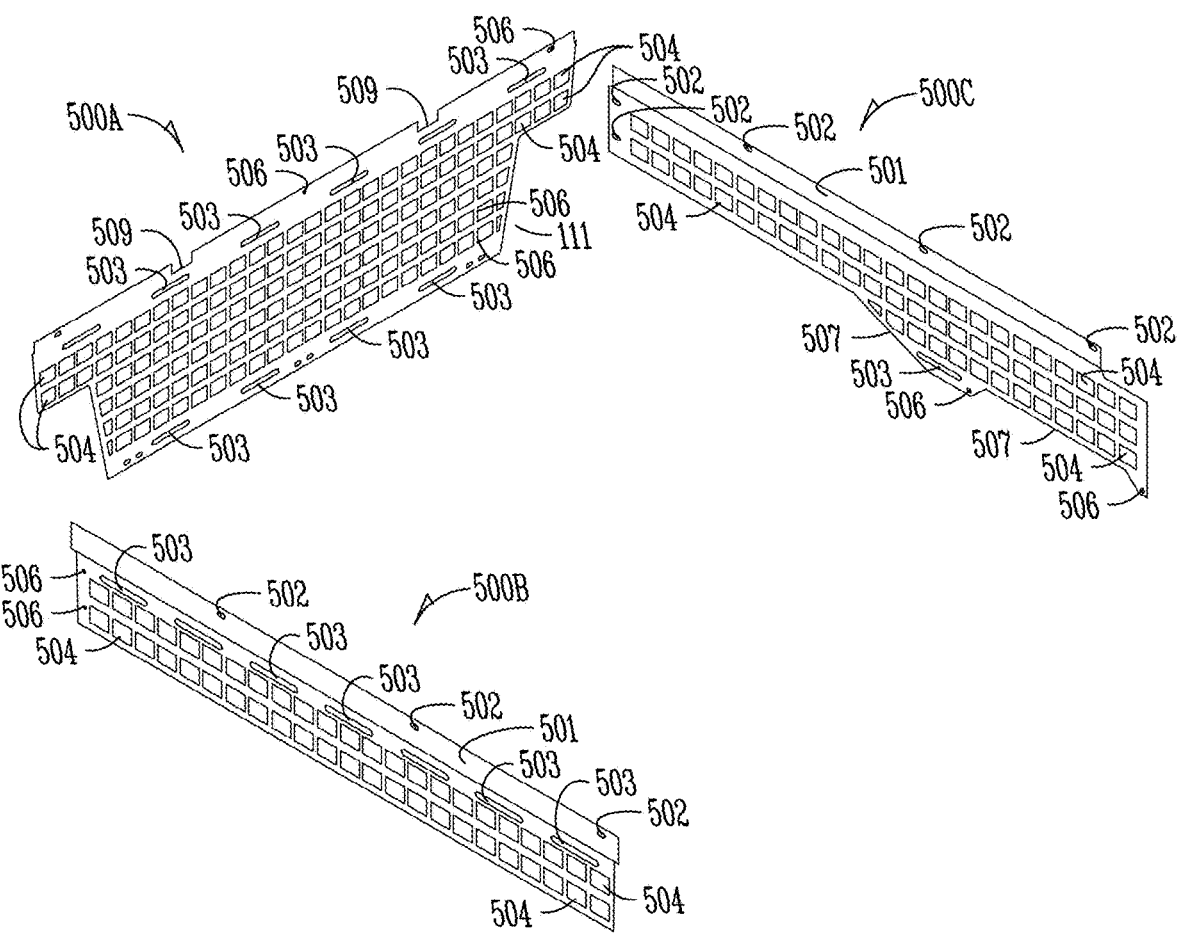
Figures 5D, 5E, 5F, 5G:
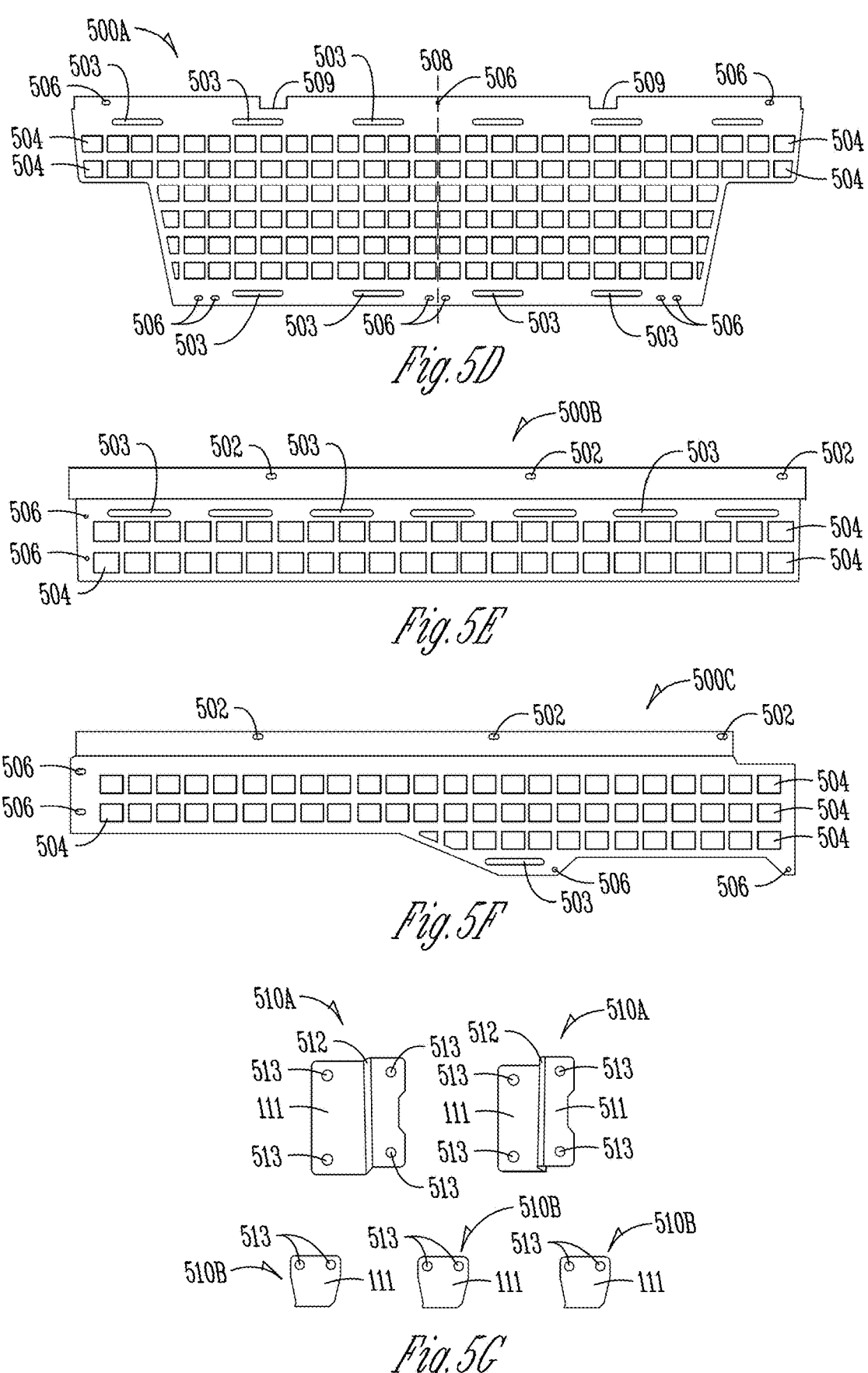

FIG. 5G, in particular, shows side bracket(s) 510A, front bracket(s) 510B, a bracket flange 511, a protruding surface 512 separating a main body portion of the bracket 111 from the bracket flange 511, and bracket hole(s) 513, through which bolts and screws can be inserted.

Regarding a method of installation for the panels 500A, 500B, 500C of this particular embodiment, exemplary and enumerated installation instructions follow:

1. unscrew and remove both in-bed rails using a T30 Torx driver;
2. using a T40 Torx driver, unscrew and remove the two tie-down hooks located towards the front of the bed 102, then place the side brackets 510A behind the tie-down hooks, then fasten to the bed 102 re-using factory hardware;
3. loosely assemble a well nut and Philip's-head screw onto each of the three front brackets 510B, then insert the well nuts down into each of the three drain holes located towards the front of the bed floor, and then tighten the screw until the well nut is snug in the hole (but do not overtighten);
4. remove and set aside the two T30 Torx-head fasteners from the passenger-side bed cubby, (the passenger-side panel 500C will mount to this location re-using these fasteners);
5. place the side panels 500B, 500C on the backside of the in-bed rails, then fasten to the bed 102 re-using the factory hardware;
6. unscrew and remove the three required T30 Torx-head fasteners from the upper part of the bed front, then set the front panel 500A in place, and attach to the bed re-using these three fasteners;
7. fasten the panels 500A, 500B, 500C to the corresponding brackets 510A, 510B using the M6 bolts and a T30 Torx driver; and
8. once all the panels 500A, 500B, 500C are installed in the vehicle, ensure all fasteners are tightened until snug, but do not overtighten.

FIGS. 6A-6G show modular, lightweight load-carrying panels that include a holes 602 in a main body portion of the panel 110, elongated slots 603 in a main body portion of the panel 110, a PALS grid 604, and a small notch 606 on the lower edge of a splined edge 607 on the driver-side panel 600B. In such an embodiment, the bottom edge of the driver-side panel 600B and passenger-side panel 600C comprise a splined edge 607 that tracks the wheel well 109A of a Ford Ranger and substantially rectangular shaped cutouts 609 (with slight bulges appearing on the left-hand and right-hand sides of said substantially rectangular cutouts) internally located within the main body portion of the panels 600B, 600C. The front panel 600A is symmetrical about the line of symmetry 608.

Figures 6A, 6B:
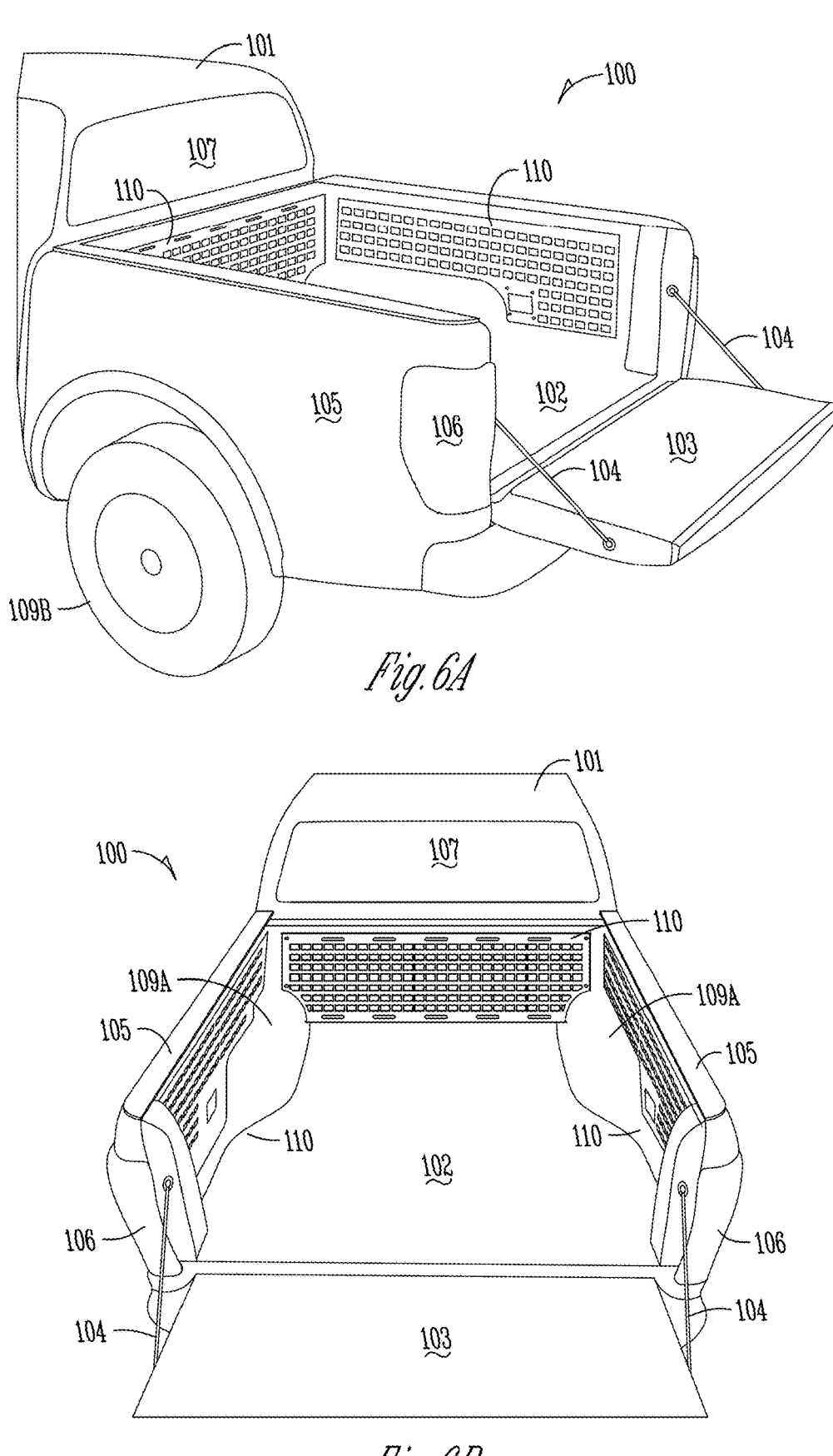
FIGS. 6A-6G exemplify one embodiment of the modular, lightweight load-carrying panel system, said embodiment being specifically designed for a Ford Ranger. More particularly.
Figure 6C:
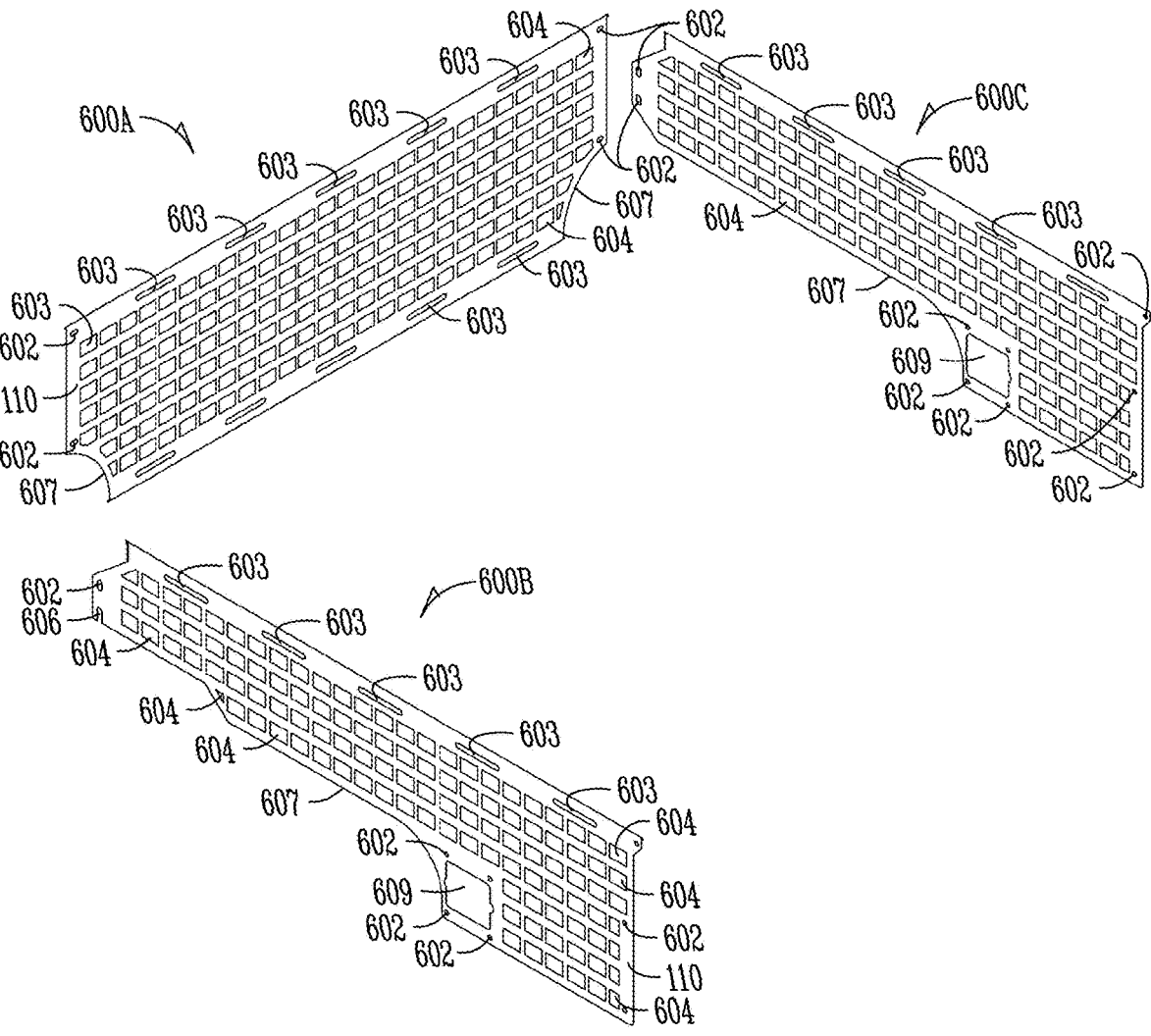
Figures 6D, 6E, 6F, 6G:
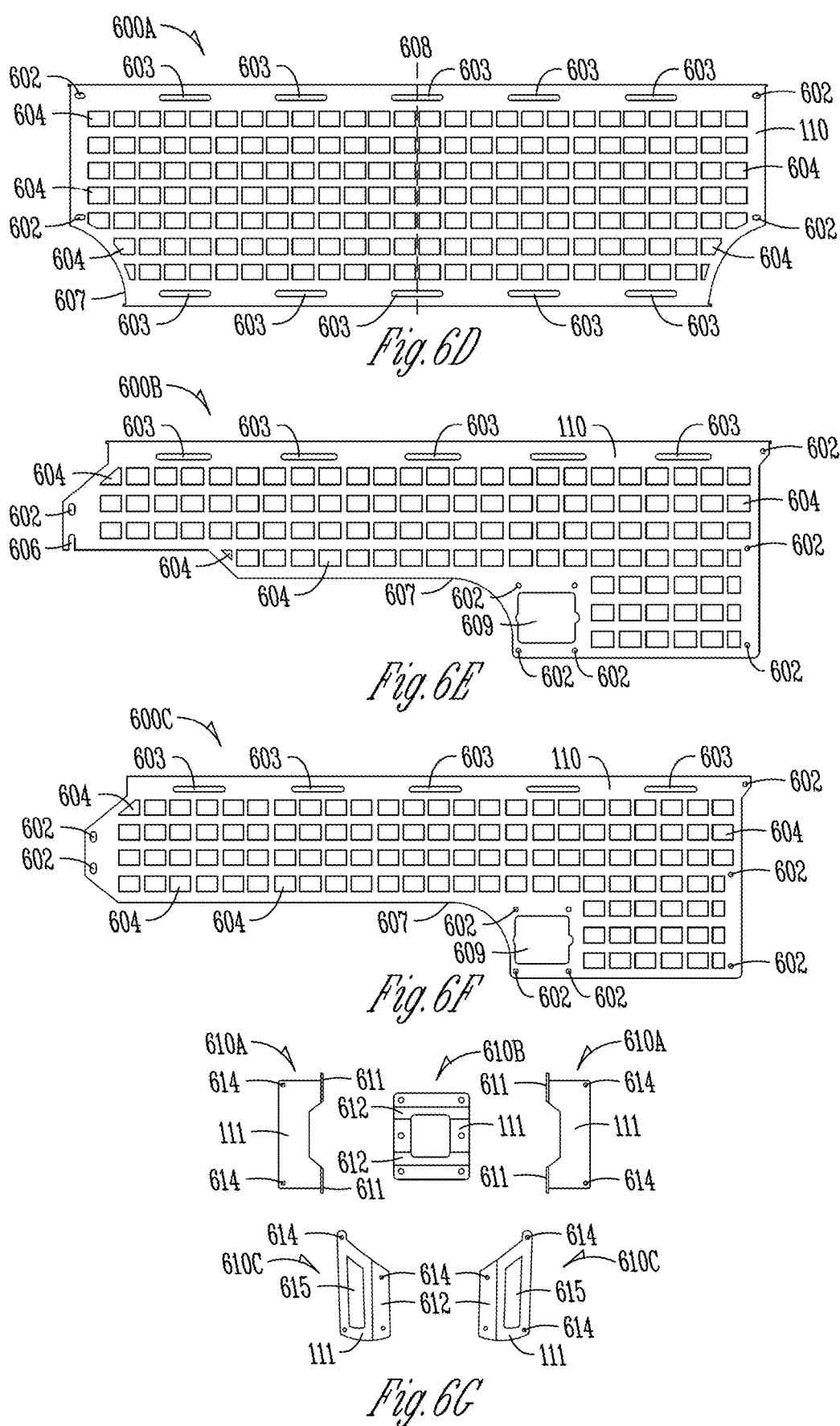

FIG. 6G, in particular, shows front bracket(s) 610A, middle bracket(s) 610B, rear bracket(s) 610C, bracket flange(s) 611, protruding surface(s) 612 separating and/or otherwise extending a main body portion of the bracket 111 from the bracket flange 611, bracket hole(s) 614, through which bolts and screws can be inserted, and bracket cutouts 615.

Regarding a method of installation for the panels 600A, 600B, 600C of this particular embodiment, exemplary and enumerated installation instructions follow:

1. begin by unscrewing and removing all factory removable tie-down hooks using a T40 Torx driver, then set these aside, as they will be re-used (most Ford Ranger beds come equipped with four tiedowns in total);

2. the rear brackets 610C install behind the rear tie-downs (closest to the tailgate 103), then place the rear bracket 610C in between the bed 102 and the rear tie-down, then fasten in place re-using factory hardware (if the Ford Ranger does not have a tie-down in this location, fasten the rear bracket 610C using M8 Bolts and note the rear brackets 610C can have different orientations depending on whether they attach to the driver-side or the passenger-side panels 600B, 600C);
3. install the middle brackets 610B and the front brackets 610A in the same manner, either installing them behind factory tie-downs or fastening using the M8 bolts, leave the front bracket 610A slightly loose, as the brackets 610A, 610B, 610C may need to be adjusted later on;
4. loosely assemble a jam nut onto each of the rubber feet, then screw the feet into the nutserts located on the bottom flange of the front panel 600A;
5. fasten all three panels 600A, 600B, 600C to the corresponding brackets 610A, 610B, 610C using M6 bolts and a T30 Torx driver;
6. the front part of each side panel 600B, 600C is fastened to the bed 102 in the same manner as the brackets 610A, 610B, 610C, either behind an existing tie-down, or using the M8 bolts;
7. adjust the rubber feet on the front panel 600A down until they are snug against the floor of the bed 102, then secure the rubber feet in place by tightening the jam nuts against the nutserts using a 10 mm wrench;
8. for additional stiffness, locate the blank hole located towards to top rear corner of each side panel 600B, 600C (this hole should line up with a hole in the bed 102), insert the provided rubber well nut into this hole, place the aluminum spacer between the well nut and the side panel 600B, 600C, insert the 2-⅜" long bolt through the side panel 600B, 600C and spacer, thread the bolt into the well nut, tighten the bolt using a ³⁄₁₆" hex key until the well nut is snug in the hole; and
9. once all the panels 600A, 600B, 600C are installed in the vehicle, ensure all fasteners are tightened until snug, but do not overtighten.

FIGS. 7A-7I show modular, lightweight load-carrying panels that include a holes 702 in a main body portion of the panel 110, elongated slots 703 in a main body portion of the panel 110, a PALS grid 704, and driver-side and passenger-side edge cutouts 706 on the front panel 700A. This embodiment is unique in that it employs a duality of panels 700B, 700C on the passenger-side (front and rear passenger-side panels, respectively) and another, mirrored, opposing duality of panels 700D, 700E on the driver-side (front and rear driver-side panels, respectively). In such an embodiment, the bottom edge of the driver-side panels 700D, 700E and passenger-side panels 700B, 700C comprise a splined edge 607 that tracks the wheel well 109A of a Ford Super Duty. The panels 700B-E also include substantially rectangular shaped cutouts 709 (with rounded corners) internally located within the main body portion of the panels 700B, 700C, 700D, 700E. The front panel 700A is shown as symmetrical about the line of symmetry 708.

Figure 7A:
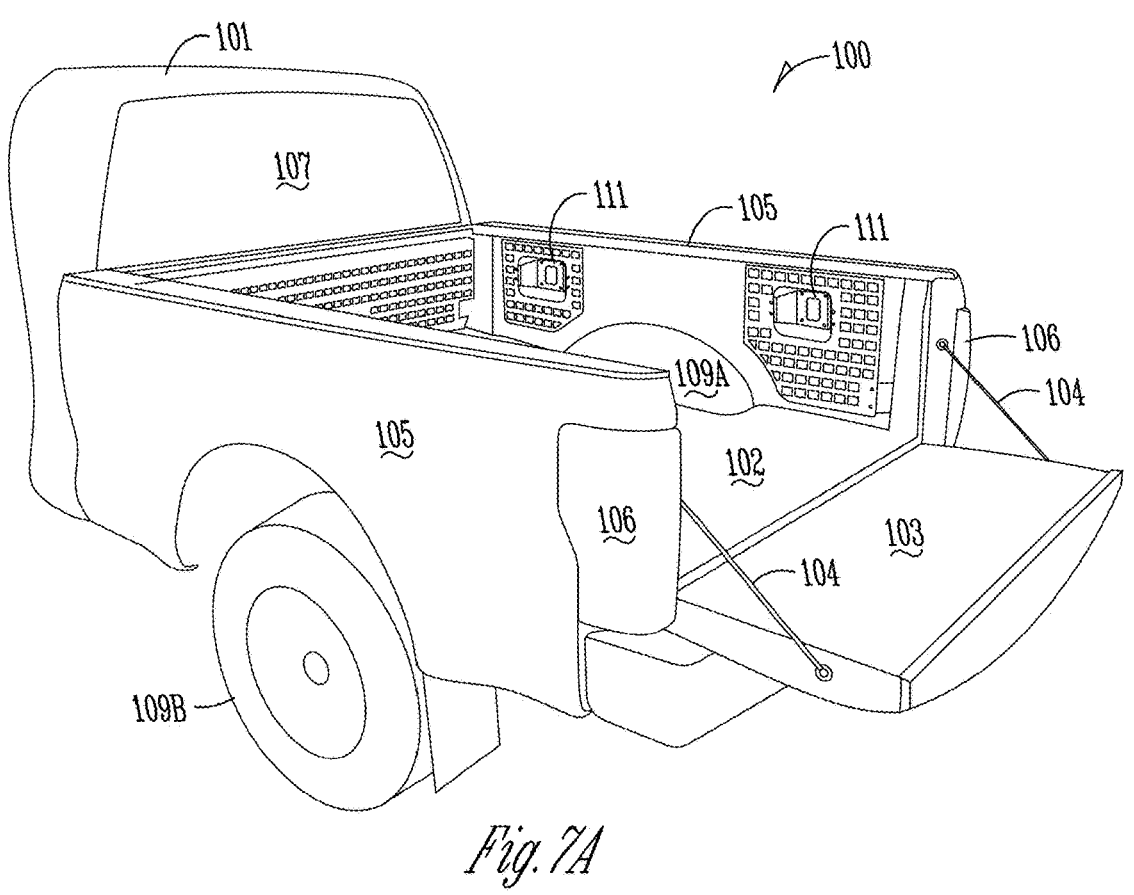
FIGS. 7A-7I exemplify one embodiment of the modular, lightweight load-carrying panel system, said embodiment being specifically designed for a Ford Super Duty. More particularly.
Figure 7B:
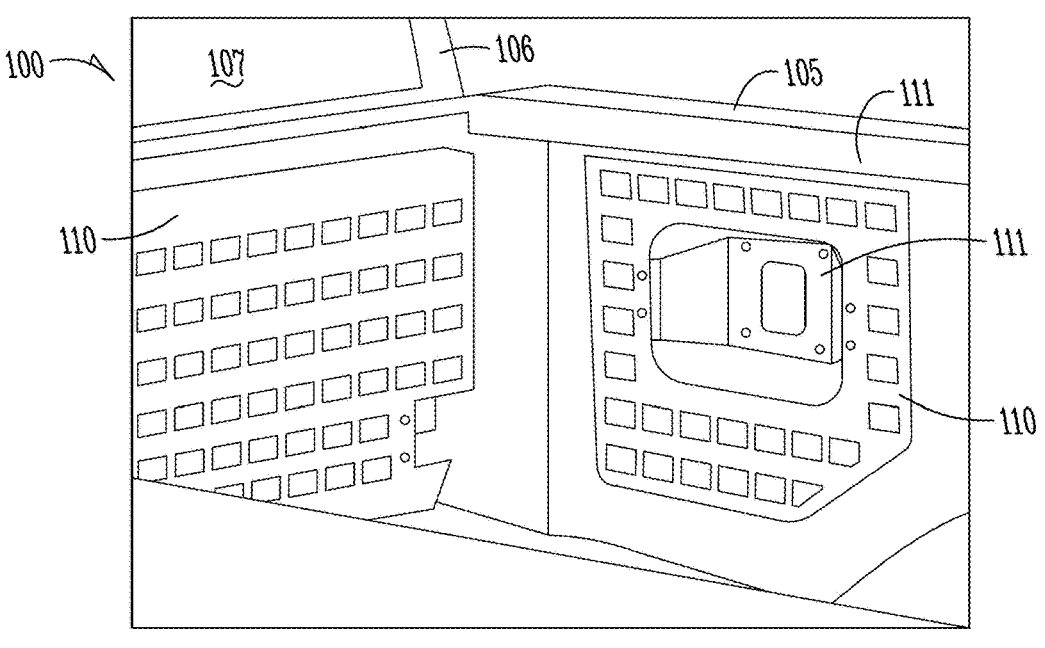
Figure 7C:
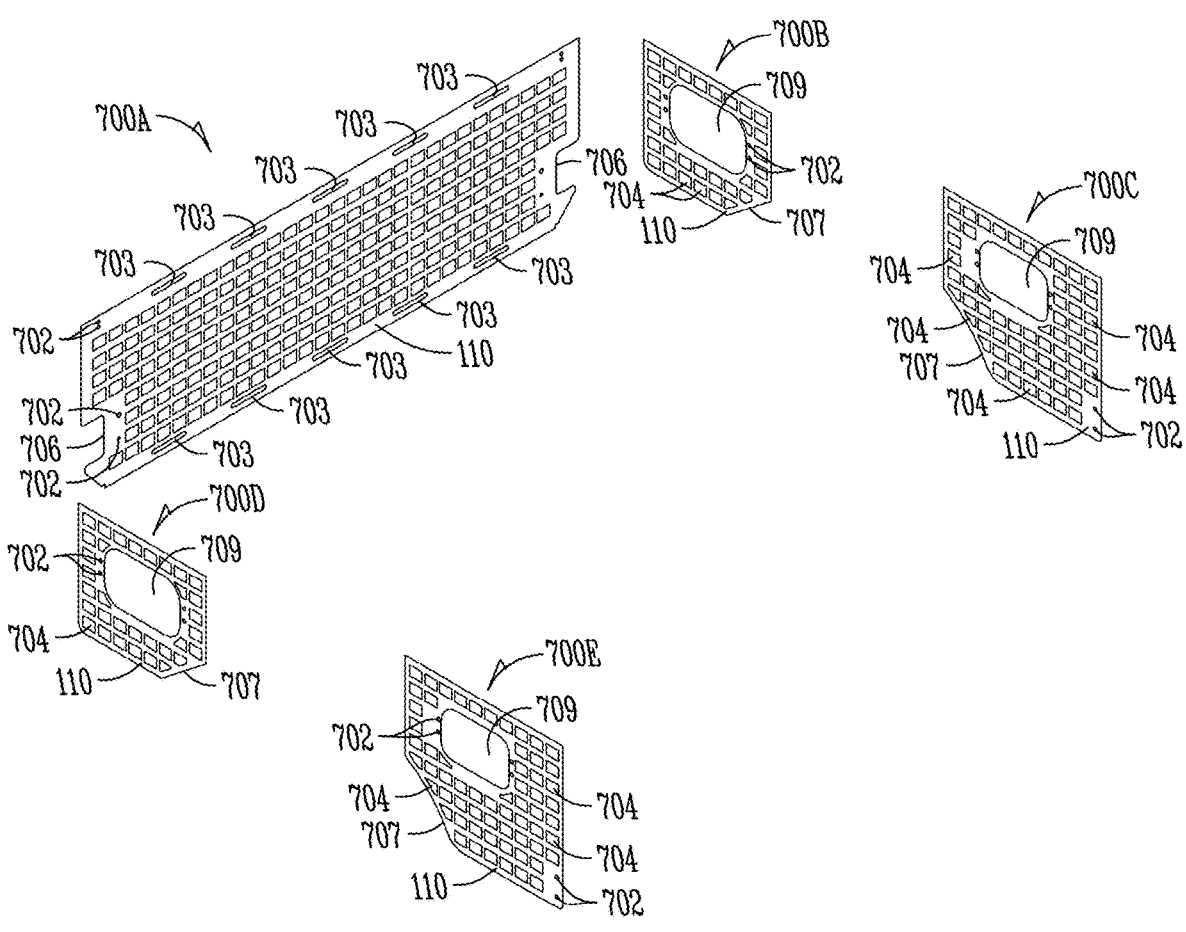
Figures 7D, 7E, 7F, 7G, 7H, 7I:
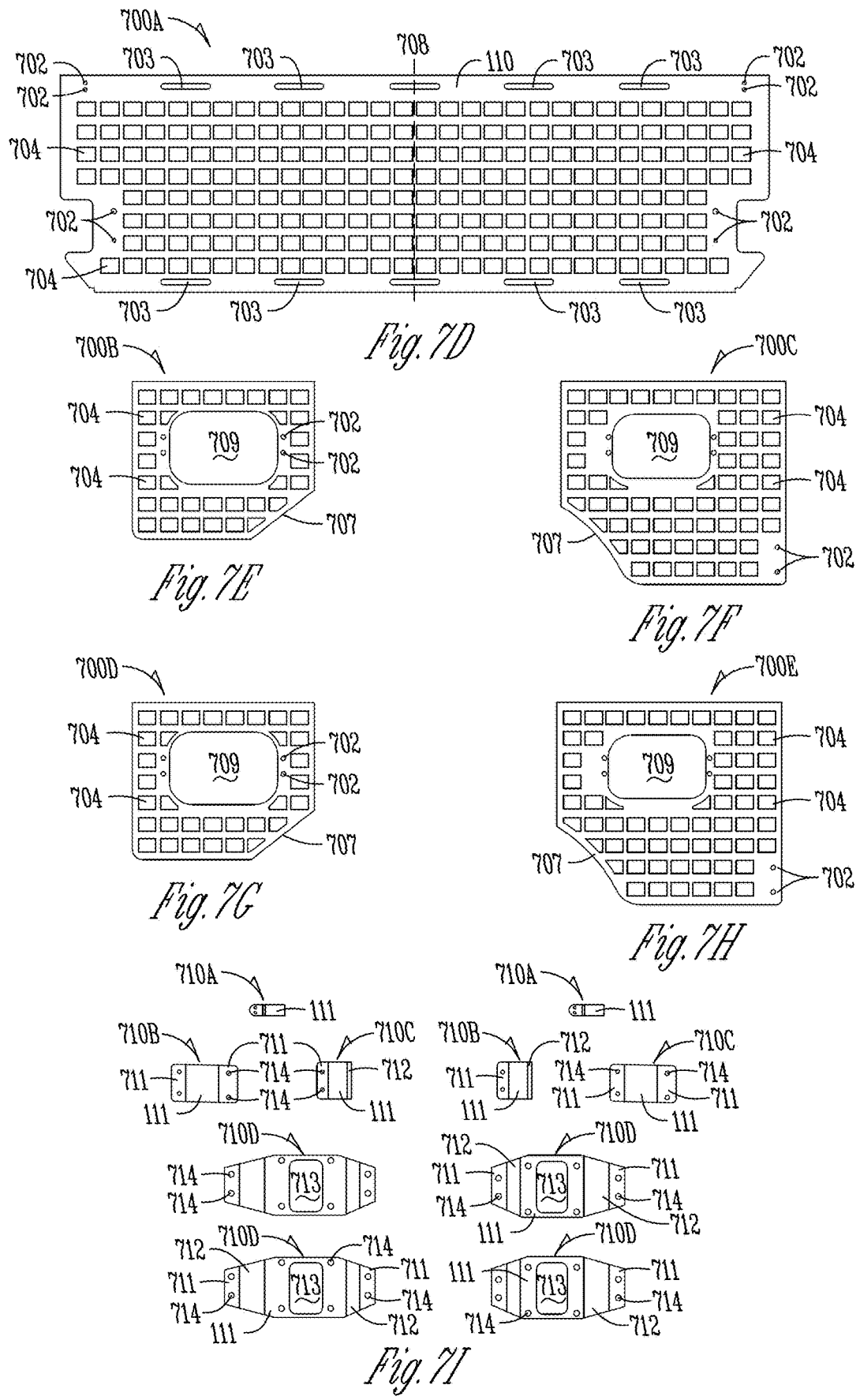

FIG. 7I, in particular, shows front upper bracket(s) 710A, rear bracket(s) 710B, front lower bracket(s) 710C, side bracket(s) 710D, bracket flange(s) 711, protruding surface(s) 712 separating and/or otherwise extending a main body portion of the bracket 111 from the bracket flange 711, bracket cutout(s) 713, and bracket hole(s) 614, through which bolts and screws can be inserted.

Regarding a method of installation for the panels 700A, 700B, 700C of this particular embodiment, exemplary and enumerated installation instructions follow:

1. unscrew and remove the four tie-down plates using a T30 Torx driver, place the side mounting brackets 710D behind the tie down plates, then fasten to the bed re-using factory hardware (note: for the 6.5 ft Super Duty the front side bracket can be larger than the one for the rear);

2. unscrew and remove the two rear tie-down hooks using a T30 Torx driver and place the rear brackets 710B behind the rear tie-down hooks, then fasten to the bed re-using factory hardware;

3. unscrew and remove the two front tie-down hooks using a T30 Torx driver and place the front lower brackets 710C behind the front tie-down hooks, then fasten to the bed re-using factory hardware;

4. loosely assemble one ⁵⁄₁₆ bolt and one well nut to each of the two front upper brackets 710A, then insert the well nuts into the front slots located toward the top of each bed side, tighten the bolt using a ³⁄₁₆ hex key until the well nut is snug in the slot (the upper side brackets 710A can be slightly adjusted forward and back within the slot 703 to get the desired rack position;

5. loosely assemble a jam nut onto each of the rubber feet, then screw the feet into the nutserts located on the bottom flange of the front panel 700A;

6. fasten the panels 700A, 700B, 700C to the corresponding brackets 710A, 710B, 710C, 710D using M6 bolts and a T30 Torx driver;

7. adjust the rubber feet on the front panel 700A down until they are snug against the floor of the bed 102, secure the rubber feet in place by tightening the jam nuts against the nutserts using a 10 mm wrench; and 8. once all the panels 700A, 700B, 700C are installed in the vehicle, ensure all fasteners are tightened until snug, but do not overtighten.

FIGS. 8A-8G show modular, lightweight load-carrying panels that include a panel flange 801, holes 5802 in the panel flange 801, elongated slots 803 in a main body portion of the panel 110, a PALS grid 804, and holes 806 in the main body portion of the panel 110, through which bolts and screws can be inserted. In such an embodiment, the bottom edge of the driver-side panel 800C and passenger-side panel 800B comprises a splined edge 807 that tracks the wheel well 109A of a Nissan Frontier. The panels 800A, 800B, and 800C includes a set (2, 3, 3, respectively) of trapezoidal shaped panel cutouts 809 that appear as notches along a top edge of the front panel 800A, driver-side panel 800C, and passenger-side panel 800B. The front panel 800A is shown as symmetrical about the line of symmetry 808.

Figure 8A:
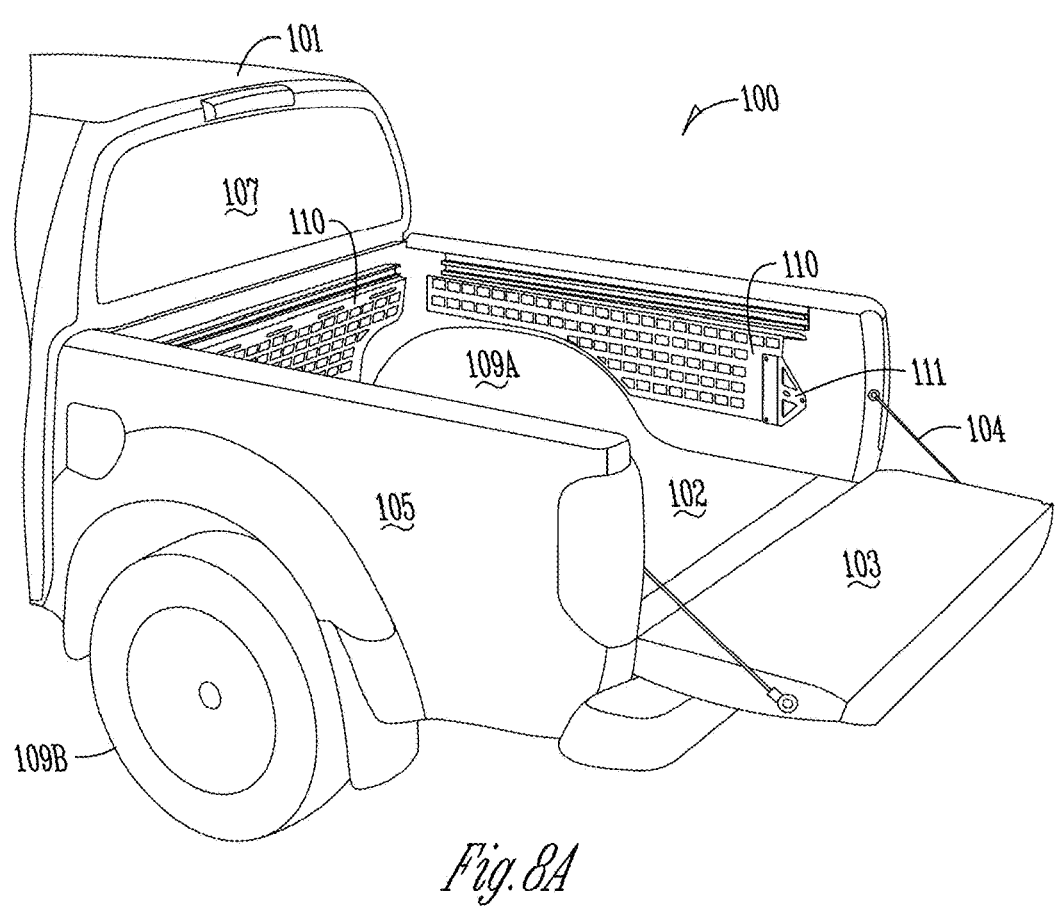
FIGS. 8A-8G exemplify one embodiment of the modular, lightweight load-carrying panel system, said embodiment being specifically designed for a Nissan Frontier. More particularly.
Figure 8B:
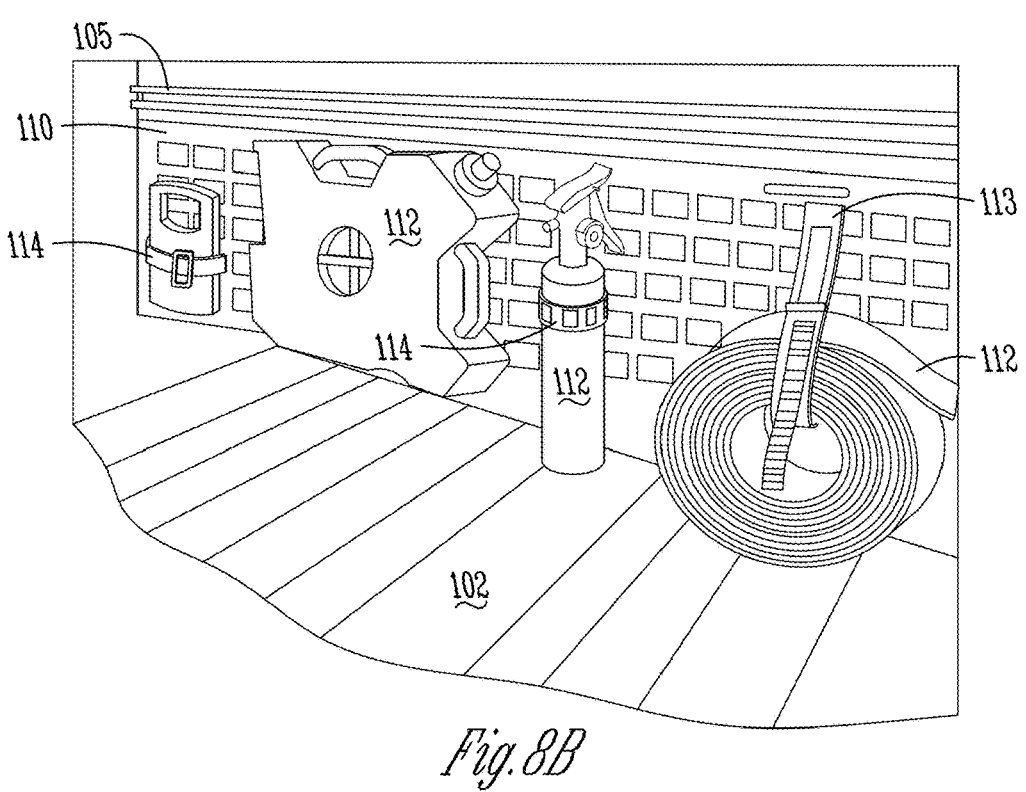
Figure 8C:
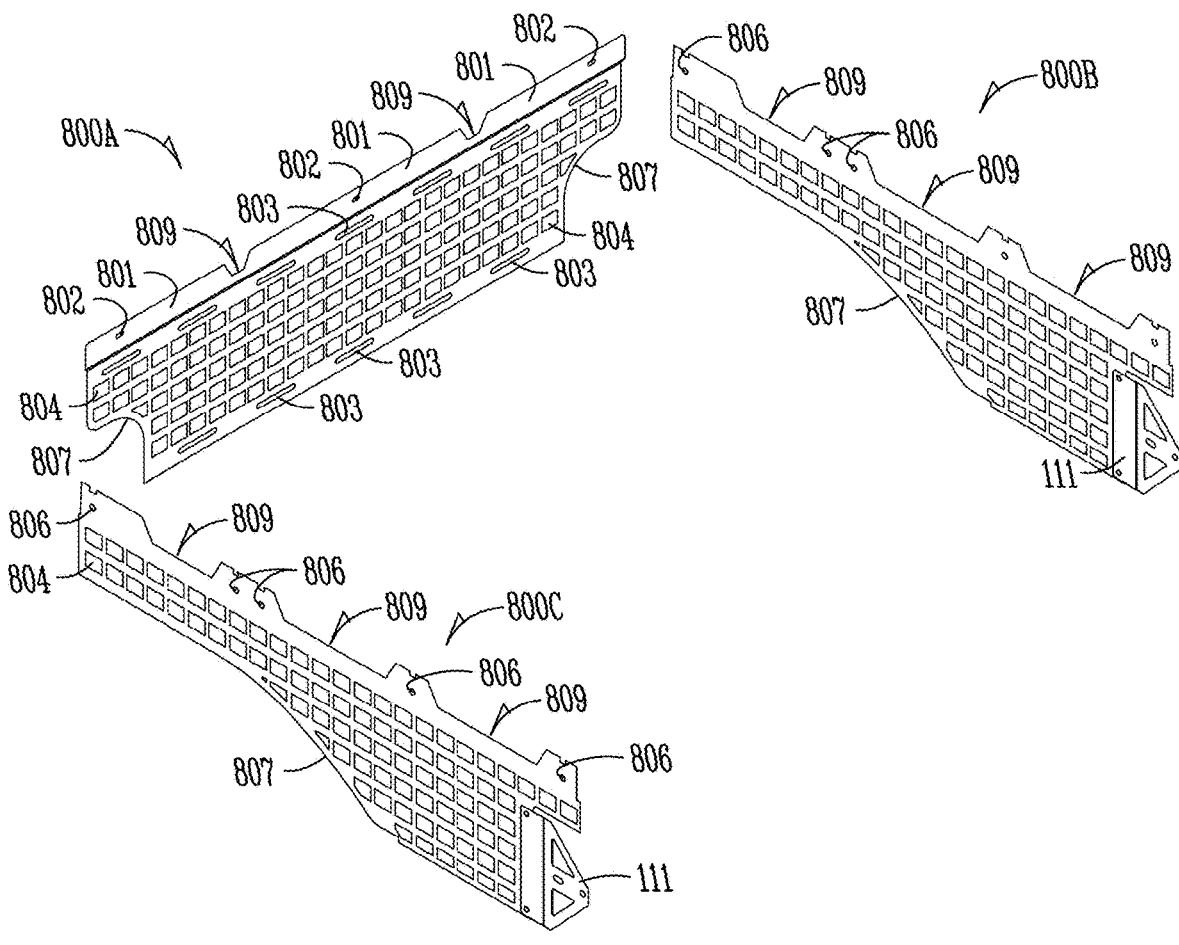
Figures 8D, 8E, 8F, 8G:
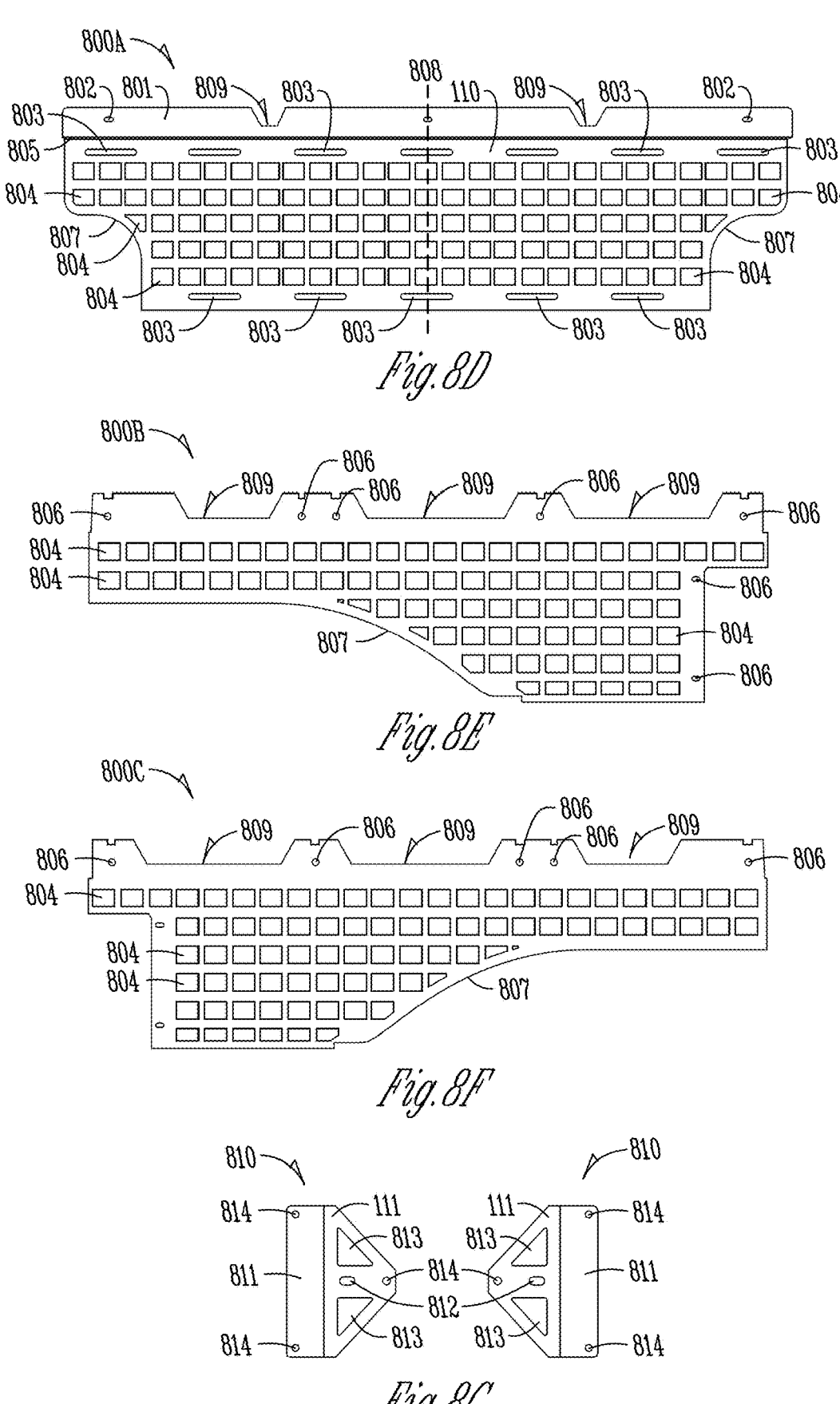
Figures 9A, 9B:
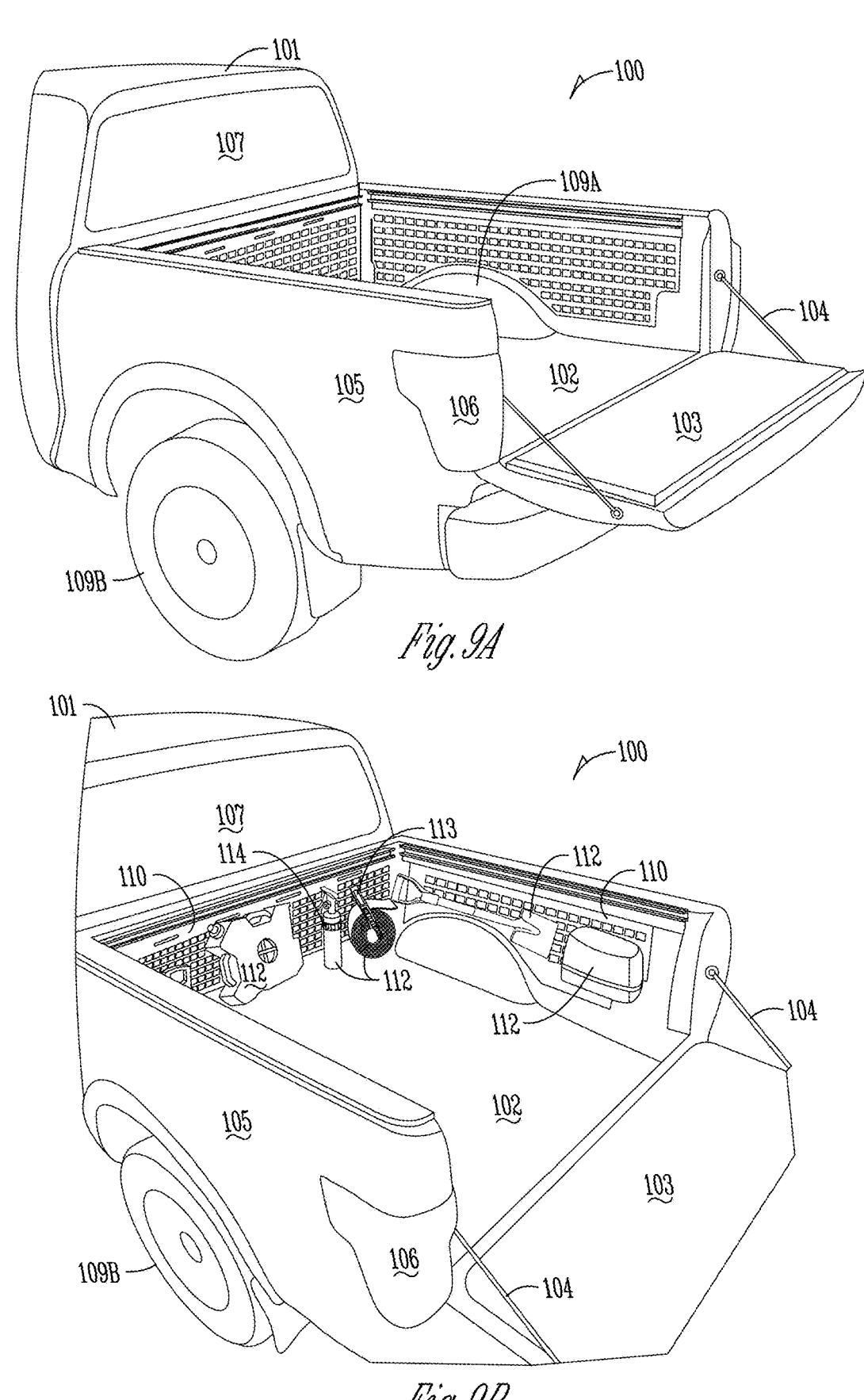
FIGS. 9A-9F exemplify one embodiment of the modular, lightweight load-carrying panel system, said embodiment being specifically designed for a Nissan Titan. More particularly.
Figure 9C:
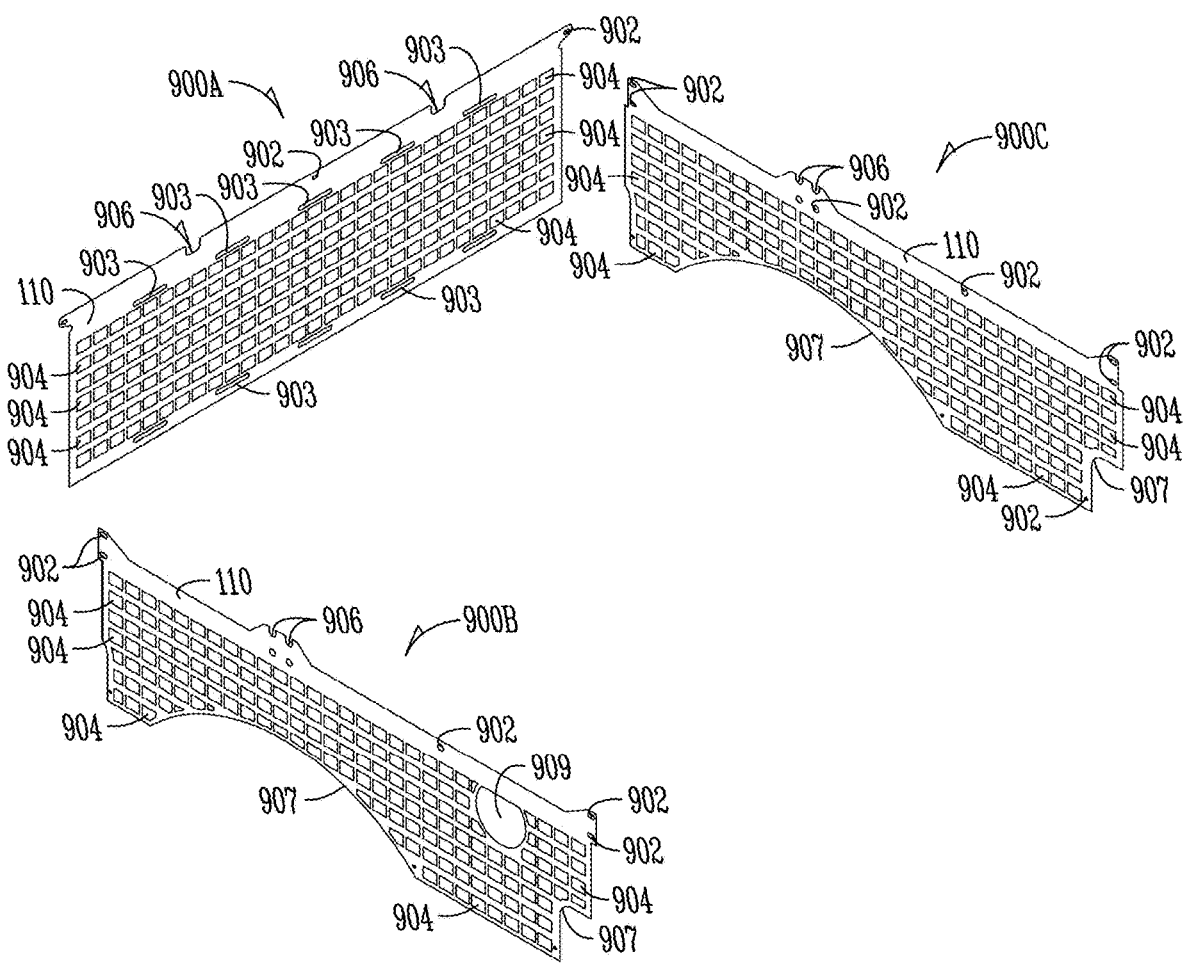
Figure 9D:
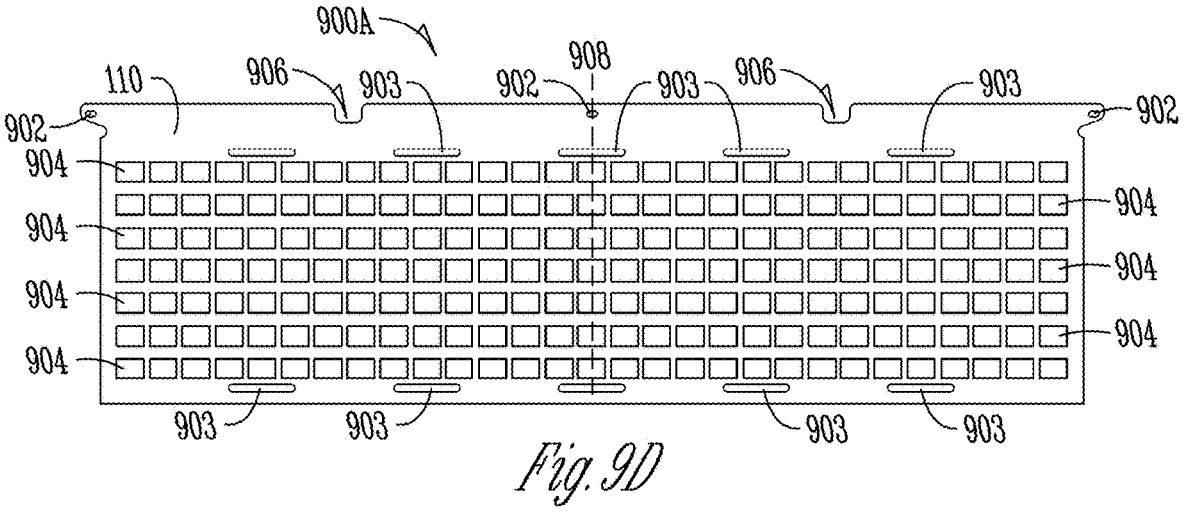
Figure 9E:
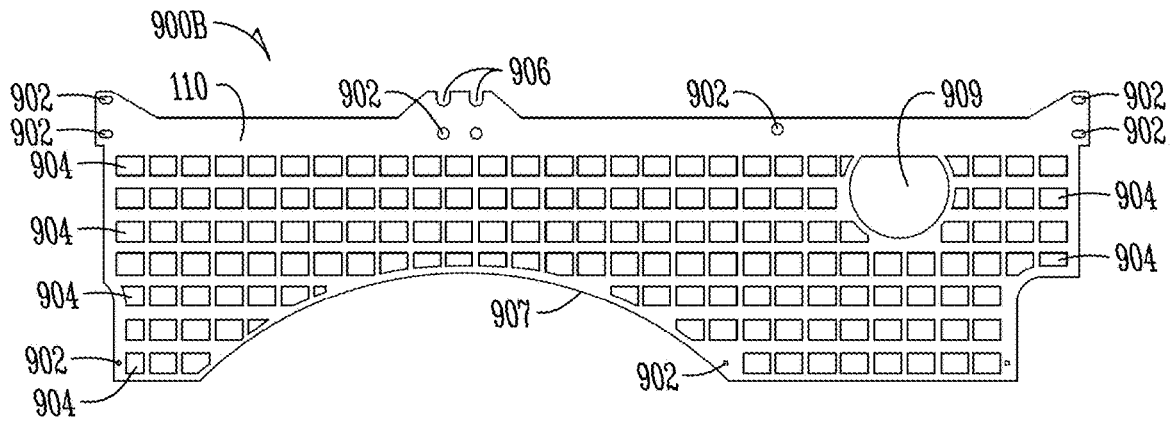
Figure 9F:
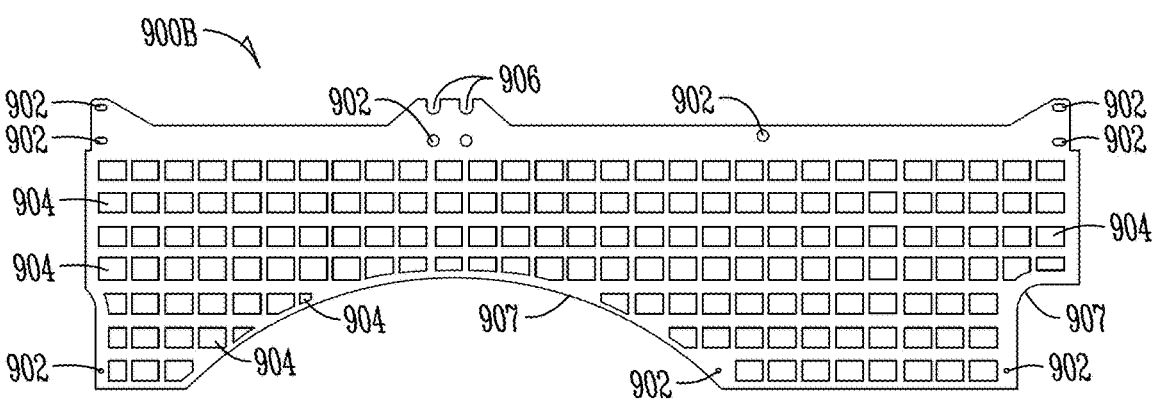

FIG. 8G, in particular, shows bracket(s) 810, a bracket flange 811, bracket cutout(s) 813, and bracket hole(s) 814, through which bolts and screws can be inserted.

Regarding a method of installation for the panels 800A, 800B, 800C of this particular embodiment, exemplary and enumerated installation instructions follow:

1. unscrew and remove all in-bed rails (Nissan rails are attached with T40 Torx-head bolts);

2. unscrew and remove all tie-down hooks using a T40 Torx driver, place the side brackets 810 behind the tie-down hooks, then fasten to the bed re-using factory hardware (note: some Nissan Frontiers do not include tie-down hooks, leaving the mounting holes blank. In this case, use of pliers or a trim-removal tool to pull out the plastic plugs where the tie-down hooks would be, then attach the side brackets using the supplied M8 bolts and a T40 Torx driver);

3. loosely assemble a jam nut onto each of the rubber feet, then screw the feet into the nutserts located on the bottom flange of the panels 800A, 800B, 800C (not all panels require rubber feet);

4. place the panels 800A, 800B, 800C on the backside of the in-bed rails, then fasten to the bed re-using the factory hardware;

5. fasten the panels 800A, 800B, 800C to the brackets 810 using M6 bolts and a T30 Torx driver;

6. adjust the rubber feet on the panels 800A, 800B, 800C down until they are snug against the floor of the bed, then secure the rubber feet in place by tightening the jam nuts against the nutserts using a 10 mm wrench; and 7. once all the panels 800A, 800B, 800C are installed in the vehicle, ensure all fasteners are tightened until snug, but do not overtighten.

FIGS. 9A-9G show modular, lightweight load-carrying panels that include a holes 902 in a main body portion of the panel 110, elongated slots 903 in a main body portion of the panel 110, a PALS grid 904, and small notches 906 on the upper edge of the driver-side panel 900B and passenger-side panel 900C. In such an embodiment, the bottom edge of the driver-side panel 900B and passenger-side panel 900C comprise a splined edge 907 that tracks the wheel well 109A of a Nissan Titan and a partially circularly shaped cutout 909 (with slight bulges appearing on the left-hand and right-hand sides of said substantially rectangular cutouts) internally located within the main body portion of the driver-side panel 900B. The front panel 900A is symmetrical about the line of symmetry 908. This embodiment is further unique in that no mounting brackets 111 are required for installation.

Regarding a method of installation for the panels 900A, 900B, 900C of this particular embodiment, exemplary and enumerated installation instructions follow:

1. unscrew and remove all in-bed rails (Nissan rails are attached with T40 Torx-head bolts);

2. loosely assemble a jam nut onto each of the rubber feet, then screw the feet into the nutserts located on the bottom flange of the panels 900A, 900B, 900C (not all panels will require rubber feet);

3. place the panels 900A, 900B, 900C on the backside of the in-bed rails, then fasten to the bed re-using the factory hardware;

4. adjust the rubber feet on the panels 900A, 900B, 900C down until they are snug against the floor of the bed 102, then secure the rubber feet in place by tightening the jam nuts against the nutserts using a 10 mm wrench; and 5. once all the panels 900A, 900B, 900C are installed in the vehicle, ensure all fasteners are tightened until snug, but do not overtighten.

In greater particularity, FIGS. 10A-10G show modular, lightweight load-carrying panels that include holes 1002 in the panel flange 1001, through which bolts and screws can be inserted, elongated slots 1003 in a main body portion of the panel 110, a PALS grid 1004, and substantially rectangular cutouts 1006 (uniquely present in all panels 1000A, 1000B, 100C of this embodiment, said rectangular cutouts 1006 having rounded corners) in the main body portion of the panel 110. In such an embodiment, the bottom edge of the driver-side panel 1000C and passenger-side panel 1000B comprises a splined edge 1007 that tracks the wheel well 109A of a Chevy Colorado. At a rear end of the said panels 400B, 400C, a cutout with a substantially orthogonal angle

1009 exists to give some clearance for tow hooks toward the rear of the bed 102. This embodiment is further unique in that there is no axis of symmetry for front panel 1000A. Front panel 1000A includes a splined lower edge 1007 instead of only straight and/or orthogonally oriented lower edge(s).

Figures 10A, 10B:
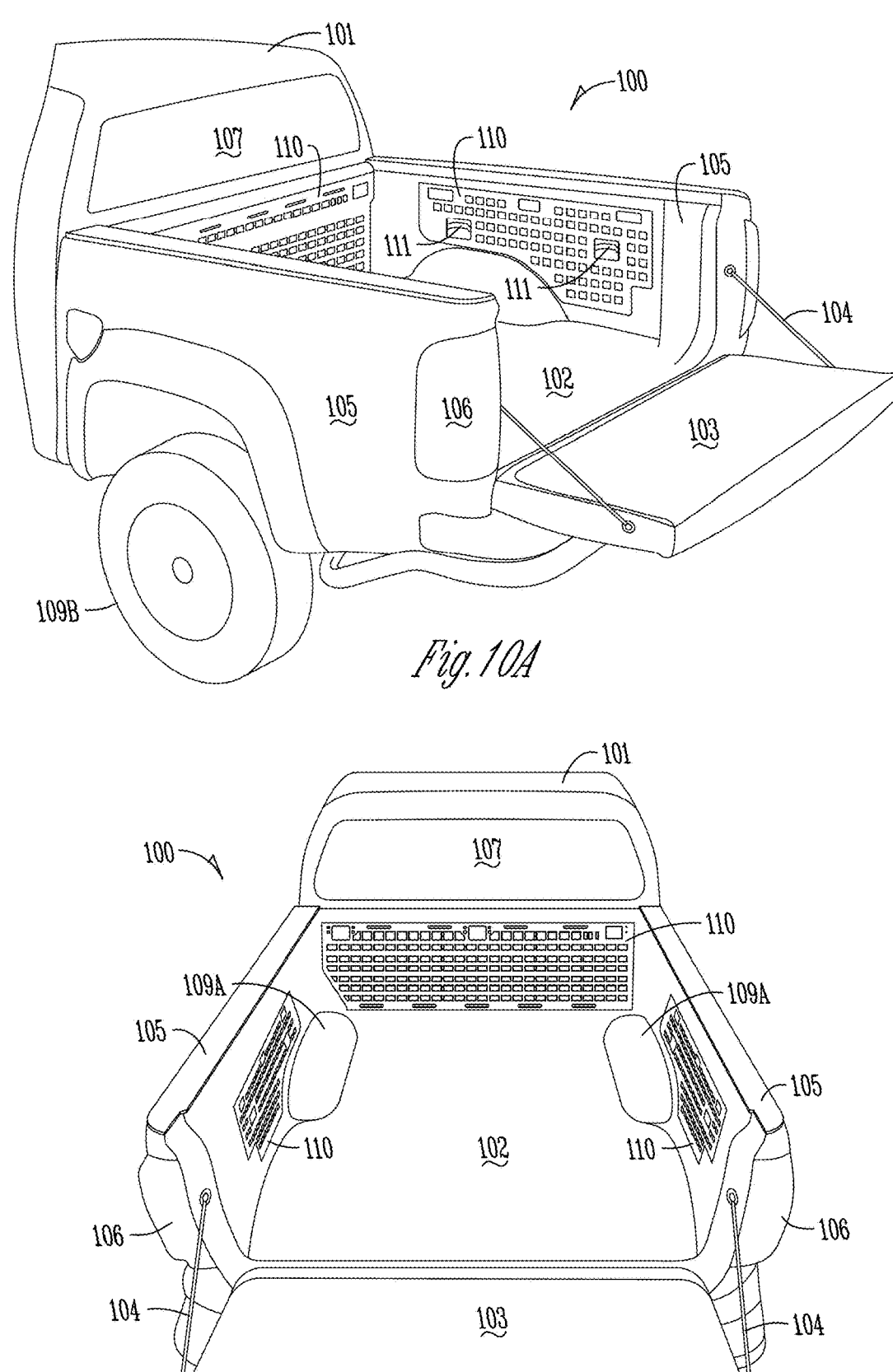
FIGS. 10A-10G exemplify one embodiment of the modular, lightweight load-carrying panel system, said embodiment being specifically designed for a Chevy Colorado. More particularly.
Figure 10C:
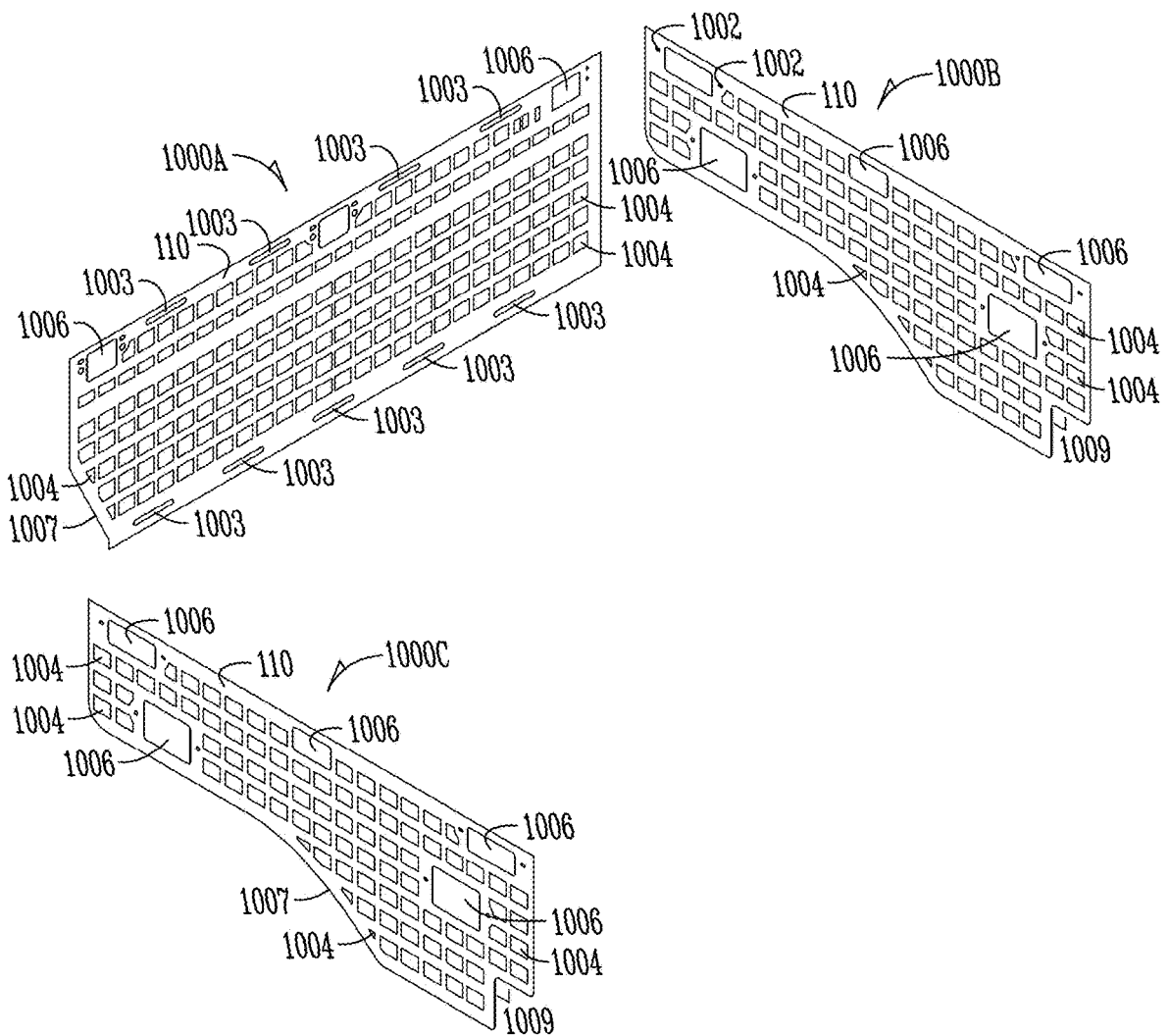
Figures 10D, 10E, 10F, 10G:
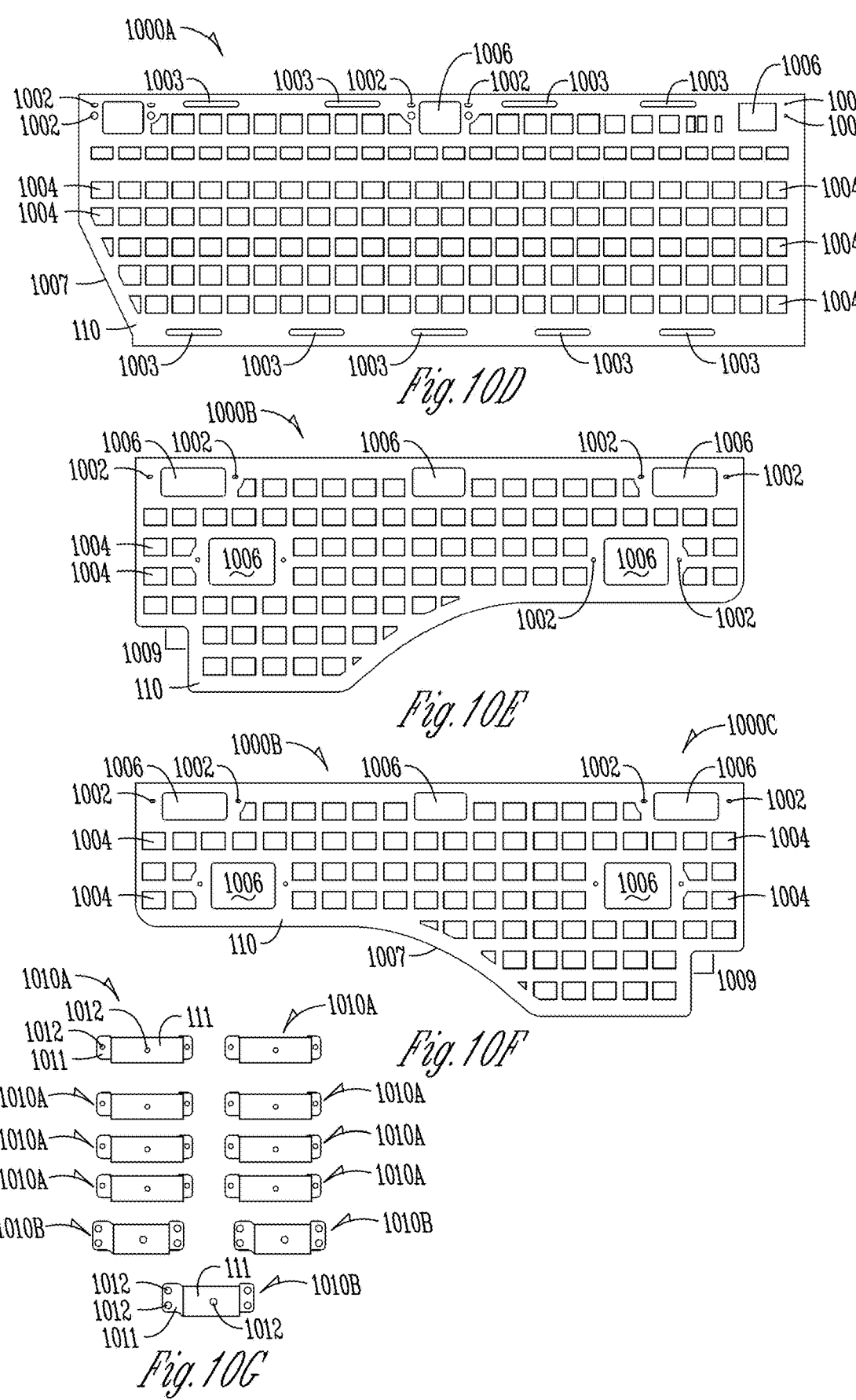

FIG. 10G, in particular, shows a side brackets 1010A, front bracket 1010B, bracket flange(s) 1011, and bracket hole(s) 1012, through which bolts and screws can be inserted.

Regarding a method of installation for the panels 1000A, 1000B, 1000C of this particular embodiment, exemplary and enumerated installation instructions follow:

1. begin by locating and removing the plastic oval covers from the bed using a small flat-head screwdriver;
2. loosely assemble a ⁵⁄₁₆ bolt, tabbed washer, and nut plate to each bracket 1010A, 1010B;
3. grab one of the assembled brackets and insert the nut plate into one of the required bed slots (the nut plate will have to be inserted at an angle in order to fit), then orient the nut plate so that it is perpendicular and centered behind the slot, then push the tabbed washer against the bed side so that the tabs fit into the slot (if aligned correctly, the tabs should prevent the nut plate from spinning), then while keeping the tabbed washer in the slot pull back on the bolt and begin to tighten, finally, repeat this process for the rest of the required slots in the bed;
4. attach the side panels 1000B, 1000C to the side brackets 1010A using M6 bolts (the brackets 1010A may have to be adjusted to make get the holes to line up);
5. loosely assemble to front panel 1000A by loosely screwing a jam nut onto each of the rubber feet, then loosely screwing the rubber feet into the riv-nuts in the bottom bend of the front panel 1000A;
6. fasten the front panel 1000A onto the front brackets 1010B using M6 bolts;
7. once the front panel 1000A is secured to the front brackets 1010A, adjust the rubber feet so that they sit tight to the bed 102 of the truck (this helps prevent vibration while driving), and once the feet are in the correct position, tighten the jam nuts to secure them in place; and
8. once all the panels 1000A, 1000B, 1000C are installed in the vehicle, ensure all fasteners are tightened until snug, but do not overtighten.

FIGS. 11A-11G show modular, lightweight load-carrying panels that include a holes 1102 in a main body portion of the panel 110, elongated slots 1103 in a main body portion of the panel 110, a PALS grid 1104, and substantially rectangular cutouts 1106 (with rounded corners) on the driver-side and passenger-side panels 1100B, 1100C. In such an embodiment, the bottom edge of the driver-side panel 1100B and the passenger-side panel 1100C comprise a splined edge 1107 that tracks the wheel well 109A of a Dodge Ram LD. The front panel 1100A is shown as symmetrical about the line of symmetry 1108.

Figures 11A, 11B:
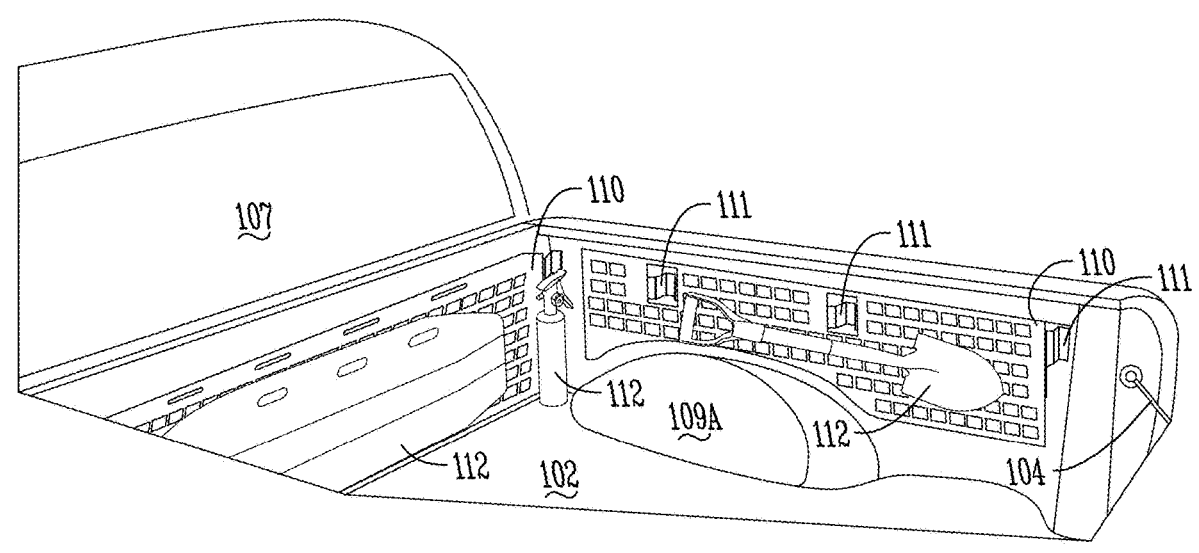
FIGS. 11A-11G exemplify one embodiment of the modular, lightweight load-carrying panel system, said embodiment being specifically designed for a Dodge Ram LD. More particularly.
Figure 11C:
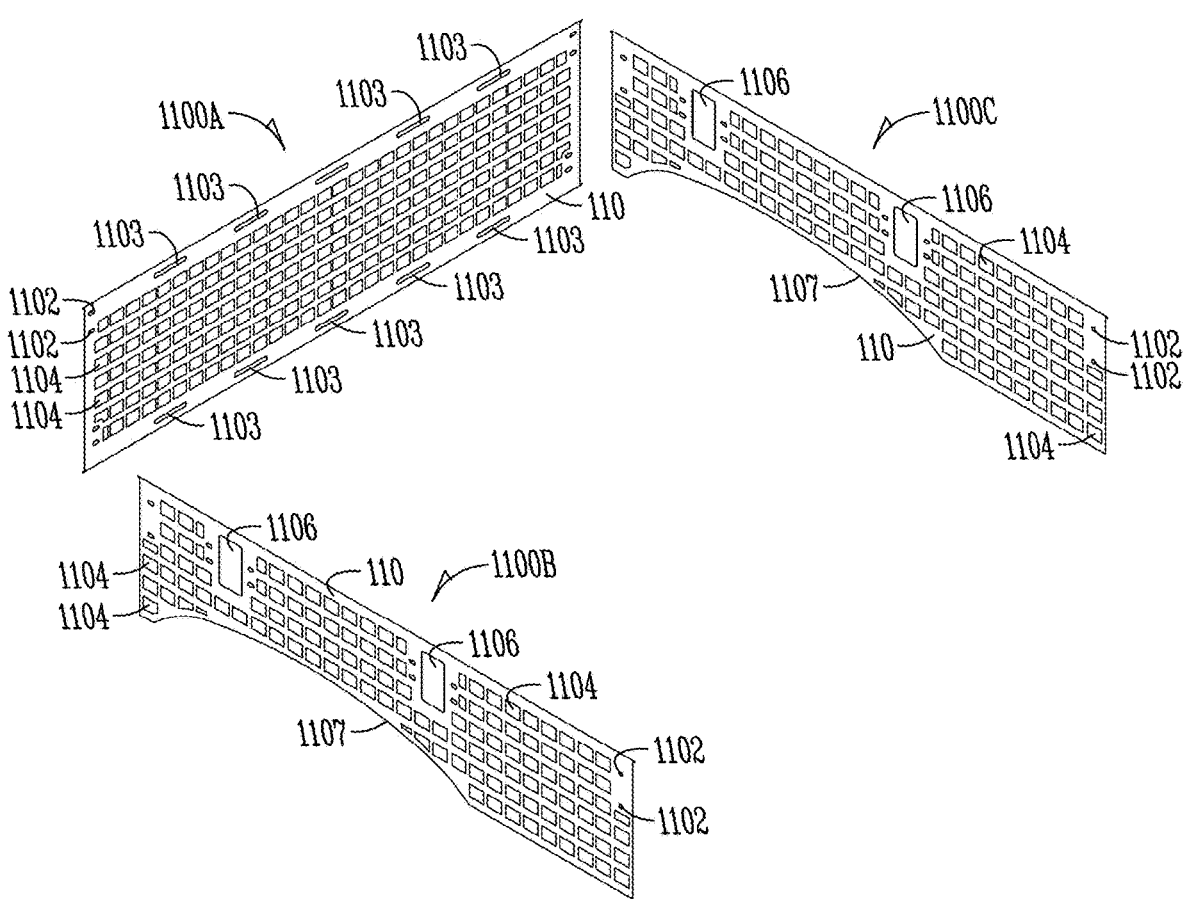
Figures 11D, 11E, 11F, 11G:
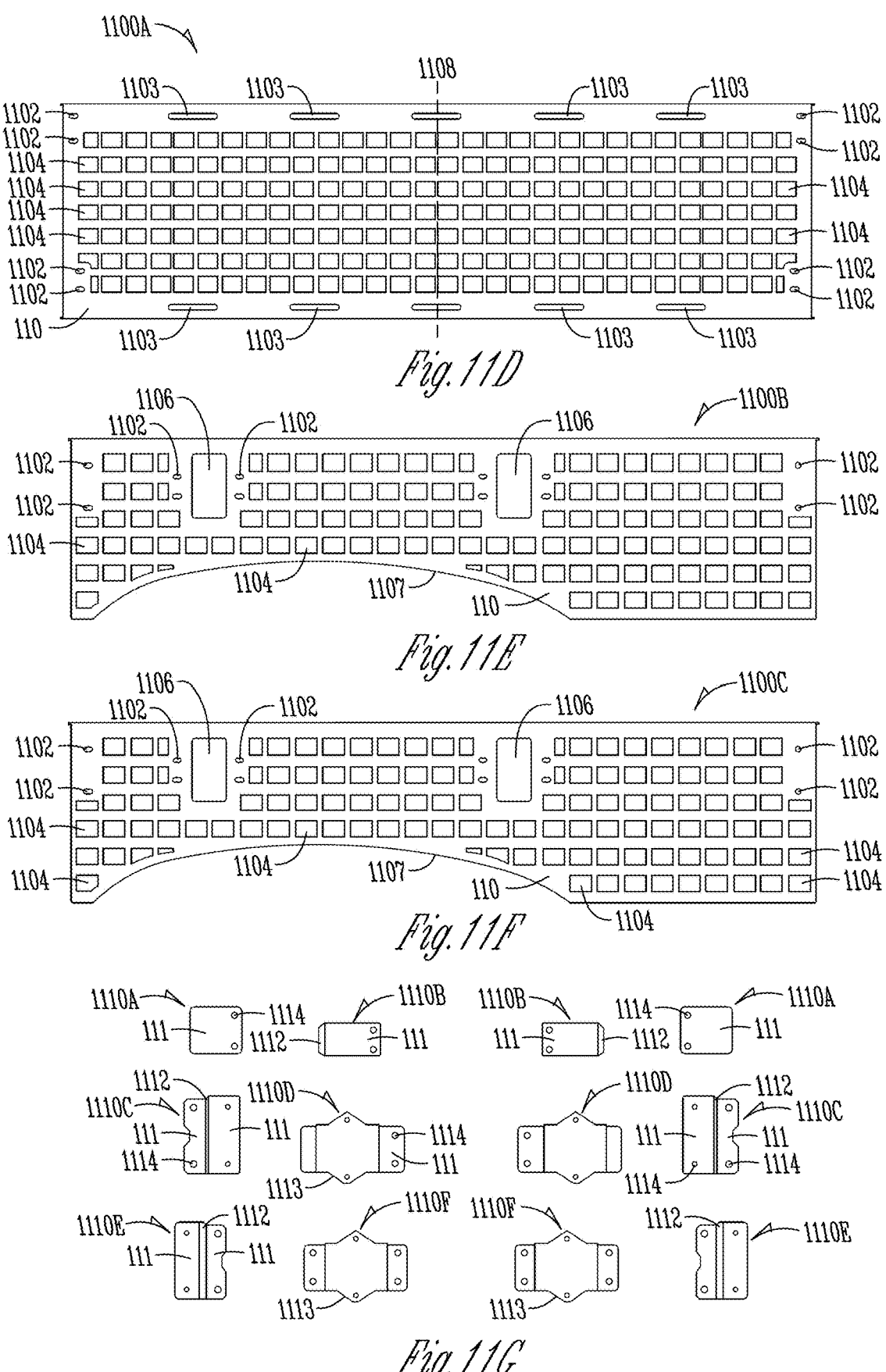

FIG. 11G, in particular, shows front upper bracket(s) 1110A, front lower mounting bracket(s) 1110B, side front mounting bracket(s) 1110C, first double flange side mounting bracket(s) 1110D, side rear mounting bracket(s) 1110E, second double flange side mounting bracket(s) 1110F, bracket flange(s) 1111, protruding surface(s) 1112 separating and/or otherwise extending a main body portion of the bracket 111 from the bracket flange 1111, edge protrusions 1113, and bracket hole(s) 1114, through which bolts and screws can be inserted. In at least some embodiments, the side front bracket(s) 1110C and side rear mounting bracket(s) 1110E are identical, as are the first double flange side mounting bracket(s) 1110D and the second double flange side mounting bracket(s) 1110F.

Regarding a method of installation for the panels 1100A, 1110B, 1110C of this particular embodiment, exemplary and enumerated installation instructions follow:

1. gather the single flange side mounting brackets 1110C, 1110E and the double flange side mounting brackets 1110D, 1110F and then loosely assemble two ⁵⁄₁₆" well nuts and two Philip's head screws onto each of these brackets 1110C-F;
2. the LD Ram has hex-shaped holes in the bedsides that will be used to mount the side panels 1100B, 1100C, the double flange brackets 1110D, 1110F mount to the middle sets of holes, and the single flange brackets 1110C, 1110E mount to the outer sets of holes;
3. fasten the brackets to the bed by inserting the well nuts into the hex-shaped holes, then tighten the Philip's head screws until the well nuts are snug in the hex-shaped holes;
4. gather the two front upper brackets 1110A, loosely assemble one 2-⅜" long Allen head bolt, in-bed washer, and nut plate onto each of these brackets 1110A;
5. install the front upper bracket 1110A assemblies by inserting the nut plate into the slot located towards the top of each bed side (the nut plate will have to be inserted at an angle in order to fit), then orient the nut plate so that it is perpendicular and centered behind the slot and push the tabbed washer against the bed side so that the tabs fit into the slot (if aligned correctly, the tabs should prevent the nut plate from spinning), and while keeping the tabbed washer in the slot, pull back on the bolt and begin to tighten until snug;
6. locate the two remaining front lower brackets 1110B and loosely assemble a ¾-inch well nut and 1.5-inch long Allen head bolt onto each bracket 1110B, then install the lower bracket 1110B assemblies by inserting the well nut into the slot located just next to the forward tie-down hook before tightening the bolt using a ⁷⁄₃₂ hex key until the well nut is snug in the slot;
7. prepare the front panel 1100A to be installed by threading a jam nut onto each of the rubber feet, then loosely screw the rubber feet into the iv-nuts located on the bottom flange of the front panel 1100A;
8. fasten all panels 1100A, 1100B, 1100C to the corresponding brackets 1110A-F using the provided Torx-head screws and a T30 Torx driver;
9. adjust the rubber feet on the front panel 1100A down until they are snug against the floor of the bed 102, then secure the rubber feet in place by tightening the jam nuts against the front plate 1100A using a 10 mm wrench; and
10. once all the panels 1100A, 1100B, 1100C are installed in the vehicle, ensure all fasteners are tightened until snug, but do not overtighten.

FIGS. 12A-12G show modular, lightweight load-carrying panels that include a holes 1202 in a main body portion of the panel 110, elongated slots 1203 in a main body portion of the panel 110, a PALS grid 1204, and a duality (front and rear) of substantially rectangular cutouts 1206 (with rounded corners) on the driver-side and passenger-side panels 1200B, 1200C. In such an embodiment, the bottom edge of the driver-side panel 1200B and the passenger-side panel 1200C comprise a splined edge 1207 that tracks the wheel well 109A of a Dodge Ram HD. The front panel 1200A is shown as symmetrical about the line of symmetry 1208.

Figures 12A, 12B:
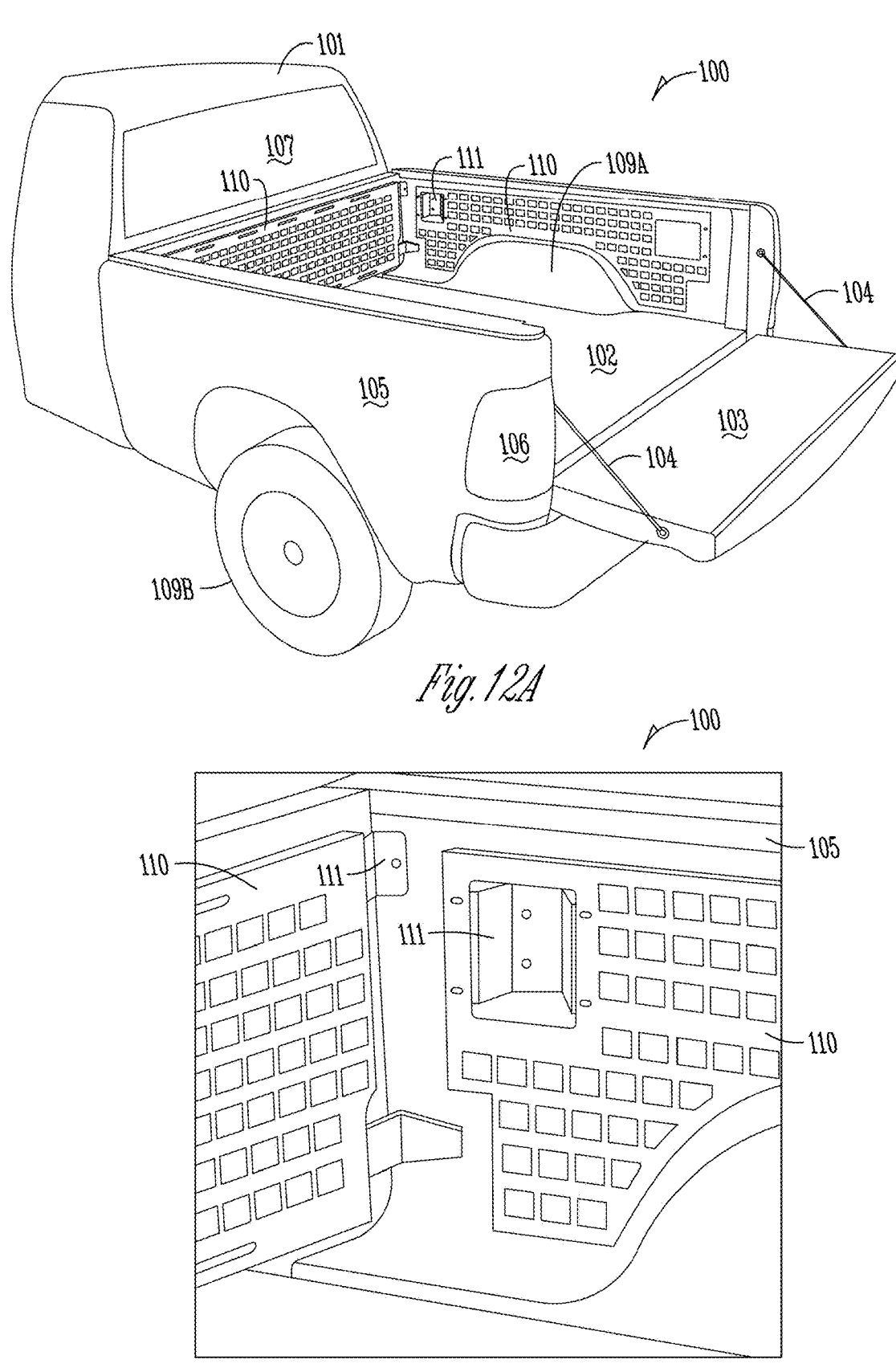
FIGS. 12A-12G exemplify one embodiment of the modular, lightweight load-carrying panel system, said embodiment being specifically designed for a Dodge Ram HD. More particularly.
Figure 12C:
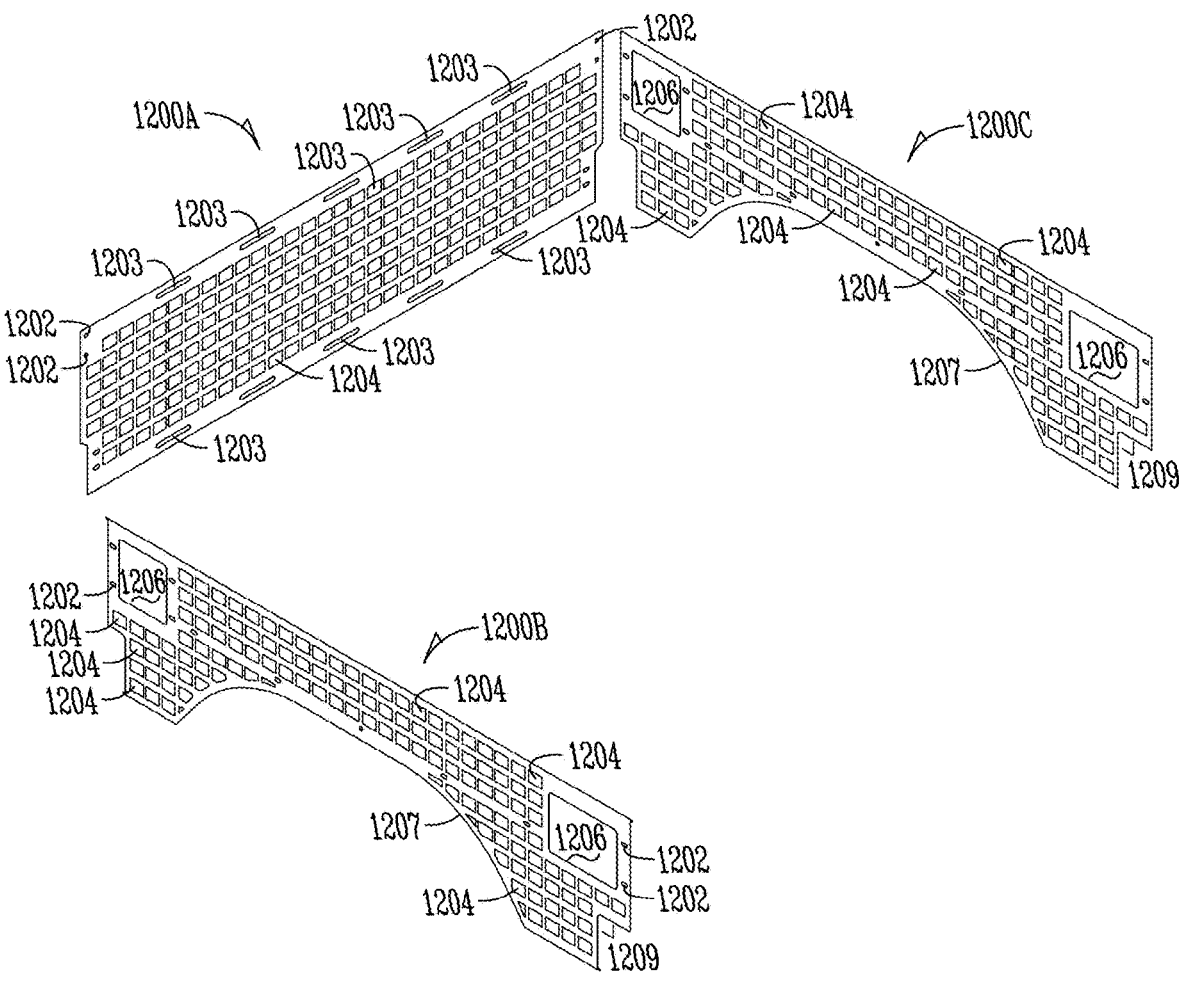
Figures 12D, 12E, 12F, 12G:
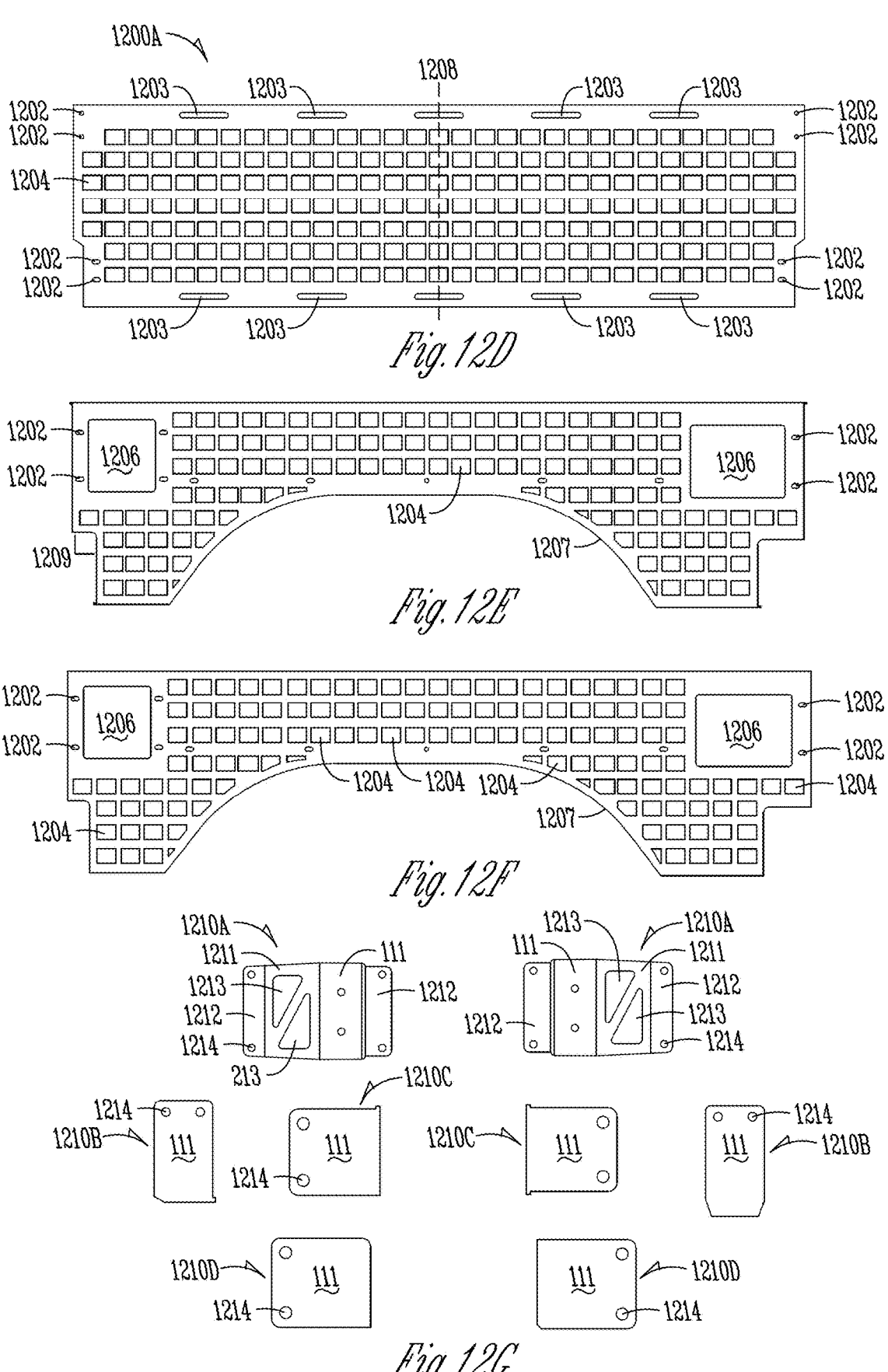

FIG. 12G, in particular, shows double flange side bracket(s) 1210A, single flange side bracket(s) 1210B, upper front bracket(s) 1210C, lower front bracket(s) 1210D, first bracket flange(s) 1211, second bracket flange(s) 1212, bracket cutout(s) 1213, and bracket hole(s) 1214, through which bolts and screws can be inserted.

Regarding a method of installation for the panels 1200A, 1200B, 1200C of this particular embodiment, exemplary and enumerated installation instructions follow:

1. gather the single flange side mounting brackets 1210B and the double flange side mounting brackets 1210A and then loosely assemble two 5/16" well nuts and two Philip's head screws onto each of these brackets 1210A-B (the HD Dodge Ram is equipped with 4 removable tie-down hooks that are fastened to the side of the bed 102, which can be removed using a 5 mm hex key);

2. install the single-flange brackets 1210B by placing them behind the two rear tie-downs, then fasten to the bed re-using factory hardware (closest to the tailgate 103);

3. install the double flange brackets 1210A by sandwiching them between the bedside and the tiedown hooks you just removed and behind the front tie-down hooks (closest to the cab 101);

4. gather the two front upper brackets 1210C, loosely assemble one 2-3/8" long Allen head bolt, in-bed washer, and nut plate onto each of these brackets 1210C;

5. install the front upper bracket 1210C assemblies by inserting the nut plate into the slot located towards the top of each bed side (the nut plate will have to be inserted at an angle in order to fit), then orient the nut plate so that it is perpendicular and centered behind the slot and push the tabbed washer against the bed side so that the tabs fit into the slot (if aligned correctly, the tabs should prevent the nut plate from spinning), and while keeping the tabbed washer in the slot, pull back on the bolt and begin to tighten until snug;

6. optionally install extra flat brackets that can be mounted in the slots located above the wheel wells 109A and are fastened in place using the same method as the upper front brackets 1210C;

7. locate the two remaining front lower brackets 1210D and loosely assemble a 3/4-inch well nut and 1.5-inch long Allen head bolt onto each bracket 1210D, then install the lower bracket 1210D assemblies by inserting the well nut into the slot located just next to the forward tie-down hook before tightening the bolt using a 7/32 hex key until the well nut is snug in the slot;

8. prepare the front panel 1200A to be installed by threading a jam nut onto each of the rubber feet, then loosely screw the rubber feet into the riv-nuts located on the bottom flange of the front panel 1200A;

9. fasten all panels 1200A, 1200B, 1200C to the corresponding brackets 1210A-D using the provided Torx-head screws and a T30 Torx driver;

10. adjust the rubber feet on the front panel 1200A down until they are snug against the floor of the bed 102, then secure the rubber feet in place by tightening the jam nuts against the front plate 1200A using a 10 mm wrench; and 11. once all the panels 1200A, 1200B, 1200C are installed in the vehicle, ensure all fasteners are tightened until snug, but do not overtighten.

Figure 13:
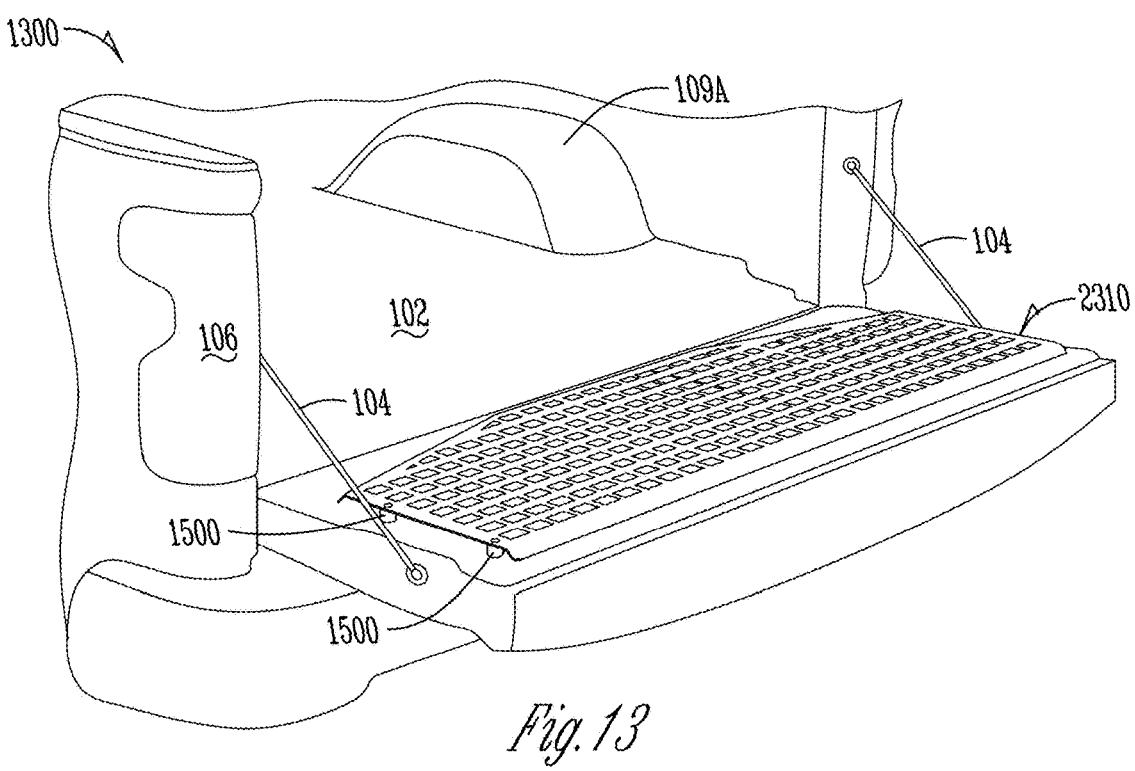
FIG. 13 shows an environmental perspective view of a modular, lightweight load-carrying panel system adapted to attach to a truck tailgate that rotates about a hinge in a downward direction to open and in an upward direction to close.
Figure 14:
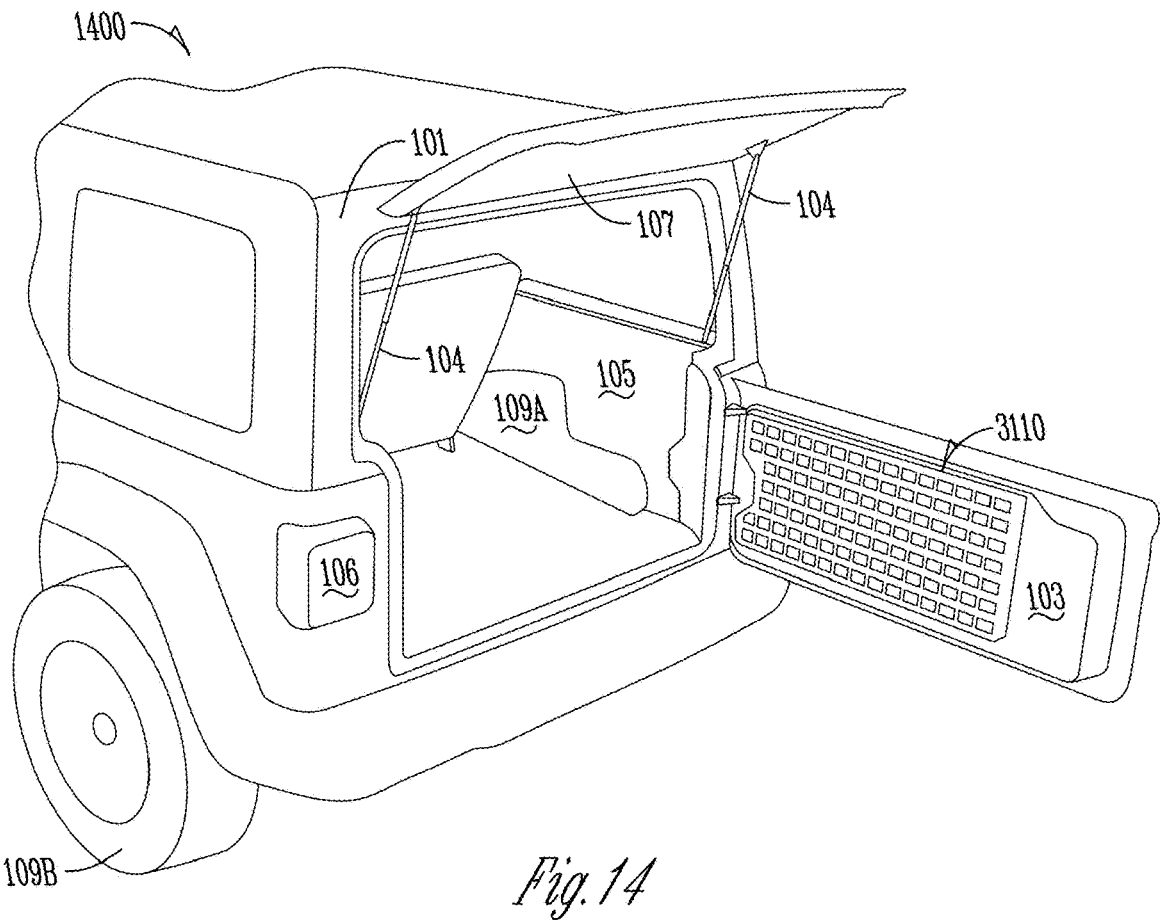
FIG. 14 shows an environmental perspective view of a modular, lightweight load-carrying panel system adapted to attach to a tailgate of a compact sport utility vehicle (SUV) that rotates in an outward direction (partially laterally and away from the vehicle) to open and in an inward direction (partially laterally and toward the vehicle) to close. The rear windshield uses struts to help rotate the rear windshield about a hinge in an upward direction to open (away from the vehicle) and in a downward direction (toward the vehicle) to close.

Similar panels can be used to attach to the tailgate 103 of the vehicle, as exemplified by the modular, lightweight load-carrying panel systems 1300, 1400 of FIGS. 13-14. Panels can be installed on tailgates 103 of pickup trucks, sport utility vehicles, compact sport utility vehicles, any other vehicle having a tailgate, vehicles having a substantially vertical rear surface, etc. For example, the system 1300 shown in FIG. 13 includes a tailgate 103 that rotates about a hinge in a downward direction to open and in an upward direction to close, while the system 1400 shown in FIG. 14 includes a tailgate 103 that rotates in an outward direction (partially laterally and away from the vehicle) to open and in an inward direction (partially laterally and toward the vehicle) to close.

Figure 15A:
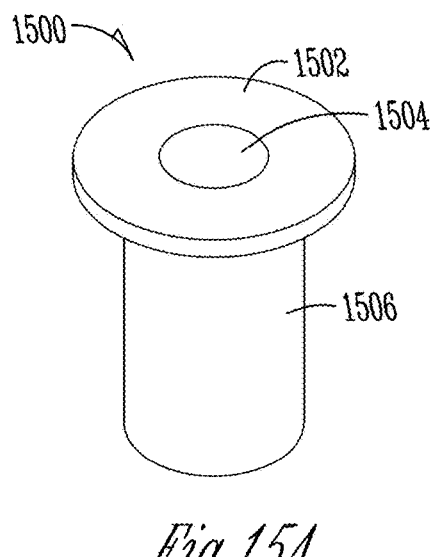
FIGS. 15A-C show a rubber-coated brass insulating well nut which can facilitate installation of modular, lightweight load-carrying panel systems installed on tailgates of the vehicle. In particular.
Figure 15B:
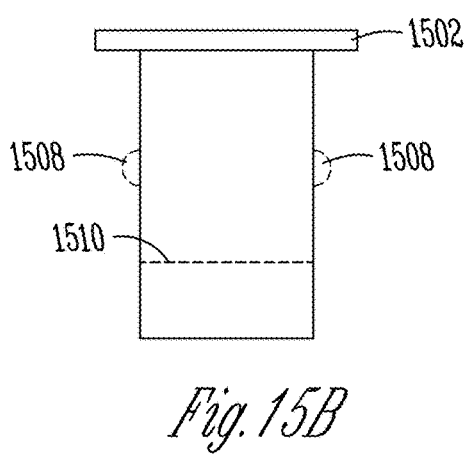
Figure 15C:
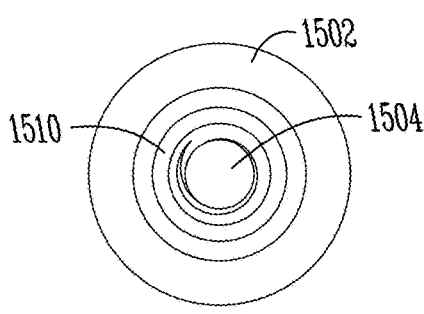

FIGS. 15A-C show a well nut 1500 (also known as river nuts) that can be used when installing one or more of the panels described herein. The well nut includes a flat upper surface 1502 perpendicularly to a cylindrical body of the well nut 1500, with a central aperture 1504 running therethrough. A nonconductive rubber coating 1506 insulates the nut from electricity, seals out moisture, and damps vibration. For the body itself, brass, a copper alloy, or another similarly suitable rigid material can be employed. Protrusions 1508 can be included on the hollow cylindrical body to increase the friction fit with any surfaces the well nut 1500 contacts. The well nut 1500 generally includes female threads 1510 which allow bolts and other types of fasteners to attach thereto after a desired object to be fastened has been placed over the well nut 1500. The thread direction of the female threads 1510 can be either right or lefthanded, and one such direction of the threading may be chosen depending on if it helps facilitate installation of same.

There are generally two ways in which a tailgate panel can be attached to the tailgate 103.

Figure 16A:
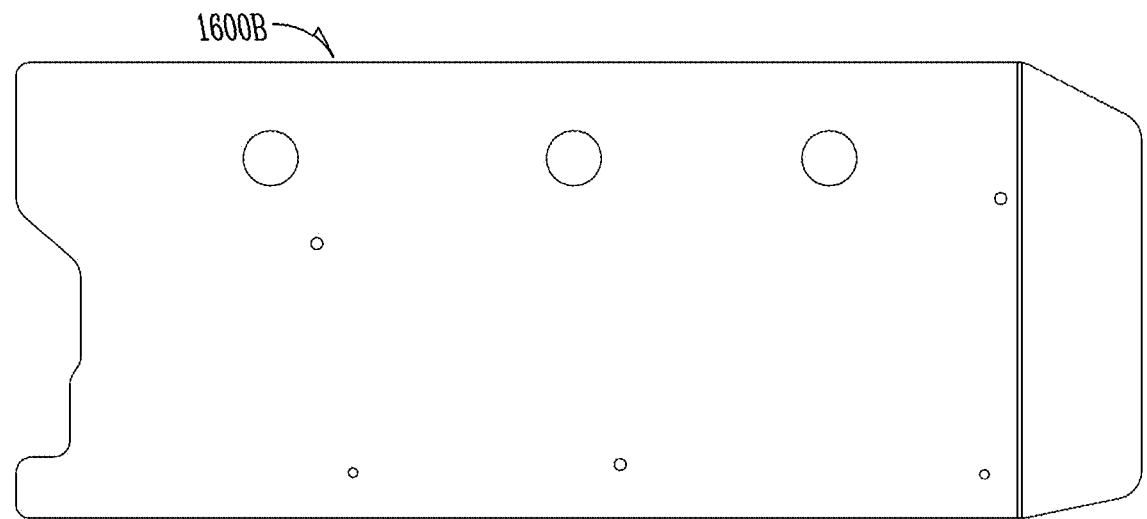
FIG. 16A shows a detailed view of a backing plate.
Figure 16B:
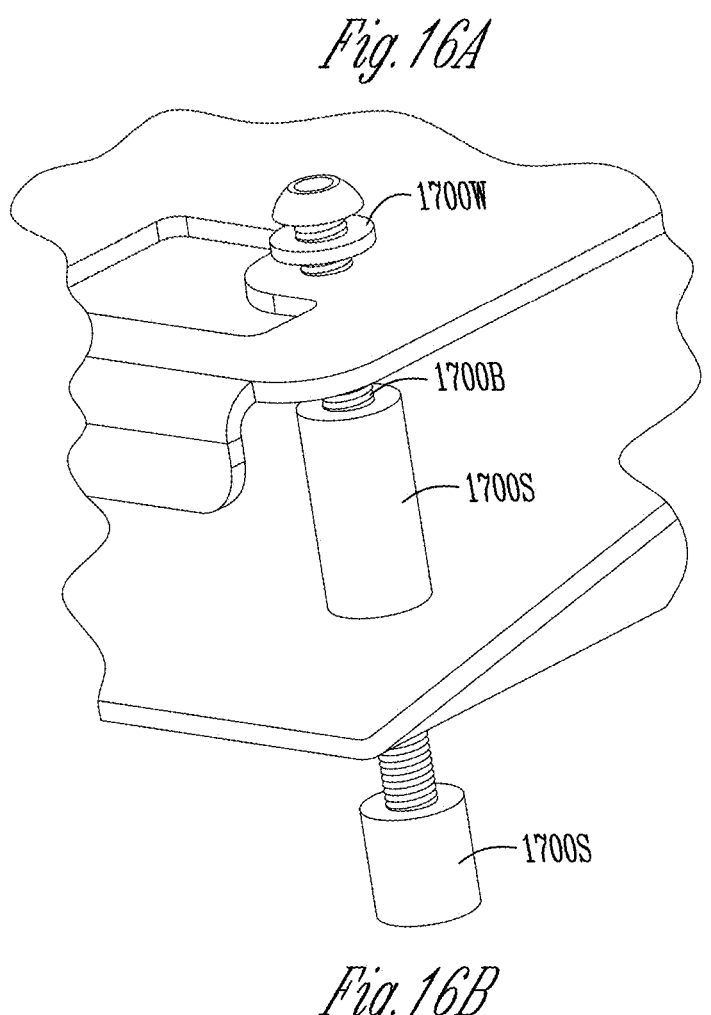
FIG. 16B shows that after removing the access panel from the tailgate in a compact sport utility vehicle such as the one shown in the system of FIG. 14, bolts can be inserted through the backing plate, then a spacer.

The second method, shown in FIGS. 16A-B, involves inserting the bolts 1700B through the backing plate 1600B and then spacer(s) 1700S. The bolts are also inserted through the tailgate panel and threaded into the pre-existing holes 1600 in the tailgate 103. Washers 1700W are not required but can be beneficial if employed to ensure the bolts 1700 are tight. There can be three bolt 1700B and washer 1700W combinations that hold the backing plate 1600B. All the bolts 1700B should be snug, but not overtightened. The washers 1700W will also aid in avoiding overtightening the bolts 1700B.

Figures 17A, 17B:
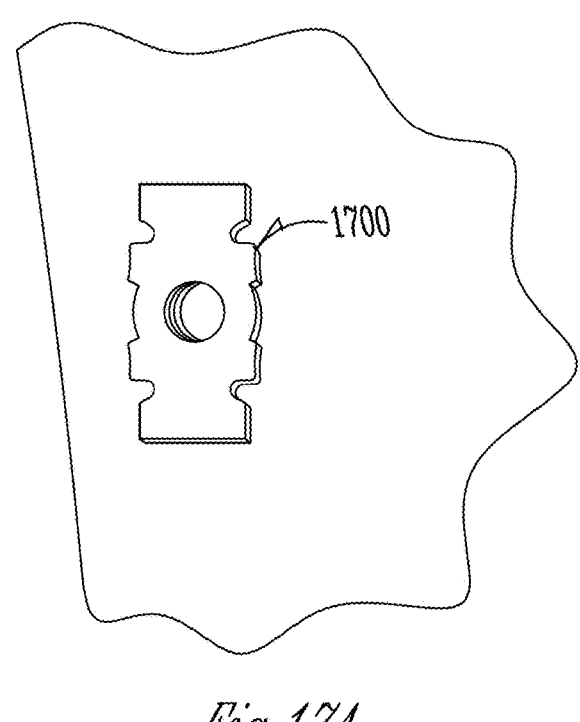
FIG. 17A shows an existing screw retainer from the tailgate which can be removed so as to be able to install the modular, lightweight load-carrying system shown in FIG. 13. Such removal can occur through the use of a flathead screwdriver.
FIG. 17B shows well nuts can be inserted into the holes where the screw retainers were, so as to replace the tailgate access panel with the lightweight load-carrying system shown in FIG. 13.
Figure 17C:
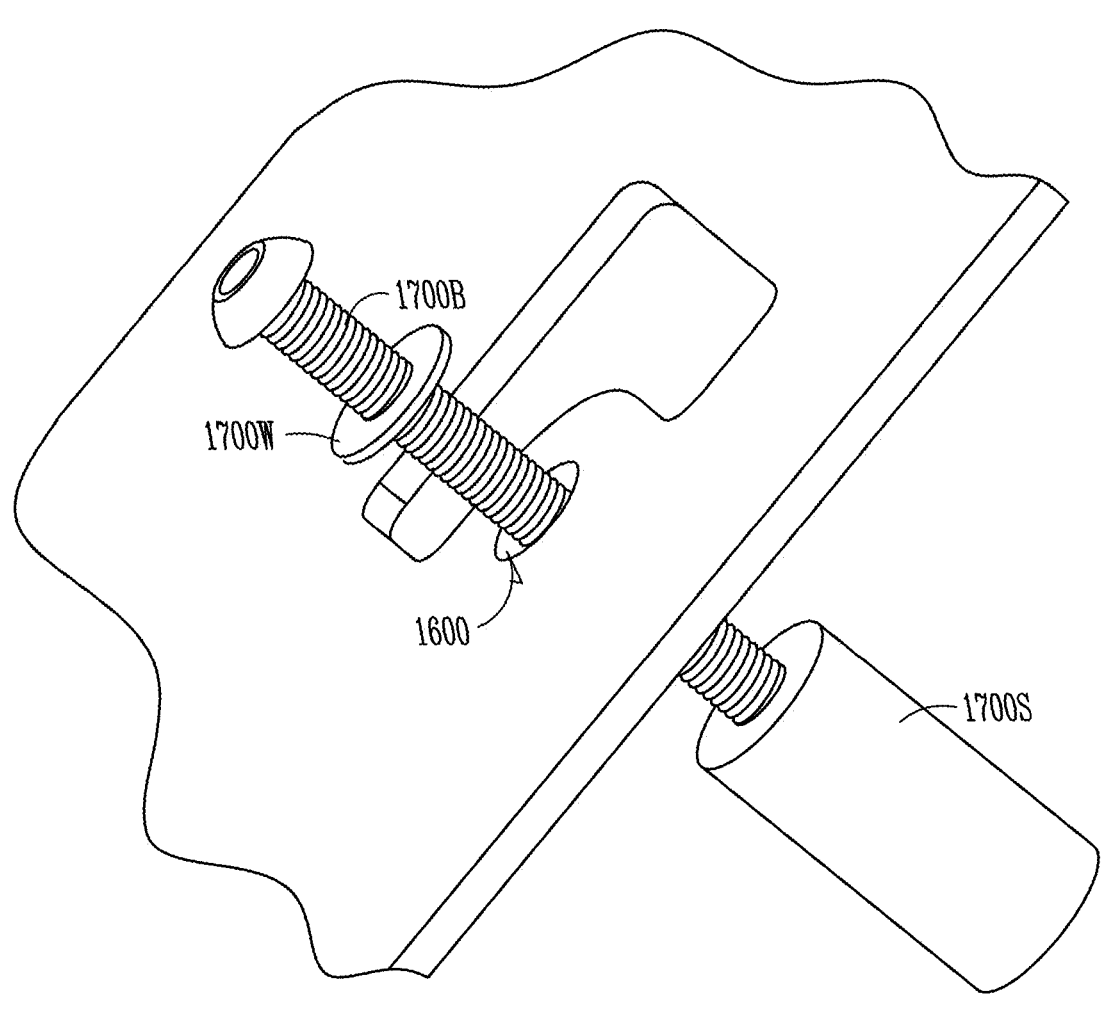
FIG. 17C shows bolts can be inserted through the modular lightweight load-carrying panel, a washer, a spacer, the well nut of FIG. 15, and the tailgate of the vehicle.

The second method, shown in FIGS. 17A-C, involves removing the access panel on the tailgate 103, which can in some embodiments be accomplished using a T20 Torx driver. The screw retainers 1700 can then be located and removed from the tailgate 103, such as through use of a flathead screwdriver. The well nut 1500 or a plurality of well nuts 1500 can be inserted into the holes 1600 where the screw retainers 1700 were. The bolts 1700B can then be inserted through the tailgate panel and any spacer(s) 1700S. Washers 1700W can be placed between the spacer 1700S and the tailgate access panel. The bolts 1700B can then be threaded into the well nuts 1500.

Figure 18:
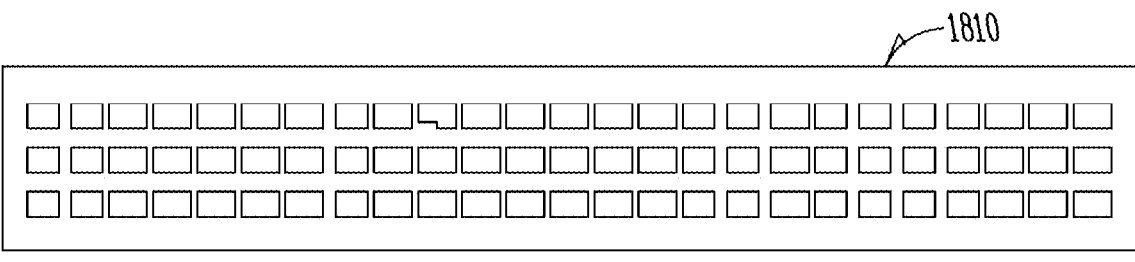
FIG. 18 exemplifies one embodiment of the modular, lightweight load-carrying panel system for a tailgate, said embodiment being specifically designed for a Chevy Colorado/Canyon.
Figure 19:
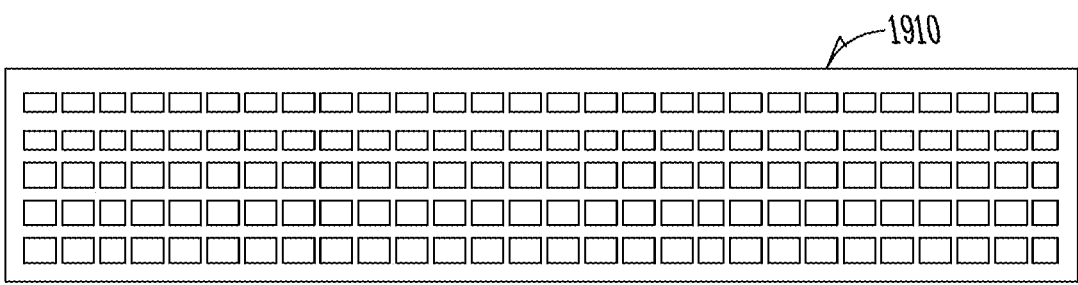
FIG. 19 exemplifies one embodiment of the modular, lightweight load-carrying panel system for a tailgate, said embodiment being specifically designed for a Chevy Silverado/Sierra (K1).
Figure 20A:
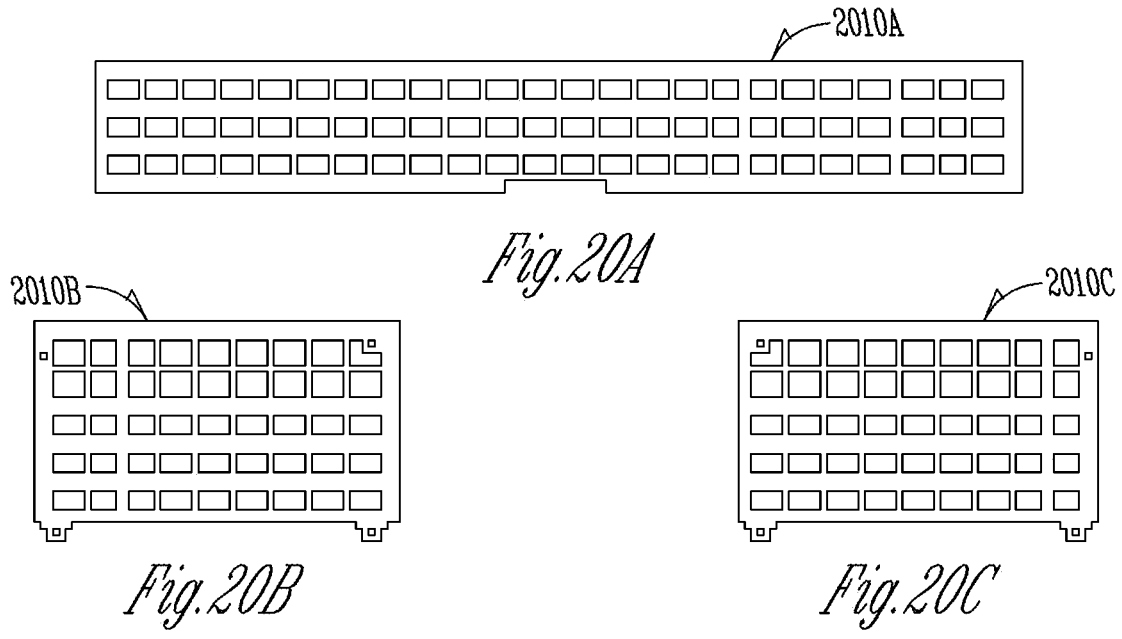
Figures 21, 22A, 22B, 22C, 23:
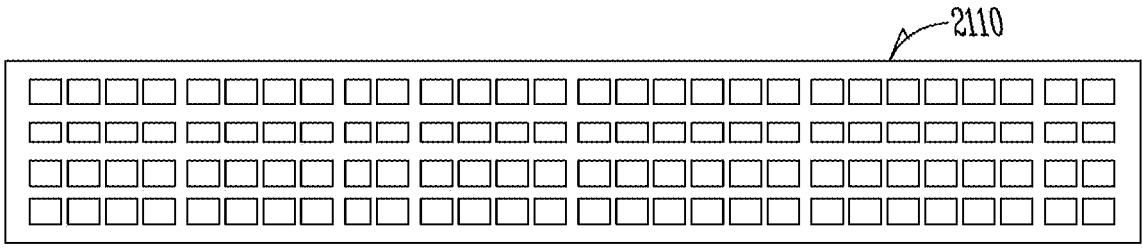
FIG. 21 exemplifies one embodiment of the modular, lightweight load-carrying panel system for a tailgate, said embodiment being specifically designed for a Chevy Silverado/Sierra HD.
FIGS. 22A-22C exemplifies one embodiment of the modular, lightweight load-carrying panel system for a tailgate, said embodiment being specifically designed for a Chevy Silverado/Sierra Multi-Pro.
FIG. 23 exemplifies one embodiment of the modular, lightweight load-carrying panel system for a tailgate, said embodiment being specifically designed for a Chevy Silverado/Sierra.
Figure 27:
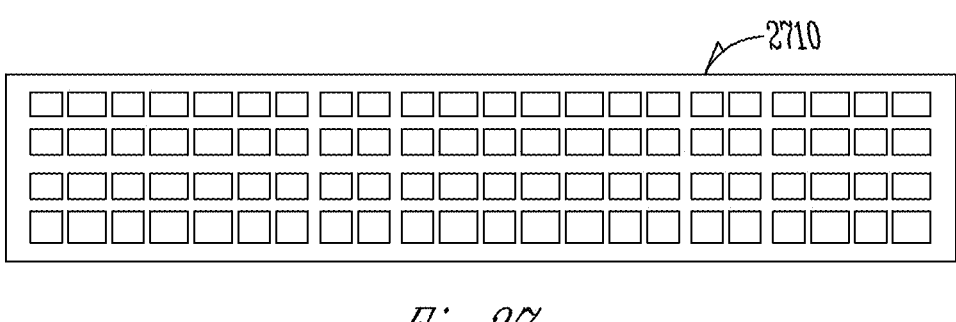
FIG. 27 exemplifies one embodiment of the modular, lightweight load-carrying panel system for a tailgate, said embodiment being specifically designed for a Ford Maverick.
Figure 28:
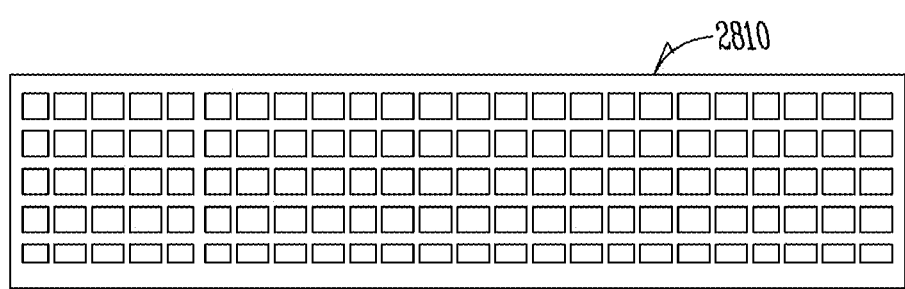
FIG. 28 exemplifies one embodiment of the modular, lightweight load-carrying panel system for a tailgate, said embodiment being specifically designed for a Ford Ranger.
Figure 29:
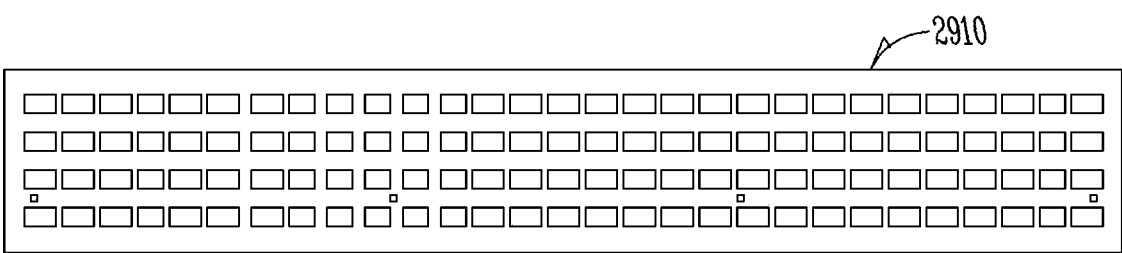
FIG. 29 exemplifies one embodiment of the modular, lightweight load-carrying panel system for a tailgate, said embodiment being specifically designed for a Ford Super Duty.
Figure 30:
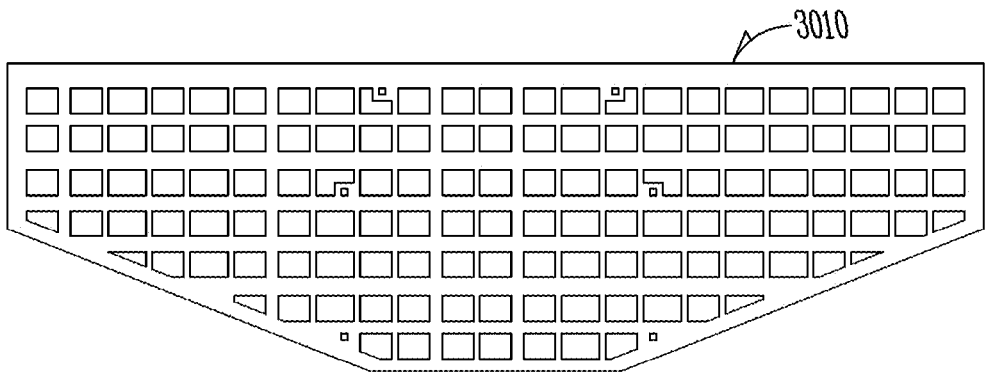
FIG. 30 exemplifies one embodiment of the modular, lightweight load-carrying panel system for a tailgate, said embodiment being specifically designed for a Jeep Gladiator.
Figure 31:
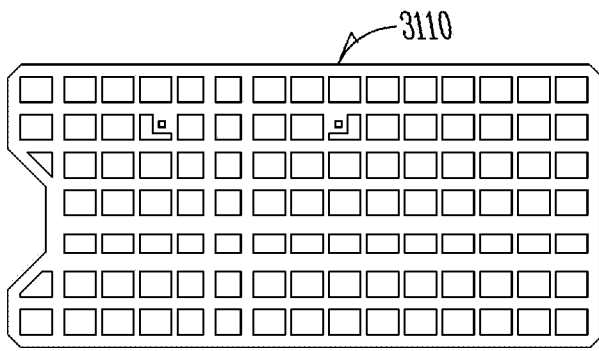
FIG. 31 exemplifies one embodiment of the modular, lightweight load-carrying panel system for a tailgate, said embodiment being specifically designed for a Jeep Wrangler JL.
Figure 32:
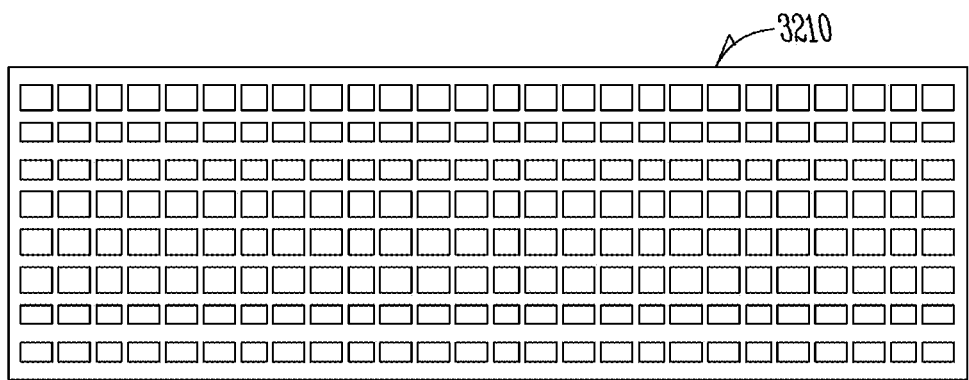
FIG. 32 exemplifies one embodiment of the modular, lightweight load-carrying panel system for a tailgate, said embodiment being specifically designed for a Nissan Frontier.
Figure 33:
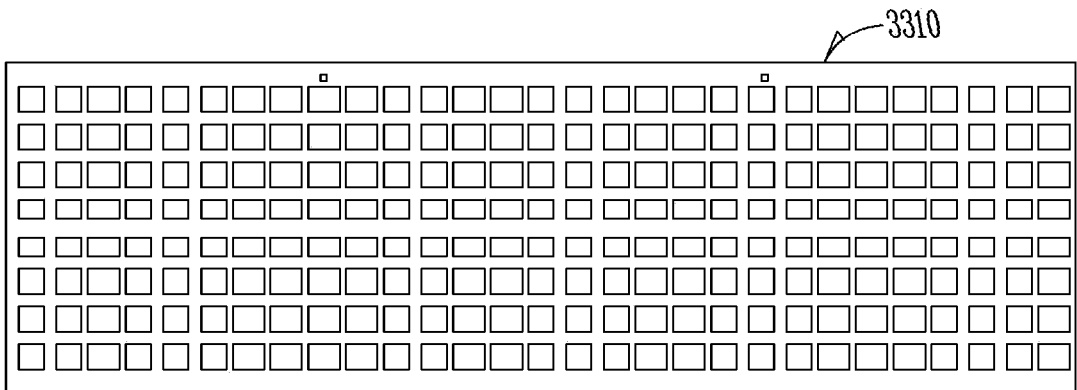
FIG. 33 exemplifies one embodiment of the modular, lightweight load-carrying panel system for a tailgate, said embodiment being specifically designed for a Nissan Titan.
Figure 34:
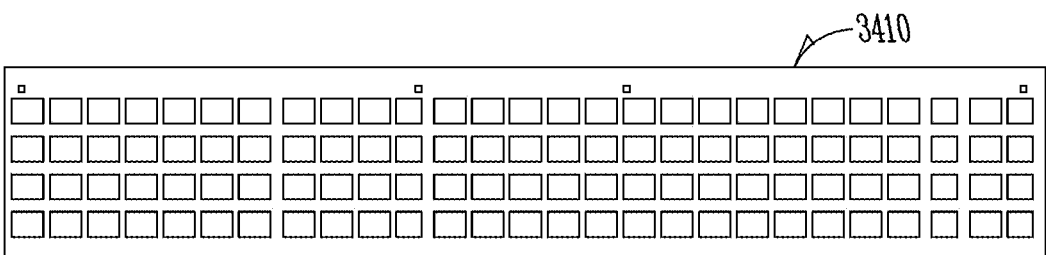
FIG. 34 exemplifies one embodiment of the modular, lightweight load-carrying panel system for a tailgate, said embodiment being specifically designed for a Dodge Ram 1500.
Figure 35:
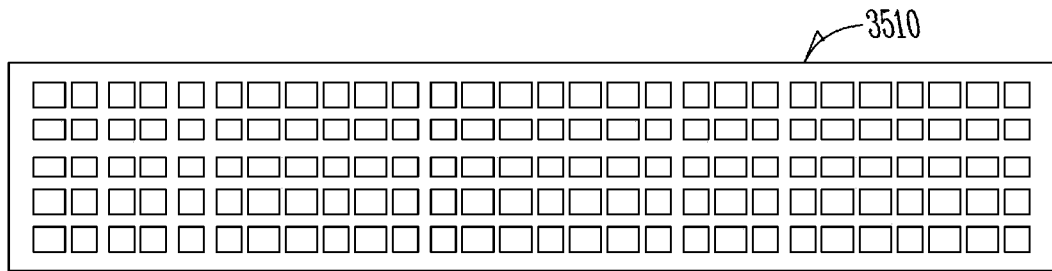
FIG. 35 exemplifies one embodiment of the modular, lightweight load-carrying panel system for a tailgate, said embodiment being specifically designed for a Dodge Ram HD.
Figure 36:
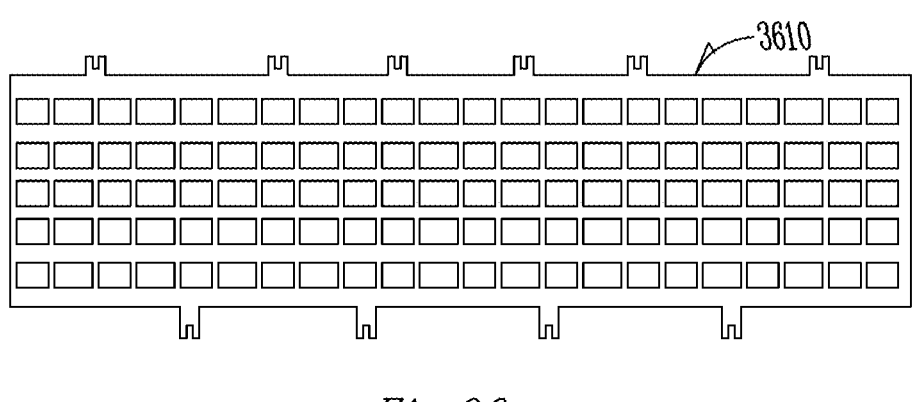
FIG. 36 exemplifies one embodiment of the modular, lightweight load-carrying panel system for a tailgate, said embodiment being specifically designed for a Toyota Tacoma.
Figure 37:
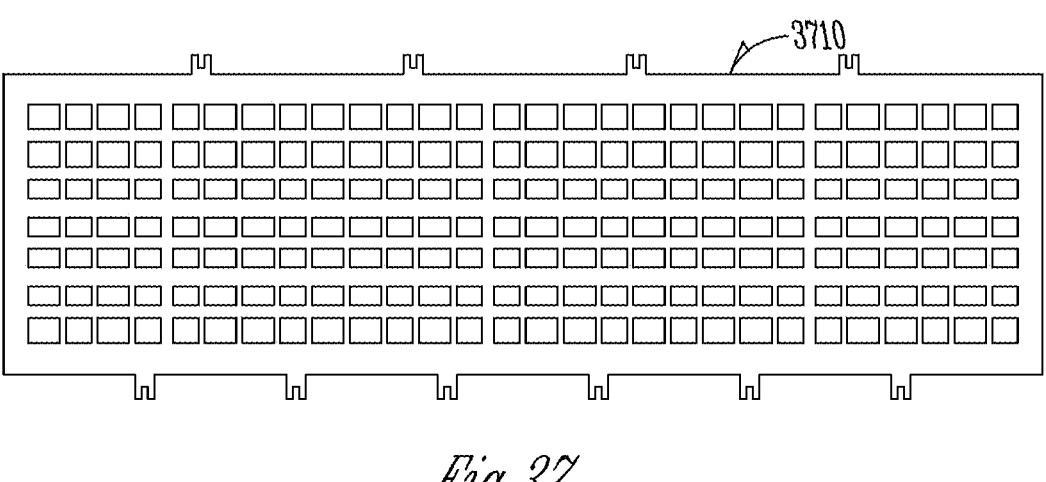
FIG. 37 exemplifies one embodiment of the modular, lightweight load-carrying panel system for a tailgate, said embodiment being specifically designed for a Toyota Tundra.
Figure 38:
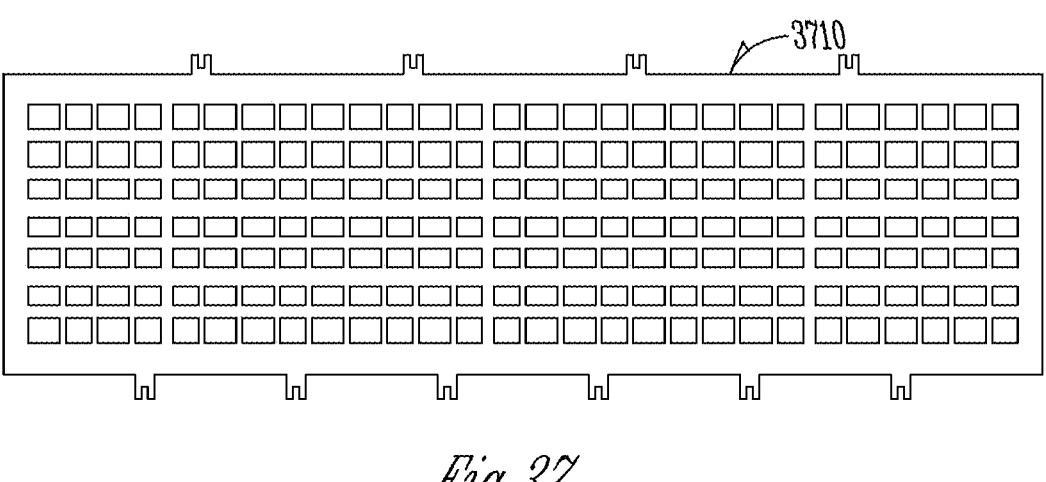
FIG. 38 exemplifies yet another embodiment of the modular, lightweight load-carrying panel system for a tailgate, said embodiment being specifically designed for a Toyota Tundra.

FIGS. 18-38 exemplify embodiments of the modular, lightweight load-carrying panel system 100 for the tailgate 103. The panels shown are a tailgate panel 1810 adapted for installation on a Chevy Colorado/Canyon (FIG. 18); a tailgate panel 1910 adapted for installation on a Chevy Silverado/Sierra (K1) (FIG. 19); tailgate panels 2010A, 2010B, 2010C adapted for installation on a Chevy Silverado/Sierra HD-Multi-Pro (FIGS. 20A-20C); a tailgate panel 2110 adapted for installation on a Chevy Silverado/Sierra HD (FIG. 21); tailgate panels 2210A, 2210B, 2210C adapted for installation on a Chevy Silverado/Sierra Multi-Pro; a tailgate panel 2310 adapted for installation on a Chevy Silverado/Sierra (FIG. 23); a tailgate panel 2410 adapted for installation on a Ford Bronco (FIG. 24); tailgate panels 2510A, 2510B adapted for installation on a Ford F150 with a work surface (FIG. 25A); a tailgate panel 2610 adapted for installation on a Ford F150 (FIG. 26); a tailgate panel 2710 adapted for installation on a Ford Maverick (FIG. 27); a tailgate panel 2810 adapted for installation on a Ford Ranger (FIG. 28); a tailgate panel 2910 adapted for installation on a Ford Super Duty (FIG. 29); a tailgate panel 3010 adapted for installation on a Jeep Gladiator (FIG. 30); a tailgate panel 3110 adapted for installation on a Jeep Wrangler JL (FIG. 31); a tailgate panel 3210 adapted for installation on a Nissan Frontier (FIG. 32); a tailgate panel 3310 adapted for installation on a Nissan Titan (FIG. 33); a tailgate panel 3410 adapted for installation on a Dodge Ram 1500 (FIG. 34); a tailgate panel 3510 adapted for installation on a Dodge Ram HD (FIG. 35); a tailgate panel 3610 adapted for installation on a Toyota Tacoma (FIG. 36); a tailgate panel 3710 adapted for installation on a Toyota Tundra (FIG. 37); and another tailgate panel 3810 adapted for installation on a Toyota Tundra (FIG. 38).

It is to be appreciated from viewing the panels 1810-3810 that each individual panel has one or more of the features described with reference to the panels described with reference to FIGS. 4A-12F. Said features will be able to accomplish similar functions to those described above, but will custom engineered specific so as to facilitate securement of objects to the tailgate 103 instead of the sidewalls of a truck bed.

Figure 39:
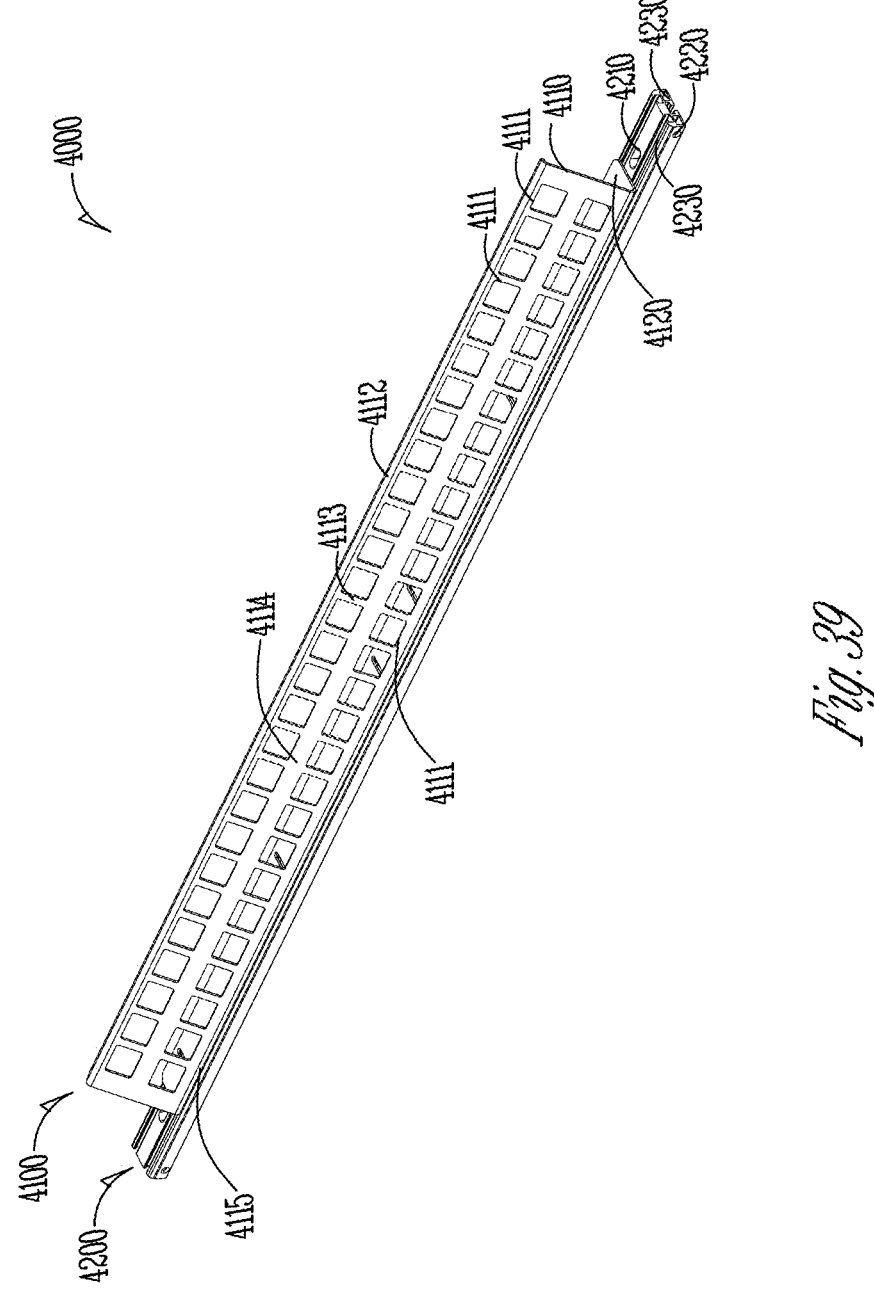
FIG. 39 shows a perspective view of a modular load carrying panel assembly.
Figure 40:
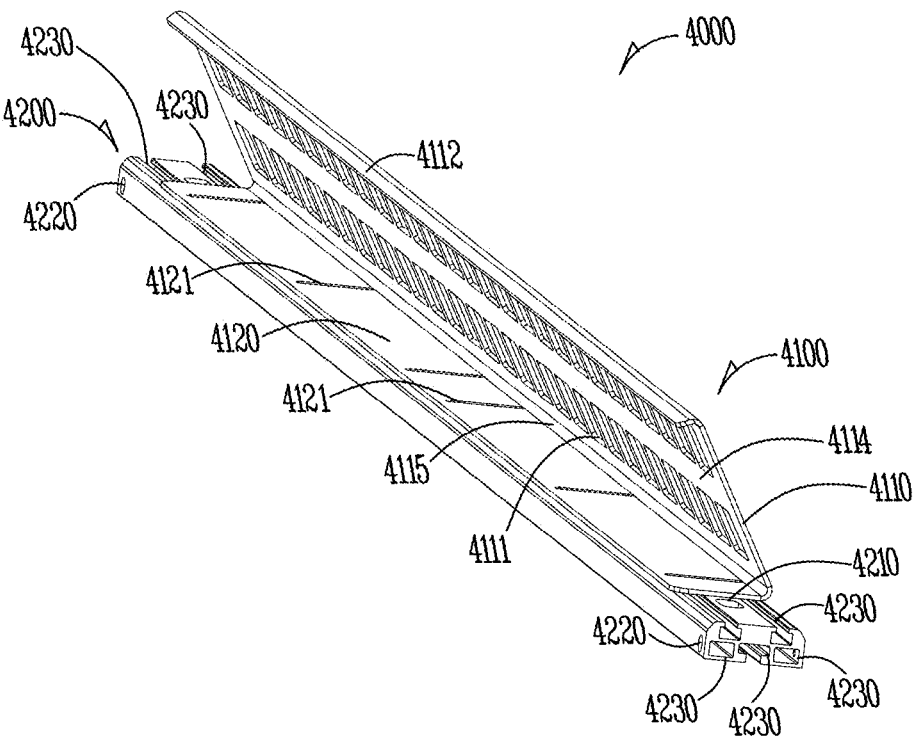
FIG. 40 shows another perspective view of the modular load carrying panel assembly of FIG. 39.

FIGS. 39-40 show perspective views of a modular load carrying panel assembly 4000. The modular load carrying panel assembly 4000 includes a load carrying panel 4100 and a railing 4200. The load carrying panel 4100 includes an angled panel 4110 and amounting panel 4120. The railing 4200 includes first mounting apertures 4210, second mounting apertures 4220, and channels 4230. The angled panel 4110 includes apertures 4111 (also referred to as a plurality of apertures 4111), a top portion 4112, intervals 4113, a median 4114, and a connecting portion 4115. The mounting panel 4120 includes mounting slots 4121.

The load carrying panel 4100 can be placed on top of the railing 4200. The load carrying panel 4100 may be secured or fastened to the railing 4200 via the mounting slots 4121 in combination with the channels 4230. By way of example and not of limitation, this may be accomplished by inserting a nut with the same width (face-to-face, not corner-to-corner) as a width of one of the channels 4230 into the chosen channel 4230 and inserting a screw through one of the mounting slots 4121 to connect with the nut and thus fasten the load carrying panel 4100 to the railing 4200. Alternatively, the railing may have pre-existing threaded-holes that the load carrying panel 4100 may be attached to. Alternatively, the load carrying panel 4100 may be welded to the railing 4200. As shown in FIGS. 39-40, the load carrying panel 4100 is not limited to one specific connection point to the railing 4200 as the load carrying panel 4100 may slide along the railing 4200 to be fastened down at a destination on the railing 4200 other than a center position according to what position works best for a user.

The load carrying panel 4100 includes the angled panel 4110 and the mounting panel 4120, which are connected via the connecting portion 4115. On the angled panel 4110 there are a plurality of apertures 4111. The apertures 4111 can resemble the PALS grid 404, 504, 604, 704, 804, 904, 1004, 1104, 1204 of previously explained embodiments. As shown the apertures 4111 can be equally spaced, however this is not limiting as they can be irregularly spaced as well. As shown, the apertures 4111 are each substantially square, rectangular, or stadium in shape, as this allows for an increased number of apertures 4111 along a length of the angled panel 4110 that can be accessed for mounting objects where it may best suit a user, while simultaneously providing structural soundness to the non-aperture portions of the angled panel 4110.

The angled panel 4110 of the load carrying panel 4100 further includes the top portion 4112, the intervals 4113, and the median 4114. The top portion 4112 is designed to be have a rounded corner or bend, a fillet, and thus be less abrasive to the touch should a person or object lean against the top portion, while also providing material to tie around and mount to. The top portion 4112 can extend to a top of the apertures 4111. The intervals 4113 may comprise equally-spaced rectangles or other suitable shape for tying or grasping to that are interspersed between the apertures 4111. The median 4114 stretches across the length of the angled panel 4110 and separates rows of apertures 4111. It is contemplated that there may exist a plurality of medians 4114 such that there are more than two rows of apertures 4111. For example, there may exist two medians 4114 and three total rows of apertures 4111. Or, there may exist three medians 4114 and four total rows of apertures 4111. As such, the height of the angled panel 4110 is not limited to just that shown, although the preferred embodiment keeps the angled panel 4110 to a height of what would keep the angled panel 4110 from extending much further than a side of the railing 4200 that is opposite a side that the connecting portion 4115 resides. As such, the number of rows of apertures 4111 is limited to a height of the angled panel 4110 without decreasing a height of the rows of apertures 4111. Although as understood by those of ordinary skill in the art, the height of the rows of apertures 4111 can be decreased, thus increasing a number of rows of apertures 4111 and medians 4112 on the angled panel 4110.

Thus, in a sense the angled panel 4110 could be referred to as a hypotenuse, wherein the connecting portion 4115 comprises an acute angle, and the mounting panel 4120 comprises another side of the imaginative triangle, wherein an imaginative plane, that is perpendicular to a side of the mounting panel 4120 opposite a side of the mounting panel 4120 that includes the connecting portion 4115, would substantially be the stopping point of and extending end of the angled panel 4110 (hypotenuse). As understood by those of ordinary skill in the art, this does not mean that the angled panel 4100 needs to extend all the way to the imaginative plane (and thus not form a complete triangle, and this does not mean that the angled panel 4110 cannot extend past the imaginative plane. As further understood by those of ordinary skill in the art, the angle formed by the angled panel 4110 in relation to the mounting panel 4120 need not be limited to the angle shown, rather the angle can be varied, while remaining acute, in manufacturing to accommodate varying heights of the angled panel 4100 depending on how many rows of apertures 4111 are desired.

As stated, the load carrying panel 4100 can attach to the railing 4200. The railing can be connected to a surface on a vehicle via the first mounting apertures 4210, the second mounting apertures 4220, or the channels 4230. This can be accomplished via fastening methods known by those of ordinary skill in the art. By way of example and not of limitation, the first mounting apertures 4210 can bolt or screw directly down to and on top of a surface on a vehicle if using a bolt or screw and lining up the first mounting apertures 4210 with holes on the surface of the vehicle.

These holes can be pre-existing holes or holes made on the vehicle to accommodate attaching the modular load carrying panel assembly 4000. As understood by those of ordinary skill in the art, manufacturers can create the railing 4200 such that the first mounting apertures 4210 line up with pre-existing holes on a vehicle. The width apart of the first mounting apertures 4210 from one another on the railing 4200 is not limited to a specific length, nor is the number of first mounting apertures 4210 limiting. Rather, there may be three, four, or more first mounting apertures 4210 to screw or bolt down to a surface.

Further by way of example and not of limitation, the second mounting apertures 4220 can bolt or screw directly down to and on a side of a surface on a vehicle if using a bolt or screw and lining up the second mounting apertures 4220 with holes on the surface of the vehicle. These holes can be pre-existing holes or holes made on the vehicle to accommodate attaching the modular load carrying panel assembly 4000. As understood by those of ordinary skill in the art, manufacturers can create the railing 4200 such that the second mounting apertures 4220 line up with pre-existing holes on a vehicle. The width apart of the second mounting apertures 4220 from one another on the railing 4200 is not limited to a specific length, nor is the number of second mounting apertures 4220 limiting. Rather than the two shown on a given side of the railing 4200, there may be three, four, or more second mounting apertures 4220 to screw or bolt to a substantially vertical surface.

Further, by way of example and not of limitation, the channels 4230 can slidingly engage rails or otherwise (such as multiple hex-headed bolts straightly aligned that are not fully screwed into their surface, such that the hex-head creates an overhang above the surface that the threaded portion of the bolt is threaded into) so as to be fastened to a surface on a vehicle. As explained, the modular load carrying panel assembly 4000, the load carrying panel 4100 can be secured to the railing 4200. As such, the railing 4200 can be secured to the sidewall 105, anywhere in the bed 102, at a bottom of the cab 101, on the panel 110, on the tailgate 103, to name a few places as non-limiting examples, thus creating a spot to mount things to where there otherwise would not have existed a place to mount things to. Alternatively, the load carrying panel 4100 can be directly secured to the sidewall 105, anywhere in the bed 102, at a bottom and back of the cab 101, on the panel 110, on the tailgate 103, to name a few places as non-limiting examples thus bypassing the connection to the railing 4200. This can be accomplished by aligning the mounting slots 4121 to holes or otherwise on a vehicle, and fastening the load carrying panel 4100 to the vehicle via screws, bolts, etc. to those holes.

In particular, the modular load carrying panel assembly 4000 is designed to be capable of connecting to a variety of places, thus providing flexibility and versatility in setting up a securing-mount for other objects. Said securing-mount specifically comprising the apertures 4111, the intervals 4113, and the median 4114 disposed within the load carrying panel 4100, in which bungee cords, straps, clamps, rope, etc. can enter the apertures 4111, tie, loop around, and/or clamp to the intervals 4113 and/or the median 4114, and thus secure an object to or near the load carrying panel 4100.

To install the modular load carrying panel assembly 4000 a user first decides on a location of a vehicle to place the modular load carrying panel assembly 4000. The user may desire to have increased height on a truck bed accessible for mounting and storing objects to be transported. The user may then decide to locate the modular load carrying panel assembly 4000 atop the sidewall 105 shown in FIG. 1. The user may then locate holes on the sidewall 105 or create holes distanced the same as first mounting apertures 4210 on the railing 4200 to attach the railing 4200 atop the sidewall 105 via inserting screws, bolts, or other fastening methods for securing either of the railing 4200 to the vehicle. As understood by those of ordinary skill in the art, holes may be pre-existing or created to match distances between the mounting slots 4121 on the load carrying panel 4100 so as to directly attach the load carrying panel 4100 to the vehicle instead of using the railing 4200.

Should there exist a portion atop the sidewall 105 for the railing 4200 to slidingly engage, this would be preferable for more even distribution of forces exerted between the modular load carrying panel assembly 4000 and the vehicle. Further, should the user attach the railing 4200 to the vehicle, it is understood that the load carrying panel 4100 would be attached to the railing 4200 either before or after attachment of the railing 4200 to the vehicle. As explained above, the load carrying panel 4100 may be secured or fastened to the railing 4200 via the mounting slots 4121 in combination with the channels 4230. Should the user need to adjust a location of the load carrying panel 4100 atop the railing 4200 after the railing is attached to the vehicle, this can be easily done via loosening the screws or bolts inserted between the mounting slots 4121 and the channels 4230 and slidingly the load carrying panel 4100 accordingly in either of a longitudinal or lateral direction along the railing 4200. Should the user be absolutely certain that no adjustment of the load carrying panel 4100 in relation to the railing 4200 would ever be needed, the load carrying panel 4100 can be permanently attached to the railing 4200 via welding, brazing, or other permanent attachment methods understood by those of ordinary skill in the art.

It is understood that the railing 4200 shown in FIGS. 39-40 can be reversed or flipped upside down, should there be pre-existing mounting structure on the vehicle that would be better suited to having the railing 4200 flipped upside down. For example, the pre-existing mounting structure on the vehicle may be two slidingly-engageable tracks spaced apart the distance of the channels 4230 on top of the railing 4200 instead of a single slidingly-engageable track that would better accommodate the channel 4230 shown on bottom of the railing 4200. This flipping of the railing 4200 can be easily accomplished while still allowing for attachability to the load carrying panel 4100 because the mounting slots 4121 extend a width of both the two channels 4230 atop the railing 4200 as well as the single channel 4230 on bottom of the railing 4200.

To use the modular load carrying panel assembly 4000, after installation the user simply has access to more mounting locations for a more organized and more-space creating transport of objects in and/or on vehicles. As explained with previous embodiments that use a PALS grid, and shown in previous embodiments such as that of FIG. 1, objects can be mounted to the load carrying panel 4100 for safety (protection of the object such that it does not get thrown around and/or dinged up, but also safety of people such that none of the objects will fall off or out of the vehicle), security (assurance, dependability, and confidence that the objects will be secured for entirety of the transport), organization, and peace of mind. As explained, objects can be mounted to the load carrying panel via fastening means such as bungee cords, straps, clamps, rope, zip-ties, Velcro, locks, etc., whatever is capable of looping around the object and the top portion 4112, intervals 4113, and/or median 4114 of the load carrying panel 4100, wherein the load carrying panel 4100 is secured to the vehicle either directly or vicariously through the railing 4200.

It is preferred that the modular load carrying panel assembly 4000 face an interior of the vehicle (meaning a side of the load carrying panel 4100 shown in FIG. 39 is facing internally to the vehicle rather than a side of the load carrying panel 4100 that is shown in FIG. 40) such that objects maintain an additional measure of security by potentially falling into the vehicle (such as the bed 102) rather than falling outside the vehicle should the fastening means be compromised (such as a zip-tie snapping). However, the modular load carrying panel assembly 4000 can face outwardly as well, such that even more storing space is created for a vehicle such as the truck bed 102. Meaning, should the modular load carrying panel assembly 4000 be installed atop the sidewall 105 and face outward, this produces a situation in which effectually walls of the bed 102 have been raised (additional barrier atop the sidewall 105 to contain an even higher amount of materials within the bed 102 without overflowing), while simultaneously allowing for objects to be stored outside the vehicle as objects could be secured to the modular load carrying panel assembly 4000 facing outside the vehicle similar to a hatchet or axe that is stored on an exterior of a firetruck. Thus, the modular load carrying panel assembly 4000 in this sense simultaneously increases the load capacity of the bed 102 by increasing a height of walls surrounding the bed 102 to contain objects therein, while also allowing for storage of objects outside the bed 102 that otherwise would not be able to be stored outside the vehicle.

As understood by those of ordinary skill in the art, the modular load carrying panel assembly 4000 can be installed within the bed 102 should that be the user's preference. Whether that be on the bed 102 floor or on an interior of the sidewall 105 such as the PALS grids shown in FIG. 1, the modular load carrying panel assembly 4000 allows for greater versatility in that it is angled. For example, there could exist a multiplicity or plurality of modular load carrying panel assemblies 4000 installed at varying heights along a single sidewall 105 such that angled-shelving is created along the single sidewall 105. In this regard, the modular load carrying panel assembly 4000 could be installed with the side shown in FIG. 39 facing up or down. Should the side shown in FIG. 39 be installed facing down, this creates a plurality of shelves one atop the other (touching or spaced) that are angled towards the sidewall 105 (with respect to gravity) such that objects not only could be secured to the load carrying panel 4100 but objects could also be placed in an angled portion between the angled panel 4110 and the mounting panel 4120 and said objects placed in the angled portion would lean towards the sidewall 105 due to the angled character of the angled panel 4110 and the side shown in FIG. 39 facing downward. Creating shelving in this regard not only frees up space within an interior of the bed 102, but also maintains holding objects close to the sidewalls 105 that perhaps may not need to be mounted, but only stored atop the shelving created by the modular load carrying panel assembly 4000.

Alternatively, the modular load carrying panel assembly 4000 could be installed within the sidewalls 105 such that the side shown in FIG. 39 be facing up. This would create a semi-roof of sorts under which objects could be stored. Securing objects underneath the modular load carrying panel assembly 4000 installed in this way could keep things secured between the modular load carrying panel assembly 4000 and the bed 102 while providing a mounting structure overhead the object rather than just to the sides or below. In this regard, not only could objects be more sturdily stored for transport, but the angled load carrying panel 4100 could act as a roof of sorts for the objects stored beneath, in which the user would simply connect a continuous material such as a tarp (or other thicker, sturdier, and/or stronger material) atop the modular load carrying panel assembly 4000 which is enabled by connecting to and/or through the apertures 4111 and thus objects stored beneath the modular load carrying panel assembly 4000 could be secured overhead and protected overhead from exterior forces (bird-poop or otherwise).

As understood by those of ordinary skilled in the art and as described herein, the modular load carrying panel assembly 4000 can be installed in a plurality of places on a vehicle and used according to the user's desire for increased storage space, increased mounting locations, and/or increased organization. Should the user desire to install the modular load carrying panel assembly 4000 directly onto the bed 102, this could be preferable for users who drive ATV's or motorcycles into the bed 102 such that the ATV could be driven straight into the bed and secured at a front end of the bed 102 similar to how vehicles in a parking lot drive up to the concrete slabs in a parking spot that act as parking blocks or wheel stops, however in this instance the ATV's wheel could be mounted and secured to the modular load carrying panel assembly 4000 through the apertures 4111.

Further as understood by those of ordinary skill in the art, it may be preferable to install the modular load carrying panel assembly 4000 atop the tailgate 103. In this regard, the modular load carrying panel assembly 4000 would act as a heightened tailgate 103 such that objects stored in the bed 102 would have increased stability from falling out the back, but further the modular load carrying panel assembly 4000 if installed such that the load carrying panel 4100 is facing inward (the side shown in FIG. 39 and not that of FIG. 40 would face inward towards the bed 102), this would create a situation in which objects such as handheld tools (hammers, drills, chisels, etc.) could be mounted to the modular load carrying panel assembly 4000, and when the tailgate 103 is let down, an easily accessible mid-body level inclined surface (similar to a podium) from which the user could grab the handheld tools (by detaching them from the load carrying panel 4100 would be provided.

Further, it has been implied that the modular load carrying panel assembly 4000 consist of a metallic material such that it could be welded together as discussed above. However, as understood by those of ordinary skill in the art, no welding is necessary and the modular load carrying panel assembly 4000 can comprise any material that is strong, sturdy, and lightweight. Non-limiting examples include carbon fibers, thermoplastics (polyetheretherketone (PEEK), polycarbonates, etc.), metals (aluminum, magnesium, titanium, or steel alloys, etc.), Kevlar, and so on.

Benefits of the modular load carrying panel assembly 4000 include the ability to increase storing capacity of a vehicle by raising a height of sides said vehicle with installation of the modular load carrying panel assembly 4000, not only by allowing more objects to be contained within for example the bed 102 of a truck, but also allowing for objects to potentially be stored outside the vehicle. Further, more organization is possible with the modular load carrying panel assembly 4000. Greater amounts of mounting places in addition to additional storage space allows for a neater and cleanlier transportation of objects within a vehicle. Having the modular load carrying panel assembly 4000 be angled by the connecting portion 4115 between the angled panel 4110 and the mounting panel 4120 of the load carrying panel 4110 allows for greater versatility in the transportation of objects and the storing thereof. A user is not limited to mounting objects to an interior of the sidewalls 105 of the truck bed 102. Rather, the user can choose where additional mounting apertures be located. Whether that be atop the sidewalls 105 interior to the sidewalls 105, creating shelving withing the sidewalls 105, atop the tailgate 103, in a middle or end of the bed 102, using the modular load carrying panel assembly 4000 allows for this flexibility and versatility in mounting various objects that can be transported by a vehicle. In addition to the railing 4200 being capable of slidingly engaging tracks that may exist on a vehicle, the channels 4230 provide lighter weight to the modular load carrying panel assembly 4000. This allows for ease of installation as well as reducing any burdensome weight that may be added to the vehicle of the user.

FIGS. 41-46 show additional views of the modular load carrying panel assembly 4000 and will be discussed together.

Figure 41:
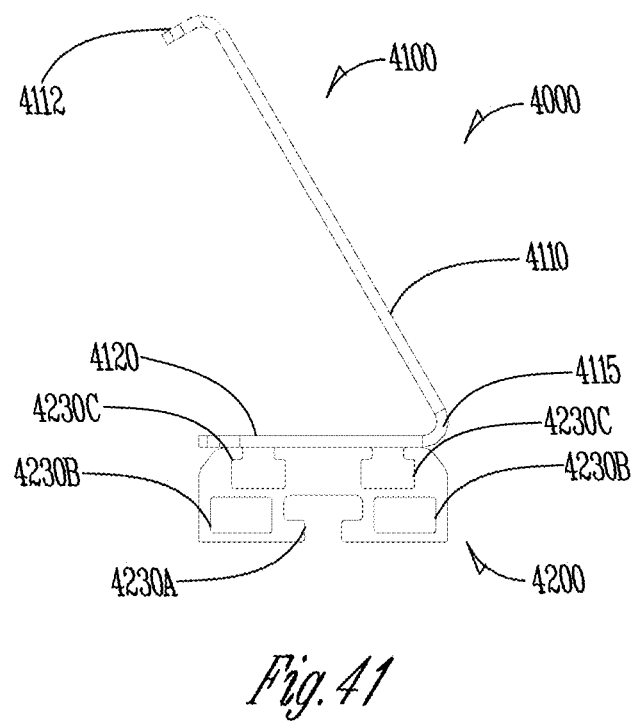
FIG. 41 shows a left elevation view of the modular load carrying panel assembly of FIG. 39.
Figure 42:
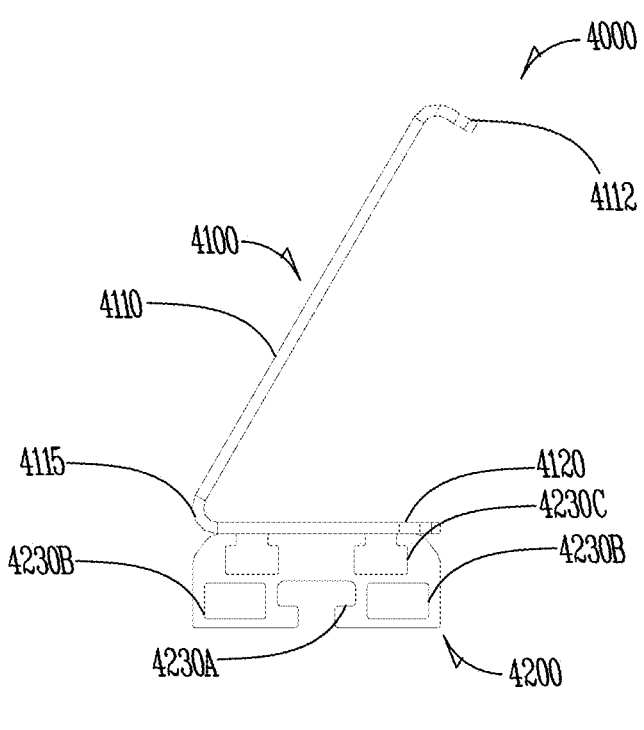
FIG. 42 shows a right elevation view of the modular load carrying panel assembly of FIG. 39.

FIGS. 41-42 show side views of the modular load carrying panel assembly 4000. As shown, the modular load carrying panel assembly 4000 includes the load carrying panel 4100 placed directly atop the railing 4200. The mounting panel 4120 may be flush with the railing 4200. However this is not limiting, as the mounting panel 4120 may instead lie flat atop bolts, nuts, and or screws that are fastened through the first mounting apertures 4210 on the railing 4200. In this regard, the load carrying panel 4100 can be placed anywhere along the railing 4100 and need not be limited to being placed directly in a center of the railing 4200.

Figures 45, 46:
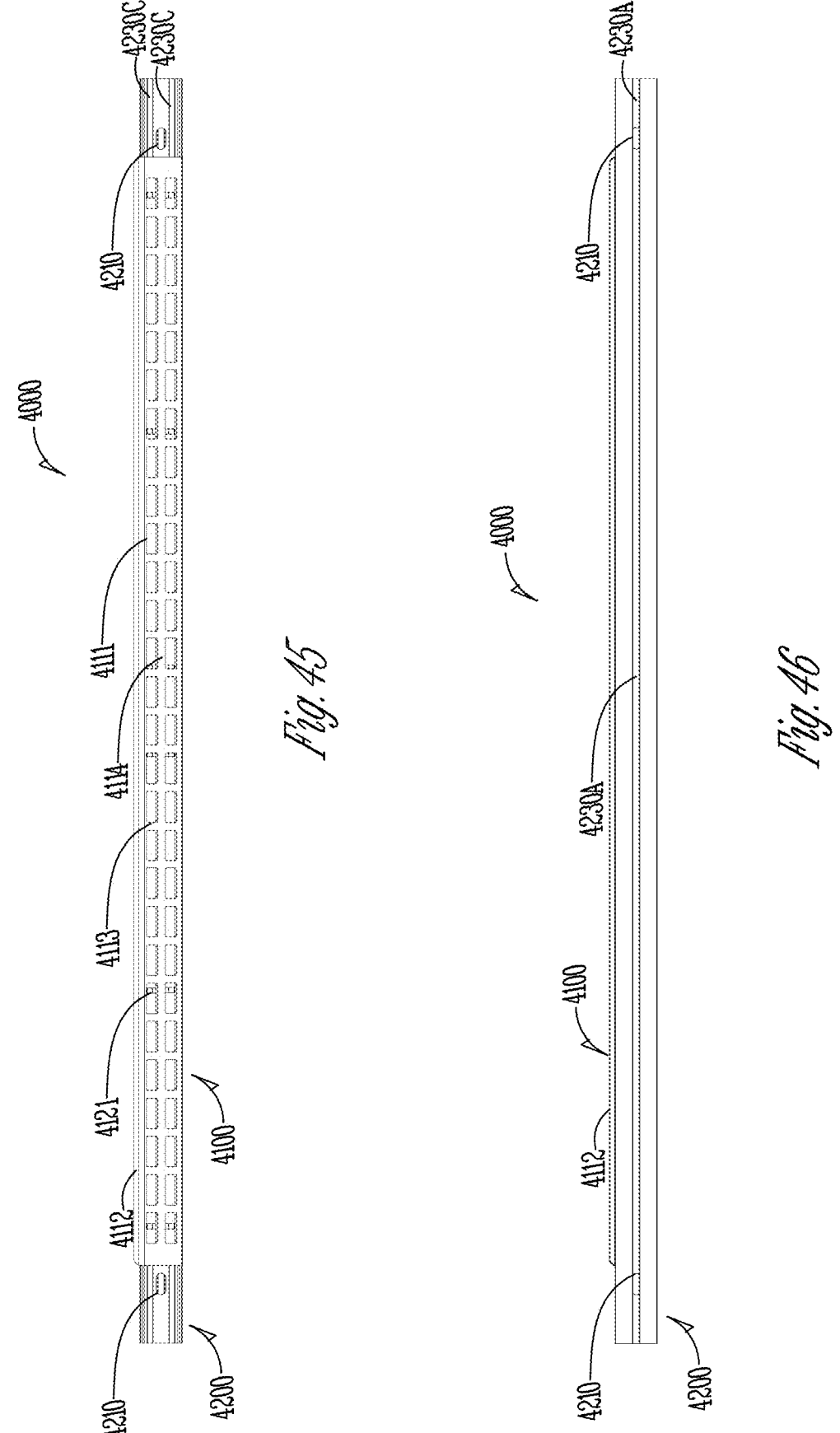
FIG. 45 shows atop plan view of the modular load carrying panel assembly of FIG. 39.
FIG. 46 shows a bottom plan view of the modular load carrying panel assembly of FIG. 39.

As shown, the channels 4230 may include a center T-shaped channel 4230A, a pair of through-channels 4230B on either side of the center T-shaped channel 4230A, and a pair of T-shaped channels 4230C opposite the center T-shaped channel 4230A. The channels 4230 may extend entirely through the railing 4200 as shown in FIGS. 45-46. The specific configuration of the channels 4230 need not follow this exact pattern, for example, the pair of through-channels 4230B could be omitted should the user desire a modular load carrying panel assembly 4000 that is heavier. Or, only one of the pair of through-channels 4230B could be included, and the center T-shaped channel 4230A could be located off-center and adjacent to an edge of the railing 4200 such that the center T-shaped channel 4200 may attach to a track or bolts within a vehicle and have a shifted railing 4200, thus moving the placement of the load carrying panel 4200 if so desired. The overhang of the T-shaped channels 4230A and 4230C allows for easier installation and fastening to either of tracks or use of bolts/nuts/screws by providing an opposing force for the track or bolt/nut/screw to attach to. Further, the channels 4230 allow for greater flexibility in deciding where along the channels one may desire to place such bolts/nuts/screws.

Figures 43, 44:
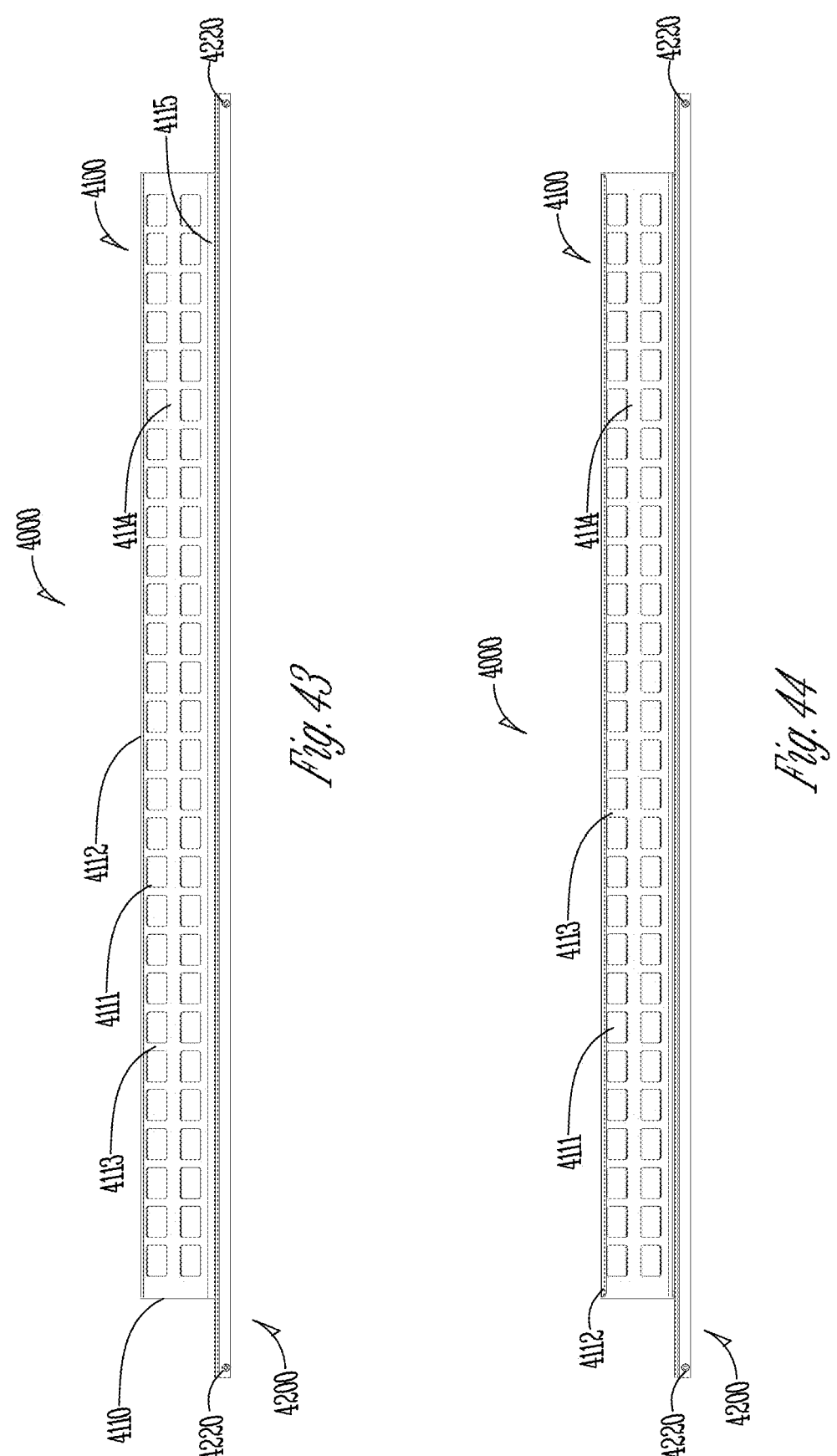
FIG. 43 shows a front elevation view of the modular load carrying panel assembly of FIG. 39.
FIG. 44 shows a back elevation view of the modular load carrying panel assembly of FIG. 39.

FIGS. 43-44 show front and back views respectively. Each of the apertures 4111, top portion 4112, intervals 4113, median 4114, and connecting point 4115 of the load carrying panel 4110 can be seen. Further, these views show the second mounting apertures 4220 in which four total side second mounting apertures 4220 are provided. The second mounting apertures 4220 can be seen of a first side of the railing 4200 in FIG. 43, and on a second side of the railing 4200 in FIG. 44. These need not be limited to four, however as understood by those of ordinary skill in the art, there could be less or more, thus there could be a plurality of the side second mounting apertures 4220 along an entirety of the railing 4200 such that a user could more easily install the modular load carrying panel assembly 4000 to a wall of a vehicle (interior or out) at more specific locations desired other than just the ends of the railing 4200.

FIGS. 45-46 show a top and bottom view respectively of the modular load carrying panel assembly 4000. The top portion 4112 of the load carrying panel 4100 can be seen from the bottom view in FIG. 46, however the rest of the load carrying panel 4100 is not visible from that angle. Thus, only the top portion 4112 would extend past the railing 4200 should a user install the mounting panel 4120 directly center on the railing 4200 as shown in FIGS. 41-42. However, as discussed, the location of the load carrying panel 4100 can be off-center either to the left or right (if looking at FIG. 42) or to the left or right (if looking at FIG. 45) due to the nature of the mounting slits 4121.

As shown in FIGS. 45-46, the first mounting apertures 4210 extend through the railing 4200. This allows for straight-forward installation if a user simply desires to create holes of their own on their vehicle to match the locations of the first mounting apertures 4210 and attach via screw or bolt. As shown in FIG. 46 though, the center T-shaped channel 4230A extends along the railing 4200 and as such could match up with any distance of pre-existing holes on the vehicle, such that bolts/nuts/screws are inserted into the pre-existing holes, not entirely though so that the overhang of the center T-shaped channel 4230A can grasp an underside of the head of said bolts/nuts/screws, and the railing 4200 can slid onto said bolts/nuts/screws.

The specific dimensions are not limiting on the modular load carrying panel assembly 4000 as now given, these dimensions are given simply to give context to the Figures shown. A width of the railing 4200 can be 2.14 inches while the length of the railing 4200 can be 63 inches. A height of the railing 4200 can be 0.812 inches. A height of the channels can be between 0.3 to 0.4 inches. A width of the channels can be between 0.25 to 0.7 inches. An angle formed between the mounting panel 4120 and the angled panel 4110 can be 60-degrees. A width of the mounting panel 4120 can be 2 inches. A length of the mounting panel 4120 and the angled panel 4110 can be 57 inches. A height of the angled panel 4110 can be 4.2 inches. A width of the apertures 4111 can be 1.575 inches. A height of the apertures 4111 can be 1 inch. A distance between the first mounting apertures 4210 can be 58.9 inches. Further, an angle between the angled panel 4110 and the top portion 4112 can be 90-degrees. Further, a distance between an end of the mounting slits 4121 and an end of the width of the mounting panel 4120 can be as little as 0.2 inches.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

TABLE 1-continued

| List of Reference Characters | |
|---|---|
| 100 | modular lightweight load carrying equipment system for automobiles |
| 101 | cab |
| 102 | bed |
| 103 | tailgate |
| 104 | cable |
| 105 | sidewall |
| 106 | tail light |
| 107 | windows (e.g., windshield, passenger windows, back glass) |
| 108 | mirror(s) |
| 109A | wheel well |
| 109B | wheel (e.g., all-terrain tires) |
| 110 | panel |
| 111 | brackets for panels (including the bracket main body) |
| 111B | bolt |
| 111NP | nut plate |
| 111W | washer |
| 112 | cargo |
| 113 | straps |
| 114 | clamps |
| 201 | mounting brackets step |
| 202 | attaching panels step |
| 203 | securing cargo step |
| 301 | clamp base |
| 302 | arm |
| 303 | teeth |
| 304 | notches |
| 305 | rectangular aperture |
| 306 | hole |
| 307 | washer plate |
| 308 | locking tab |
| 400A | front panel |
| 400B | passenger-side panel |
| 400C | driver-side panel |
| 401 | panel flange |
| 402 | flange hole |
| 403 | elongated slot |
| 404 | PALS-like grid |
| 405 | recessed surface |
| 406 | panel hole |
| 407 | splined edge |
| 408 | line of symmetry |
| 409 | substantially orthogonal angle |
| 410A | first front bracket |
| 410B | second front bracket |
| 411 | first bracket flange |
| 412 | protruding surface |
| 413 | second bracket flange |
| 414 | bracket hole |
| 500A | front panel |
| 500B | driver-side panel |
| 500C | passenger-side panel |
| 501 | panel flange |
| 502 | flange hole |
| 503 | elongated slot |
| 504 | PALS-like grid |
| 506 | panel hole |
| 507 | splined edge |
| 508 | line of symmetry |
| 509 | panel cutout |
| 510A | side bracket |
| 510B | front bracket |
| 511 | bracket flange |
| 512 | protruding surface |
| 513 | bracket holes |
| 600A | front panel |
| 600B | driver-side panel |
| 600C | passenger-side panel |
| 602 | panel hole |
| 603 | elongated slot |
| 604 | PALS-like grid |
| 606 | edge cutout |
| 607 | splined edge |
| 608 | line of symmetry |
| 609 | panel cutout |
| 610A | front bracket |

| List of Reference Characters | |
|---|---|
| 610B | middle bracket |
| 610C | rear bracket |
| 611 | bracket flange |
| 612 | protruding surface |
| 614 | bracket holes |
| 615 | bracket cutout |
| 700A | front panel |
| 700B | first passenger-side panel |
| 700C | second passenger-side panel |
| 700D | first driver-side panel |
| 700E | second driver-side panel |
| 702 | panel hole |
| 703 | elongated slot |
| 704 | PALS-like grid |
| 706 | edge cutout |
| 707 | splined edge |
| 708 | line of symmetry |
| 709 | panel cutout |
| 710A | front upper bracket |
| 710B | rear bracket |
| 710C | front lower bracket |
| 710D | side bracket |
| 711 | bracket flange |
| 712 | protruding surface |
| 713 | bracket cutout |
| 714 | bracket holes |
| 800A | front panel |
| 800B | passenger-side panel |
| 800C | driver-side panel |
| 801 | panel flange |
| 802 | flange hole |
| 803 | elongated slot |
| 804 | PALS-like grid |
| 806 | panel hole |
| 807 | splined edge |
| 808 | line of symmetry |
| 809 | edge cutout(s) |
| 810 | bracket |
| 811 | bracket flange |
| 813 | bracket cutout |
| 814 | bracket holes |
| 900A | front panel |
| 900B | driver-side panel |
| 900C | passenger-side panel |
| 902 | panel hole |
| 903 | elongated slot |
| 904 | PALS-like grid |
| 906 | edge cutout |
| 907 | splined edge |
| 908 | line of symmetry |
| 909 | panel cutout |
| 1000A | front panel |
| 1000B | driver-side panel |
| 1000C | passenger-side panel |
| 1002 | panel hole |
| 1003 | elongated slot |
| 1004 | PALS-like grid |
| 1006 | panel cutout |
| 1007 | splined edge |
| 1009 | orthogonal angle |
| 1010A | side bracket |
| 1010B | front bracket |
| 1011 | bracket flange |
| 1012 | bracket holes |
| 1100A | front panel |
| 1100B | driver-side panel |
| 1100C | passenger-side panel |
| 1102 | panel hole |
| 1103 | elongated slot |
| 1104 | PALS-like grid |
| 1106 | panel cutout (substantially rectangular with rounded corners) |
| 1107 | splined edge |
| 1108 | line of symmetry |
| 1110A | front upper bracket |
| 1110B | front lower bracket |
| 1110C | side mounting bracket (rear) |
| 1110D | first double flange side mounting bracket |

TABLE 1-continued

List of Reference Characters

| | |
|---|---|
| 1110E | side mounting bracket (front) |
| 1110F | second double flange side mounting bracket |
| 1111 | bracket flange |
| 1112 | protruding surface |
| 1113 | edge protrusion |
| 1114 | bracket holes |
| 1200A | front panel |
| 1200B | driver-side panel |
| 1200C | passenger-side panel |
| 1202 | panel hole |
| 1203 | elongated slot |
| 1204 | PALS-like grid |
| 1206 | panel cutout (substantially rectangular with rounded corners) |
| 1207 | splined edge |
| 1208 | line of symmetry |
| 1209 | orthogonal angle |
| 1210A | double flange bracket |
| 1210B | single flange bracket |
| 1210C | front upper bracket |
| 1210D | front lower bracket |
| 1211 | first bracket flange |
| 1212 | second bracket flange |
| 1213 | bracket cutout (substantially triangular with rounded corners) |
| 1214 | bracket holes |
| 1300 | modular, lightweight load-carrying panel system including tailgate panel |
| 1400 | modular, lightweight load-carrying panel system including tailgate panel |
| 1500 | well nut |
| 1502 | upper surface |
| 1504 | central aperture |
| 1506 | nonconductive rubber coating of body |
| 1508 | protrusion |
| 1510 | female threads |
| 1600 | hole in tailgate (e.g., an existing mounting point of vehicle) |
| 1600B | backing plate |
| 1700 | screw retainer |
| 1700B | bolt |
| 1700S | spacer |
| 1700W | washer |
| 1810 | tailgate panel for Chevy Colorado/Canyon |
| 1910 | tailgate panel for Chevy Silverado/Sierra (K1) |
| 2010A | first tailgate panel for Chevy Silverado/Sierra HD - Multi-Pro |
| 2010B | second tailgate panel for Chevy Silverado/Sierra HD - Multi-Pro |
| 2010C | third tailgate panel for Chevy Silverado/Sierra HD - Multi-Pro |
| 2110 | tailgate panel for Chevy Silverado/Sierra HD |
| 2210 | tailgate panel for Chevy Silverado/Sierra - Multi-Pro |
| 2310 | tailgate panel for Chevy Silverado/Sierra |
| 2410 | tailgate panel for Ford Bronco |
| 2510A | first tailgate panel for Ford F150 with a work surface |
| 2510B | second tailgate panel for Ford F150 with a work surface |
| 2610 | tailgate panel for Ford F150 |
| 2710 | tailgate panel for Ford Maverick |
| 2810 | tailgate panel for Ford Ranger |
| 2910 | tailgate panel for Ford Super Duty |
| 3010 | tailgate panel for Jeep Gladiator |
| 3110 | tailgate panel for Jeep Wrangler JL |
| 3210 | tailgate panel for Nissan Frontier |
| 3310 | tailgate panel for Nissan Titan |
| 3410 | tailgate panel for Dodge Ram 1500 |
| 3510 | tailgate panel for Dodge Ram HD |
| 3610 | tailgate panel for Toyota Tacoma |
| 3710 | tailgate panel for Toyota Tundra |
| 3810 | tailgate panel for Toyota Tundra |
| 4000 | modular load carrying panel assembly |
| 4100 | load carrying panel |
| 4110 | angled panel |
| 4111 | apertures |
| 4112 | top portion |
| 4113 | intervals |

TABLE 1-continued

List of Reference Characters

| | |
|---|---|
| 4114 | median |
| 4115 | connecting portion |
| 4120 | mounting panel |
| 4121 | mounting slots |
| 4200 | railing |
| 4210 | first mounting apertures |
| 4220 | second mounting apertures |
| 4230 | channels |
| 4230A | center T-shaped channel |
| 4230B | pair of through-channels |
| 4230C | pair of T-shaped channels |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The pouch attachment ladder system ("PALS") usually refers to a grid of webbing invented and patented by United States Army and is now found on a variety of tactical equipment. As used herein, PALS is used to refer to any object having a grid of holes arranged in rows, said grid having at least two rows of holes, unless context indicates otherwise.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A load carrying panel for mounting objects to, comprising:

a mounting panel comprising mounting slits, wherein the mounting slits extend along the mounting panel from a connecting portion to a distance of not less than 0.2 inches from an end of the mounting panel;

an angled panel attached to the mounting panel via the connecting portion, wherein an acute angle formed between the angled panel and the mounting panel is forty-five degrees, between forty-five degrees and seventy-five degrees, or seventy-five degrees;

a plurality of apertures disposed on the angled panel such that a plurality of intervals and a median are disposed between the plurality of apertures, wherein the plurality of apertures are arranged in a plurality of rows;

a top portion; and a fillet between the top portion and the angled panel.

2. The load carrying panel of claim 1, wherein the plurality of rows comprise two rows.

3. The load carrying panel of claim 1, wherein the plurality of apertures are rectangular.

4. A load carrying panel for mounting objects to, comprising:

a mounting panel comprising mounting slits;

an angled panel attached to the mounting panel via a connecting portion;

a plurality of apertures disposed on the angled panel such that a plurality of intervals and a median are disposed between the plurality of apertures;

a top portion; and a fillet between the top portion and the angled panel wherein the plurality of apertures are arranged in a plurality of rows;

wherein an acute angle formed between the angled panel and the mounting panel is forty-five degrees, between forty-five degrees and seventy-five degrees, or seventy-five degrees;

wherein the mounting slits extend along the mounting panel from the connecting portion to a distance of not less than 0.2 inches from an end of the mounting panel; and wherein the mounting slits comprises six mounting slits.

5. A system for a modular load carrying panel assembly, comprising:

a load carrying panel comprising:

a mounting panel comprising mounting slits;

an angled panel attached to the mounting panel via a connecting portion;

a PALS grid disposed on the angled panel; and a railing comprising:

a pair of first mounting apertures that extend through the railing from a top of the railing to a bottom of the railing;

a pair of T-shaped channels positioned on a top of the railing; and a channel extending through the railing from a first distal end to a second distal end, wherein the channel comprises a T-shaped channel.

6. The system of claim 5, further comprising second mounting apertures that extend into both a first a-side of the railing and a second side of the railing.

7. The system of claim 6, wherein the channel comprising a T-shaped channel is positioned on the bottom of the railing.

8. The system of claim 7, wherein the channel comprising a T-shaped channel is disposed in a center of the railing on the bottom, the railing further comprising a pair of through-channels extending through the railing from the first distal end to the second distal end.

9. The system of claim 8, wherein the second mounting apertures extend into the pair of through-channels.

10. The system of claim 9, further comprising a top portion comprising a fillet on the load carrying panel.

11. The system of claim 10, wherein an angle formed between the angled panel and the mounting panel is forty-five degrees, between forty-five degrees and seventy-five degrees, or seventy-five degrees.

12. The system of claim 11, wherein the load carrying panel is fixedly attached to the railing via screws or nuts and bolts.

13. A method for attaching the system of claim 5, to a vehicle, comprising:

connecting the mounting panel to the railing via screws or nuts and bolts through the mounting slits and the pair of T-shaped channels; and fastening the modular load carrying assembly to a vehicle via the channel.

14. The method of claim 13, wherein the modular load carrying assembly is fastened to a top of sidewalls of the vehicle.

15. The method of claim 13, wherein the modular load carrying assembly is fastened to a bed of the vehicle.

16. The method of claim 13, wherein the modular load carrying assembly is fastened to an interior of sidewalls of the vehicle, wherein a plurality of modular load carrying assemblies are fastened to the interior of the sidewalls of the vehicle so as to create shelving with a kit.

* * * * *